US007752288B2

(12) United States Patent
Mihira et al.

(10) Patent No.: US 7,752,288 B2
(45) Date of Patent: Jul. 6, 2010

(54) INFORMATION PROCESSING APPARATUS, CLIENT TERMINAL, SETTING CONTENT CHANGING METHOD, AND COMPUTER-READABLE RECORDING MEDIUM THEREOF

(75) Inventors: Sachiko Mihira, Kanagawa (JP); Toru Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1163 days.

(21) Appl. No.: 10/969,064

(22) Filed: Oct. 21, 2004

(65) Prior Publication Data

US 2005/0134902 A1 Jun. 23, 2005

(30) Foreign Application Priority Data

| | | | |
|---|---|---|---|
| Oct. 24, 2003 | (JP) | ............................. | 2003-364031 |
| Oct. 30, 2003 | (JP) | ............................. | 2003-370712 |
| Oct. 31, 2003 | (JP) | ............................. | 2003-372879 |
| Nov. 13, 2003 | (JP) | ............................. | 2003-383562 |
| Nov. 19, 2003 | (JP) | ............................. | 2003-389678 |
| Nov. 19, 2003 | (JP) | ............................. | 2003-389679 |
| Oct. 18, 2004 | (JP) | ............................. | 2004-303133 |
| Oct. 18, 2004 | (JP) | ............................. | 2004-303134 |

(51) Int. Cl.
*G06F 15/177* (2006.01)
*G06F 3/12* (2006.01)

(52) U.S. Cl. ........................ 709/221; 709/220; 358/1.15

(58) Field of Classification Search ................. 709/221, 709/220; 358/1.15
See application file for complete search history.

(56) References Cited

U.S. PATENT DOCUMENTS

| | | | | |
|---|---|---|---|---|
| 4,860,214 | A | 8/1989 | Matsuda et al. | |
| 5,338,976 | A | 8/1994 | Anwyl et al. | |
| 6,687,829 | B1 | 2/2004 | Miyamoto et al. | |
| 6,894,793 | B1 * | 5/2005 | Roosen et al. ............. | 358/1.15 |
| 7,012,706 | B1 * | 3/2006 | Hansen ...................... | 358/1.15 |
| 2002/0055991 | A1 * | 5/2002 | Arrouye et al. ............. | 709/220 |
| 2002/0067491 | A1 | 6/2002 | Minagawa | |
| 2002/0131076 | A1 * | 9/2002 | Davis ........................ | 358/1.15 |
| 2002/0133573 | A1 | 9/2002 | Matsuda et al. | |
| 2003/0011811 | A1 * | 1/2003 | Clough ...................... | 358/1.15 |

(Continued)

FOREIGN PATENT DOCUMENTS

| | | |
|---|---|---|
| JP | 63-124138 | 5/1988 |

(Continued)

OTHER PUBLICATIONS

"Hierarchical Latching Method—Splitting Locks/Latches to Increase Concurrency", IBM Technical Disclosure Bulletin, vol. 33, No. 10A, XP-000109947, Mar. 1991, pp. 30-32.

(Continued)

*Primary Examiner*—George C Neurauter, Jr.
*Assistant Examiner*—Mark D Fearer
(74) *Attorney, Agent, or Firm*—Oblon, Spivak, McClelland, Maier & Neustadt, L.L.P.

(57) ABSTRACT

In an information processing apparatus capable of changing the setting contents including setting items, an occupied state in that the setting items cannot be accessed and the settable state in that the setting items can be accessed are managed. The settable state in that a plurality of setting device managing parts cannot transit is transferred from one setting device managing part to another setting device managing part.

8 Claims, 101 Drawing Sheets

U.S. PATENT DOCUMENTS

| | | | | |
|---|---|---|---|---|
| 2003/0218771 | A1 | 11/2003 | Mihira | |
| 2003/0225894 | A1 | 12/2003 | Ito | |
| 2004/0030986 | A1 | 2/2004 | Matsuda | |
| 2004/0070782 | A1 | 4/2004 | Mihira | |
| 2004/0080771 | A1 | 4/2004 | Mihira et al. | |
| 2004/0109019 | A1 | 6/2004 | Miyamoto et al. | |
| 2004/0128349 | A1 | 7/2004 | Maruyama | |
| 2005/0193103 | A1 * | 9/2005 | Drabik | 709/221 |

FOREIGN PATENT DOCUMENTS

| | | |
|---|---|---|
| JP | 2002-84383 | 3/2002 |
| JP | 2002-209047 | 7/2002 |

OTHER PUBLICATIONS

U.S. Appl. No. 11/154,659, filed Jun. 17, 2005, Yagiura et al.

U.S. Appl. No. 10/761,206, filed Jan. 22, 2004, Toru Matsuda, et al.

U.S. Appl. No. 10/740,666, filed Dec. 22, 2003, Takashi Nakamura.

U.S. Appl. No. 11/211,456, filed Aug. 26, 2005, Takeuchi et al.

U.S. Appl. No. 11/240,511, filed Oct. 3, 2005, Takeuchi et al.

* cited by examiner

FIG.4

| DEVICE MANAGEMENT SERVICE TYPE | SETTING ITEM |
|---|---|
| NETWORK SETTING DEVICE MANAGEMENT SERVICE | • IP ADDRESS OF DEVICE<br>• GATEWAY<br>• AVAILABLE PROTOCOL<br>• HOST NAME<br>• DOMAIN NAME |
| SYSTEM SETTING DEVICE MANAGEMENT SERVICE | • PAPER FEED TRAY<br>• OUTPUT TRAY<br>• TIME<br>• SECURITY SETTING<br>• ENERGY SAVING MODE<br>• ADDRESS REGISTRATION |
| FAX SETTING DEVICE MANAGEMENT SERVICE | • HEADER PRINT<br>• SELF-FAX NUMBER<br>• EXTENSION / OUTSIDE NUMBER SWITCH<br>• PRESENCE OF TRANSMISSION RESULT REPORT |
| PRINTER SETTING DEVICE MANAGEMENT SERVICE | • JOB RESET IN PRINTING<br>• SPOOL PRINT |

FIG.15

≪REQUEST SOAP MESSAGE≫

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:startSession
    xmlns:m="http://www.hoge.co.jp/xmlns/soap/management ">
    <userName xsi:type="xsd:string">suzuki</userName> ~1061
    <password xsi:type="xsd:string">012345</password> ~1062
    <target xsi:type="xsd:string">system</target> ~1063
   </m:startSession>
 </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
   <ns1:startSessionResponse
     SOAP-ENV:encodingStyle="http://schemas.xmlsoap.org/soap/encoding/"
     xmlns:ns1="http://www.hoge.co.jp/xmlns/soap/ management">
     <returnValue xsi:type="xsd:string"> 0123456789 </returnValue>~1071
   </ns1:startSessionResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:startDeviceLock
     xmlns:m="http://www.hoge.co.jp/xmlns/soap/management ">
     <sessionId xsi:type="xsd:string">0123456789 </sessionId>   ~1081
     <target xsi:type="xsd:string">system</target>   ~1082
     <limitTime xsi:type="xsd:string">1800</limitTime>   ~1083
   </m:startDeviceLock>
  </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:startDeviceLockResponse
      SOAP-ENV:encodingStyle="http://schemas.xmlsoap.org/soap/encoding/"
      xmlns:ns1="http://www.hoge.co.jp/xmlns/soap/ management">
      <returnValue xsi:type="xsd:string"> OK </returnValue>~1091
    </ns1:startDeviceLockResponse >
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:setProperty
    xmlns:m="http://www.hoge.co.jp/xmlns/soap/management ">
    <sessionId xsi:type="xsd:string">0123456789 </sessionId>   ~ 1101
    <target xsi:type="xsd:string">system</target>   ~ 1102
    <propertyInfo xmlns:itt="http:// www.hoge.co.jp/xmlns/soap/commontype" xmlns:soap-enc ="itt:property[2]">
      <item><name xsi:type="xsd:string"> time</name><value xsi:type="xsd:string">19770526T10:20:30</value></item>   } 1103
      <item><name xsi:type="xsd:string">security</name><value xsi:type="xsd:string">true</value></item>
    </propertyInfo>
  </m:setProperty>
 </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
   <ns1:setPropertyResponse
     SOAP-ENV:encodingStyle="http://schemas.xmlsoap.org/soap/encoding/"
     xmlns:ns1="http://www.hoge.co.jp/xmlns/soap/management">
     <returnValue xsi:type="xsd:string"> SUCCEEDED </returnValue> ~1111
   </ns1:setPropertyResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:releaseDeviceLock
     xmlns:m="http://www.hoge.co.jp/xmlns/soap/management ">
     <sessionId xsi:type="xsd:string">0123456789 </sessionId> ~1121
     <target xsi:type="xsd:string">system</target> ~1122
   </m:releaseDeviceLock>
  </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
   <ns1:releaseDeviceLockResponse
     SOAP-ENV:encodingStyle="http://schemas.xmlsoap.org/soap/encoding/"
     xmlns:ns1="http://www.hoge.co.jp/xmlns/soap/ management">
     <returnValue xsi:type="xsd:string"> OK </returnValue> ~1131
    </ns1:releaseDeviceLockResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:terminateSession
     xmlns:m="http://www.hoge.co.jp/xmlns/soap/management ">
     <sessionId xsi:type="xsd:string">0123456789 </sessionId>  ~1141
     <target xsi:type="xsd:string">system</target> ~1142
   </m:terminateSession>
  </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
   <ns1:terminateSessionResponse
     SOAP-ENV:encodingStyle="http://schemas.xmlsoap.org/soap/encoding/"
     xmlns:ns1="http://www.hoge.co.jp/xmlns/soap/management">
     <returnValue xsi:type="xsd:string"> OK </returnValue> ~1151
   </ns1:terminateSessionResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:catchDeviceLock
     xmlns:m="http://www.hoge.co.jp/xmlns/soap/management ">
     <sessionId xsi:type="xsd:string">9876543210</sessionId> ~ 1161
     <target xsi:type="xsd:string">FAX</target> ~ 1162
     <releasedDeviceLockService xsi:type="xsd:string">http://111.222.333.444/management/system</releasedDeviceLockService> ~ 1163
     <releasedDeviceLockSessionId xsi:type="xsd:string">0123456789 </releasedDeviceLockSessionId> ~ 1164
   </m:catchDeviceLock>
  </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:catchDeviceLockResponse
      SOAP-ENV:encodingStyle="http://schemas.xmlsoap.org/soap/encoding/"
      xmlns:ns1="http://www.hoge.co.jp/xmlns/soap/ management">
      <returnValue xsi:type="xsd:string"> OK </returnValue>~1171
    </ns1:catchDeviceLockResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:endDeviceLock
      xmlns:m="http://www.hoge.co.jp/xmlns/soap/management ">
      <sessionId xsi:type="xsd:string">9876543210 </sessionId>   ~1181
      <target xsi:type="xsd:string">FAX</target>   ~1182
    </m:endDeviceLock>
  </SOAP-ENV:Body>
</SOAP-ENV:Envelope>
```

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:endDeviceLockResponse
      SOAP-ENV:encodingStyle="http://schemas.xmlsoap.org/soap/encoding/"
      xmlns:ns1="http://www.hoge.co.jp/xmlns/soap/ management">
      <returnValue xsi:type="xsd:string"> OK </returnValue>  ~1191
    </ns1:endDeviceLockResponse>
  </SOAP-ENV:Body>
</SOAP-ENV:Envelope>
```

≪REQUEST SOAP MESSAGE≫

1200

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:changeSessionAndDeviceLock
     xmlns:m="http://www.hoge.co.jp/xmlns/soap/management ">
     <sessionId xsi:type="xsd:string">0123456789 </sessionId> ~1201
     <target xsi:type="xsd:string">system</target> ~1202
     <nextTarget xsi:type="xsd:string">FAX</nextTarget> ~1203
     <nextUserName xsi:type="xsd:string">satoh</nextUserName> ~1204
     <nextUserPassword xsi:type="xsd:string">abcdefg</nextUserPassword> ~1205
   </m:changeSessionAndDeviceLock>
  </SOAP-ENV:Body>
</SOAP-ENV:Envelope>
```

FIG.32

≪RESPONSE SOAP MESSAGE≫

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1: changeSessionAndDeviceLockResponse
      SOAP-ENV:encodingStyle="http://schemas.xmlsoap.org/soap/encoding/"
      xmlns:ns1="http://www.hoge.co.jp/xmlns/soap/ management">
      <returnValue xsi:type="xsd:string"> 9876543210 </returnValue>  ~1211
    </ns1: changeSessionAndDeviceLockResponse>
  </SOAP-ENV:Body>
</SOAP-ENV:Envelope>
```

≪REQUEST SOAP MESSAGE≫

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
    <m:startSession
      xmlns:m="http://www.hoge.co.jp/xmlns/soap/management ">
      <authInfo xmlns:itt="http:// www.hoge.co.jp/xmlns/soap/commontype" xmlns:soap-enc ="itt:property[2]">
        <item><target xsi:type="xsd:string">system</target><userName xsi:type="xsd:string">suzuki</userName><password xsi:type="xsd:string">012345</password></item>
        <item><target xsi:type="xsd:string">FAX</target><userName xsi:type="xsd:string">satoh</userName><password xsi:type="xsd:string">abcdefg</password></item>
      </authInfo>
    </m:startSession>
  </SOAP-ENV:Body>
</SOAP-ENV:Envelope>
```

1231 (FAX) 1232 (satoh) 1233 (abcdefg)

FIG.39

≪REQUEST SOAP MESSAGE≫

1240

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:startSession
    xmlns:m="http://www.hoge.co.jp/xmlns/soap/management ">
    <authInfo xmlns:itt="http:// www.hoge.co.jp/xmlns/soap/commontype" xmlns:soap-enc ="itt:property[2]">
     <item><target xsi:type="xsd:string">system</target><userName xsi:type="xsd:string">suzuki</userName><password xsi:type="xsd:string">012345</password></item>
     <item><target xsi:type="xsd:string">FAX</target><userName xsi:type="xsd:string">satoh</userName><password xsi:type="xsd:string">abcdefg</password></item>
    </authInfo>
     <limitTime xsi:type="xsd:string">1800</limitTime>
   </m:startSession>
 </SOAP-ENV:Body>
</SOAP-ENV:Envelope>
```

1241 (FAX) 1242 (satoh) 1243 (abcdefg) 1244 (1800)

FIG.43

《REQUEST SOAP MESSAGE》

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:catchDeviceLock
     xmlns:m="http://www.hoge.co.jp/xmlns/soap/management ">
     <sessionId xsi:type="xsd:string">9876543210</sessionId> ~1251
     <target xsi:type="xsd:string">FAX</target>~1252
   </m:catchDeviceLock>
  </SOAP-ENV:Body>
</SOAP-ENV:Envelope>
```

《RESPONSE SOAP MESSAGE》 1260

```
<?xml version="1.0" encoding="UTF-8"?>
<SOAP-ENV:Envelope
 xmlns:SOAP-ENV="http://schemas.xmlsoap.org/soap/envelope/"
 xmlns:xsd="http://www.w3.org/2001/XMLSchema"
 xmlns:xsi="http://www.w3.org/2001/XMLSchema-instance">
 <SOAP-ENV:Body>
   <ns1:releaseDeviceLockResponse
      SOAP-ENV:encodingStyle="http://schemas.xmlsoap.org/soap/encoding/"
      xmlns:ns1="http://www.hoge.co.jp/xmlns/soap/management ">
      <returnValue xsi:type="xsd:string"> OK </returnValue>  1261
      <lockTicket xsi:type="xsd:base64Binary">aG9nZQ==</lockTicket>  1262
   </ns1:releaseDeviceLockResponse>
 </SOAP-ENV:Body>
</SOAP-ENV:Envelope>
```

FIG.52

《REQUEST SOAP MESSAGE》

1270

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:catchDeviceLock
    xmlns:m="http://www.hoge.co.jp/xmlns/soap/management ">
    <sessionId xsi:type="xsd:string">9876543210 </sessionId>   1271
    <target xsi:type="xsd:string">FAX</target>   1272
    <lockTicket xsi:type="xsd:base64Binary">aG9nZQ==</lockTicket>   1273
  </m:catchDeviceLock>
 </SOAP-ENV:Body>
</SOAP-ENV:Envelope>
```

FIG.53

| OPERATION FOR EACH MODULE | | INPUT DATA | OUTPUT DATA |
|---|---|---|---|
| WSF DEVICE MANAGEMENT SERVICE | VARIOUS SETTING DEVICE MANAGEMENT SERVICE | | |
| ·GENERATE SESSION INFORMATION | ·CHECK THAT USER IS ADMINISTRATOR<br>·AUTHENTICATE USER<br>·CREATE SESSION ID | USER NAME(1), PASSWORD(1) | SESSION ID(1) |
| ·GENERATE SESSION INFORMATION<br>·AUTHENTICATE USER | ·CHECK THAT USER IS ADMINISTRATOR<br>·CREATE SESSION ID | USER NAME(1) | SESSION ID(1) |
| ·GENERATE SESSION INFORMATION<br>·AUTHENTICATE USER | ·CHECK THAT USER IS ADMINISTRATOR<br>·CREATE SESSION ID | AUTHENTICATION TICKET | SESSION ID(1) |
| ·GENERATE SESSION INFORMATION<br>·AUTHENTICATE USER<br>·CREATE SESSION ID | ·CHECK THAT USER IS ADMINISTRATOR | USER NAME(1), SESSION ID | NONE |
| ·GENERATE SESSION INFORMATION<br>·AUTHENTICATE USER<br>·CREATE SESSION ID | ·CHECK THAT USER IS ADMINISTRATOR | AUTHENTICATION TICKET, SESSION ID(1) | NONE |

ADDRESS LIST SCREEN FOR ADDRESS BOOK

ADDRESS LIST ⌐5001

[CHANGE] [DELETE] [ADD]

|   | No | USER NAME |
|---|----|-----------|
| ○ | 110 | suzuki |
| ● | 111 | satoh |
| ○ | 112 | inoue |

5000

CHANGE DATA SELECTION SCREEN satoh's ADDRESS BOOK DATA     [OK]

CHANGE DATA TYPE SELECTION      5011

[REGULAR DATA]

[PERSONAL DATA]

[MANAGEMENT DATA]

5010

«LOCK INFORMATION»
・ADDRESS BOOK ID
・CHANGEABLE TYPE OF ADDRESS BOOK
 (REGULAR DATA/PERSONAL DATA/MANAGEMENT DATA)
・LOCK STATE
・SESSION ID POSSESSING LOCK
                                          5031

«SESSION INFORMATION»
・SESSION ID
・USER INFORMATION
・LOCK AUTHORITY YES/NO
                                          5030

FIG.67

《REQUEST SOAP MESSAGE》

5070

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
  <SOAP-ENV:Body>
    <m:startSession
      xmlns:m="http://www.hoge.co.jp/xmlns/soap/addressBookManagement">
      <userName xsi:type="xsd:string">satoh</userName>    5071
      <password xsi:type="xsd:string">012345</password>    5072
      <target xsi:type="xsd:string">private_data</target>    5073
    </m:startSession>
  </SOAP-ENV:Body>
</SOAP-ENV:Envelope>
```

FIG.68

《RESPONSE SOAP MESSAGE》

5080

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:startSessionResponse
      SOAP-ENV:encodingStyle="http://schemas.xmlsoap.org/soap/encoding/"
      xmlns:ns1="http://www.hoge.co.jp/xmlns/soap/addressBookManagement ">
      <returnValue xsi:type="xsd:string"> 0123456789 </returnValue>    5081
    </ns1:startSessionResponse>
  </SOAP-ENV:Body>
</SOAP-ENV:Envelope>
```

FIG.69

《REQUEST SOAP MESSAGE》

5090

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
 <SOAP-ENV:Body>
  <m:startDataLock
    xmlns:m="http://www.hoge.co.jp/xmlns/soap/addressBookManagement ">
    <sessionId xsi:type="xsd:string">0123456789 </sessionId>   5091
    <targetId xsi:type="xsd:string">111</targetId>   5092
    <target xsi:type="xsd:string">private_data</target>   5093
    <limitTime xsi:type="xsd:string">1800</limitTime>   5094
  </m:startDataLock>
 </SOAP-ENV:Body>
</SOAP-ENV:Envelope>
```

FIG.70

《RESPONSE SOAP MESSAGE》 5100

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance">
 <SOAP-ENV:Body>
  <ns1:startDataLockResponse
    SOAP-ENV:encodingStyle="http://schemas.xmlsoap.org/soap/encoding/"
    xmlns:ns1="http://www.hoge.co.jp/xmlns/soap/addressBookManagement ">
    <returnValue xsi:type="xsd:string"> OK </returnValue>  5101
  </ns1:startDataLockResponse >
 </SOAP-ENV:Body>
</SOAP-ENV:Envelope>
```

FIG.71

《REQUEST SOAP MESSAGE》

5110

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
  <SOAP-ENV:Body>
   <m:setProperty
     xmlns:m="http://www.hoge.co.jp/xmlns/soap/addressBookManagement ">
     <sessionId xsi:type="xsd:string">0123456789 </sessionId>   5111
     <targetId xsi:type="xsd:string">111</targetId>   5112
     <target xsi:type="xsd:string">private_data</target>   5113
<propertyInfo xmlns:itt="http:// www.hoge.co.jp/xmlns/soap/commontype" xmlns:soap-enc ="itt:property[2]">
<item><name xsi:type="xsd:string">password</name><value xsi:type="xsd:string">hogehoge</value></item>
<item><name xsi:type="xsd:string">smb_ftp_password</name><value xsi:type="xsd:string">abcdefg</value></item>
</propertyInfo>
    </m:setProperty>
  </SOAP-ENV:Body>
</SOAP-ENV:Envelope>
```

《RESPONSE SOAP MESSAGE》

5120

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
   <ns1:setPropertyResponse
     SOAP-ENV:encodingStyle="http://schemas.xmlsoap.org/soap/encoding/"
     xmlns:ns1="http://www.hoge.co.jp/xmlns/soap/addressBookManagement ">
     <returnValue xsi:type="xsd:string"> SUCCEEDED </returnValue>  5121
   </ns1:setPropertyResponse>
  </SOAP-ENV:Body>
</SOAP-ENV:Envelope>
```

FIG.73

《REQUEST SOAP MESSAGE》

5130

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
 <SOAP-ENV:Body>
  <m:releaseDataLock
    xmlns:m="http://www.hoge.co.jp/xmlns/soap/addressBookManagement ">
    <sessionId xsi:type="xsd:string">0123456789 </sessionId>  ~ 5131
    <targetId xsi:type="xsd:string">111</targetId>  ~ 5132
    <target xsi:type="xsd:string">private_data</target>  ~ 5133
  </m:releaseDataLock>
 </SOAP-ENV:Body>
</SOAP-ENV:Envelope>
```

FIG.74

《RESPONSE SOAP MESSAGE》

5140

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance">
 <SOAP-ENV:Body>
  <ns1:releaseDataLockResponse
    SOAP-ENV:encodingStyle="http://schemas.xmlsoap.org/soap/encoding/"
    xmlns:ns1="http://www.hoge.co.jp/xmlns/soap/addressBookManagement ">
    <returnValue xsi:type="xsd:string"> OK </returnValue>  5141
  </ns1:releaseDataLockResponse>
 </SOAP-ENV:Body>
</SOAP-ENV:Envelope>
```

FIG.75

《REQUEST SOAP MESSAGE》

5150

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
  <SOAP-ENV:Body>
   <m:tarminateSession
     xmlns:m="http://www.hoge.co.jp/xmlns/soap/addressBookManagement ">
     <sessionId xsi:type="xsd:string">0123456789 </sessionId>   ~ 5151
     <targetId xsi:type="xsd:string">111</targetId>   ~ 5152
     <target xsi:type="xsd:string">private_data</target>   ~ 5153
   </m:tarminateSession>
  </SOAP-ENV:Body>
</SOAP-ENV:Envelope>
```

FIG.76

《RESPONSE SOAP MESSAGE》

5160

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:terminateSessionResponse
      SOAP-ENV:encodingStyle="http://schemas.xmlsoap.org/soap/encoding/"
      xmlns:ns1="http://www.hoge.co.jp/xmlns/soap/addressBookManagement ">
      <returnValue xsi:type="xsd:string"> OK </returnValue>   5161
    </ns1:terminateSessionResponse>
  </SOAP-ENV:Body>
</SOAP-ENV:Envelope>
```

FIG.77

《REQUEST SOAP MESSAGE》 5170

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
 <SOAP-ENV:Body>
  <m:catchDataLock
   xmlns:m="http://www.hoge.co.jp/xmlns/soap/addressBookManagement ">
   <sessionId xsi:type="xsd:string">9876543210 </sessionId>  ~ 5171
   <targetId xsi:type="xsd:string">111</targetId>  ~ 5172
   <target xsi:type="xsd:string">management_data</target>  ~ 5173
  <releasedDataLockService
   xsi:type="xsd:string">http://111.222.333.444/management/system</releasedDataLockService>  ~ 5174
  <releasedDataLockSessionId
   xsi:type="xsd:string">0123456789<releasedDataLockSessionId>  ~ 5175
  </m:catchDataLock>
 </SOAP-ENV:Body>
</SOAP-ENV:Envelope>
```

FIG.78

《RESPONSE SOAP MESSAGE》

5180

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance">
 <SOAP-ENV:Body>
  <ns1:catchDataLockResponse
    SOAP-ENV:encodingStyle="http://schemas.xmlsoap.org/soap/encoding/"
    xmlns:ns1="http://www.hoge.co.jp/xmlns/soap/addressBookManagement ">
    <returnValue xsi:type="xsd:string"> OK </returnValue>  5181
  </ns1:catchDataLockResponse>
 </SOAP-ENV:Body>
</SOAP-ENV:Envelope>
```

FIG.79

《REQUEST SOAP MESSAGE》

5190

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
  <SOAP-ENV:Body>
   <m:endDataLock
     xmlns:m="http://www.hoge.co.jp/xmlns/soap/addressBookManagement ">
     <sessionId xsi:type="xsd:string">9876543210 </sessionId>   5191
     <targetId xsi:type="xsd:string">111</targetId>   5192
     <target xsi:type="xsd:string"> management_data </target>   5193
    </m:endDataLock>
  </SOAP-ENV:Body>
</SOAP-ENV:Envelope>
```

FIG.80

《RESPONSE SOAP MESSAGE》

5200

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1:endDataLockResponse
      SOAP-ENV:encodingStyle="http://schemas.xmlsoap.org/soap/encoding/"
      xmlns:ns1="http://www.hoge.co.jp/xmlns/soap/addressBookManagement ">
      <returnValue xsi:type="xsd:string"> OK </returnValue>  ~ 5201
    </ns1:endDataLockResponse>
  </SOAP-ENV:Body>
</SOAP-ENV:Envelope>
```

FIG.84

《REQUEST SOAP MESSAGE》

5210

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
 <SOAP-ENV:Body>
  <m:changeSessionAndDataLock
    xmlns:m="http://www.hoge.co.jp/xmlns/soap/management ">
    <sessionId xsi:type="xsd:string">0123456789 </sessionId>   ~ 5211
    <targetId xsi:type="xsd:string">111</targetId>   ~ 5212
    <nextTarget xsi:type="xsd:string">management_data</nextTarget>   ~ 5213
    <nextUserName xsi:type="xsd:string">suzuki</nextUserName>   ~ 5214
    <nextUserPassword xsi:type="xsd:string">012345</nextUserPassword>   ~ 5215
   </m:changeSessionAndDataLock>
 </SOAP-ENV:Body>
</SOAP-ENV:Envelope>
```

FIG.85

《RESPONSE SOAP MESSAGE》

5220

```
<?xml version="1.0" encoding="UTF-8"?>
<SOAP-ENV:Envelope
  xmlns:SOAP-ENV ="http://schemas.xmlsoap.org/soap/envelope/"
  xmlns:xsd="http://www.w3.org/2001/XMLSchema"
  xmlns:xsi="http://www.w3.org/2001/XMLSchema-instance">
  <SOAP-ENV:Body>
    <ns1: changeSessionAndDeviceLockResponse
      SOAP-ENV:encodingStyle="http://schemas.xmlsoap.org/soap/encoding/"
      xmlns:ns1="http://www.hoge.co.jp/xmlns/soap/ management">
      <returnValue xsi:type="xsd:string"> 9876543210 </returnValue>    5221
    </ns1: changeSessionAndDeviceLockResponse>
  </SOAP-ENV:Body>
</SOAP-ENV:Envelope>
```

FIG.89

《REQUEST SOAP MESSAGE》

5240

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:startSession
    xmlns:m="http://www.hoge.co.jp/xmlns/soap/management ">
<authInfo xmlns:itt="http:// www.hoge.co.jp/xmlns/soap/commontype" xmlns:soap-enc ="itt:property[2]">
<item><target xsi:type="xsd:string">private_data</target><userName xsi:type="xsd:string">satoh</userName><password xsi:type="xsd:string">abcdefg</password></item>
<item><target xsi:type="xsd:string">management_data</target><userName xsi:type="xsd:string">suzuki</userName><password xsi:type="xsd:string">012345</password></item>
</authInfo>
   </m:startSession>
 </SOAP-ENV:Body>
</SOAP-ENV:Envelope>
```

《REQUEST SOAP MESSAGE》

5250

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
  <SOAP-ENV:Body>
   <m:startDataLock
      xmlns:m="http://www.hoge.co.jp/xmlns/soap/addressBookManagement ">
      <sessionId xsi:type="xsd:string">0123456789 </sessionId>  ~ 5251
      <targetId xsi:type="xsd:string">111</targetId>  ~ 5252
      <target xmlns:itt= "http:// www.hoge.co.jp/xmlns/soap/commontype" xmlns:soap-enc
="itt:string[2]"><item>private_data</item><item>management_data</item></target>  ~ 5253
      <limitTime xsi:type="xsd:string">1800</limitTime>  ~ 5254
    </m:startDataLock>
  </SOAP-ENV:Body>
</SOAP-ENV:Envelope>
```

FIG.93

《REQUEST SOAP MESSAGE》

5260

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:startSession
     xmlns:m="http://www.hoge.co.jp/xmlns/soap/management ">
<authInfo xmlns:itt="http:// www.hoge.co.jp/xmlns/soap/commontype" xmlns:soap-enc ="itt:property[2]">
<item><target xsi:type="xsd:string">private_data</target><userName xsi:type="xsd:string">satoh</userName><password xsi:type="xsd:string">abcdefg</password></item>
<item><target xsi:type="xsd:string">management_data</target><userName xsi:type="xsd:string">suzuki</userName><password xsi:type="xsd:string">012345</password></item>
</authInfo>
     <targetId xsi:type="xsd:string">111</targetId>
     <limitTime xsi:type="xsd:string">1800</limitTime>
   </m:startSession>
  </SOAP-ENV:Body>
</SOAP-ENV:Envelope>
```

5261 (management_data), 5262 (suzuki), 5263 (012345), 5264 (111), 5265 (1800)

FIG.97

《REQUEST SOAP MESSAGE》

5270

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/"
 <SOAP-ENV:Body>
  <m:catchDataLock
    xmlns:m="http://www.hoge.co.jp/xmlns/soap/addressBookManagement ">
    <sessionId xsi:type="xsd:string">9876543210 </sessionId> ~ 5271
    <targetId xsi:type="xsd:string">111</targetId> ~ 5272
    <target xsi:type="xsd:string">management_data</target> ~ 5273
  </m:catchDataLock>
 </SOAP-ENV:Body>
</SOAP-ENV:Envelope>
```

FIG.101

《RESPONSE SOAP MESSAGE》

5280

```
<?xml version="1.0" encoding="UTF-8"?>
<SOAP-ENV:Envelope
 xmlns:SOAP-ENV="http://schemas.xmlsoap.org/soap/envelope/"
 xmlns:xsd="http://www.w3.org/2001/XMLSchema"
 xmlns:xsi="http://www.w3.org/2001/XMLSchema-instance">
 <SOAP-ENV:Body>
   <ns1:releaseDataLockResponse
      SOAP-ENV:encodingStyle="http://schemas.xmlsoap.org/soap/encoding/"
      xmlns:ns1="http://www.hoge.co.jp/xmlns/soap/addressBookManagement ">
      <returnValue xsi:type="xsd:string"> OK </returnValue>  5281
      <lockTicket xsi:type="xsd:base64Binary">aG9nZQ==</lockTicket>  5282
   </ns1:releaseDataLockResponse>
 </SOAP-ENV:Body>
</SOAP-ENV:Envelope>
```

FIG.102

《REQUEST SOAP MESSAGE》

5290

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/"
  <SOAP-ENV:Body>
   <m:catchDataLock
     xmlns:m="http://www.hoge.co.jp/xmlns/soap/addressBookManagement ">
     <sessionId xsi:type="xsd:string">9876543210 </sessionId>  5291
     <targetId xsi:type="xsd:string">111</targetId>  5292
     <target xsi:type="xsd:string">management_data</target>  5293
     <lockTicket xsi:type="xsd:base64Binary">aG9nZQ==</lockTicket>  5294
   </m:catchDataLock>
  </SOAP-ENV:Body>
</SOAP-ENV:Envelope>
```

FIG.103

| OPERATION FOR EACH MODULE | | INPUT DATA | OUTPUT DATA |
|---|---|---|---|
| WSF DEVICE MANAGEMENT SERVICE | VARIOUS SETTING DEVICE MANAGEMENT SERVICE | | |
| ·GENERATE SESSION INFORMATION | ·CHECK THAT USER IS ADMINISTRATOR<br>·AUTHENTICATE USER<br>·CREATE SESSION ID | USER NAME, PASSWORD | SESSION ID |
| ·GENERATE SESSION INFORMATION<br>·AUTHENTICATE USER | ·CHECK THAT USER IS ADMINISTRATOR<br>·CREATE SESSION ID | USER NAME | SESSION ID |
| ·GENERATE SESSION INFORMATION<br>·AUTHENTICATE USER | ·CHECK THAT USER IS ADMINISTRATOR<br>·CREATE SESSION ID | AUTHENTICATION TICKET | SESSION ID |
| ·GENERATE SESSION INFORMATION<br>·AUTHENTICATE USER<br>·CREATE SESSION ID | ·CHECK THAT USER IS ADMINISTRATOR | USER NAME, SESSION ID | NONE |
| ·GENERATE SESSION INFORMATION<br>·AUTHENTICATE USER<br>·CREATE SESSION ID | ·CHECK THAT USER IS ADMINISTRATOR | AUTHENTICATION TICKET, SESSION ID | NONE |

INFORMATION PROCESSING APPARATUS, CLIENT TERMINAL, SETTING CONTENT CHANGING METHOD, AND COMPUTER-READABLE RECORDING MEDIUM THEREOF

BACKGROUND OF THE INVENTION

1. Field of the Invention

The present invention generally relates to information processing apparatuses, client terminals, setting content changing methods, and computer-readable recording media thereof, and more particularly to an information processing apparatus, a client terminal, a setting content changing method, and a computer-readable recording medium, in which setting contents including at least one setting item can be changed.

2. Description of the Related Art

Recently, in a system to which one or more client terminals, an information processing apparatus, and a like are connected, setting contents stored in the information processing apparatus are frequently changed from the one or more client terminals or the information processing apparatus. Like this, since the setting contents are changed by an instruction of an operator operating the client terminal or information processing apparatus, a plurality of operators may change the setting contents at the same time. Moreover, when the setting contents are being used by an application operating in the information processing apparatus, the setting contents may be changed by the instruction from the operator operating the information processing apparatus or the client terminal. Furthermore, when the setting contents are being changed by the instruction from the information processing apparatus or the client terminal, the setting contents may be used by the application operating in the information processing apparatus.

Accordingly, a conventional information processing apparatus has a lock state which disables other operators and the application to refer to or change the setting contents while one operator changes the setting contents.

Moreover, as an example of the information processing apparatus, an image processing apparatus accommodates functions of a printer, a copier, a facsimile, and a scanner in a single chassis. The image processing apparatus includes a display part, a printing part, an imaging part, and a like in the single chassis. In addition, the image processing apparatus includes four types of software corresponding to the printer, the copier, the facsimile, and the scanner, and operates as the printer, the copier, the facsimile, and the scanner by switching the type of the software. For example, Japanese Laid-open Patent Application No. 2002-84383 discloses one example of the image processing apparatus as described above.

In the image processing apparatus as described above, for example, each function of the printer, the copier, the facsimile, and the scanner is a management subject by the setting contents. That is, the setting contents are set for each management subject. Similarly, in the information processing apparatus, each function realized by executing one or more programs is the management subject by the setting contents, and the setting contents are set for each management subject.

Conventionally, in the information processing apparatus and image processing apparatus, a setting part for processing a request (of changing and referring to the setting contents) with respect to the setting contents. That is, in a case of changing the setting contents of one management subject from the client terminal, the client terminal establishes a session with the setting part of the management subject to change the setting contents, transits to the lock state, and changes the setting contents of the management subject by instructing the setting part to change the setting contents.

In the conventional information processing apparatus and image processing apparatus, the setting contents of a plurality of management subjects are successively changed. In the conventional information processing and image processing apparatus, generally, a change authority of the setting contents is set for each management subject. Thus, in the conventional information processing apparatus and image processing apparatus, when the setting contents of the plurality of the management subjects are successively changed, there is a case in that operations having the change authority of the setting contents are different from each other.

In this case, the client terminal establishes a session with the setting part of a first management subject to change the setting contents, transits to the lock state, and changes the setting contents of the first management subject by instructing the setting part to change the setting contents. Next, the client terminal releases the lock, releases the session with the setting part of the first management subject which setting contents are changed, establishes a session with the setting part of a next management subject to change the setting contents, transits the lock state, and changes the setting contents of the next management subject by instructing the setting part to change the setting contents.

That is, in the conventional information processing apparatus and image processing apparatus, there is a time period to release the lock during a time from a change of the setting contents of the first management subject to a change of the setting contents of the next management subject, and another operator and the application may conduct a request with respect to the setting contents. Thus, there is a problem in a case of changing the setting contents of the plurality of the management subjects in the conventional information processing apparatus and image processing apparatus.

Similarly, recently, in a system to which one or more client terminals, an information processing apparatus, and a like are connected, address book data stored in the information processing apparatus are frequently changed from the one or more client terminals or the information processing apparatus. The address book data are one example of the setting contents.

Like this, since the address book data are changed by an instruction of an operator operating the client terminal or information processing apparatus, a plurality of operators may change the address book data at the same time. Moreover, when the address book data are being used by an application operating in the information processing apparatus, the address book data may be changed by the instruction from the operator operating the information processing apparatus or the client terminal. Furthermore, when the address book data are being changed by the instruction from the information processing apparatus or the client terminal, the address book data may be used by the application operating in the information processing apparatus.

Accordingly, a conventional information processing apparatus has a lock state which disables other operators and the application to refer to or change the address book data while one operator changes the setting contents.

The address book data includes data such as contents such as an e-mail address for an e-mail transmission to open to the public (hereinafter, called regular data), data such as a password personally used by a user (hereinafter, called personal data), and data such as account data (hereinafter, called management data) that an administrator uses. From a viewpoint of data protection, an acceptable subject is different for each of the regular data, the personal data, and the management data configuring the address book data. For example, a regular user and an administrator can access the regular data. The regular user can access the personal data. The administrator can access the management data.

Moreover, as an example of the information processing apparatus, an image processing apparatus accommodates functions of a printer, a copier, a facsimile, and a scanner in a single chassis. The image processing apparatus includes a display part, a printing part, an imaging part, and a like in the single chassis. In addition, the image processing apparatus includes four types of software corresponding to the printer, the copier, the facsimile, and the scanner, and operates as the printer, the copier, the facsimile, and the scanner by switching the type of the software. For example, Japanese Laid-open Patent Application No. 2002-84383 discloses one example of the image processing apparatus as described above. In the image processing apparatus as described above, for example, functions such as the facsimile, the scanner, and the like use the address book data.

Conventionally, in the information processing apparatus and image processing apparatus, a setting part for processing a request (of changing and referring to the contents) with respect to the address book data. For example, in a case of changing the address book data from the client terminal, the client terminal establishes a session with the setting part for processing the request with respect to the address book data, transits to the lock state, and changes the address book data by instructing the setting part to change the address book data.

In the conventional information processing apparatus and image processing apparatus, the setting contents of the regular data, the personal data, and the management data are successively changed. In the conventional information processing and image processing apparatus, generally, an addressable subject is different for each of the regular data, the personal data, and the management data. Thus, in the conventional information processing apparatus and image processing apparatus, when the setting contents of the regular data, the personal data, and the management data are successively changed, there is a case in that operations having the change authority of the setting contents are different for each of the regular data, the personal data, and the management data.

In this case, the client terminal establishes a session with the setting part for processing a request with respect to the address book data based on the change authority of the regular data, transits to the lock state, and changes the setting contents of the regular data by instructing the setting part. Next, the client terminal releases the lock and the session, transits to the lock, and changes the setting contents of the personal data or the manager data by instructing the setting part.

That is, in the conventional information processing apparatus and image processing apparatus, there is a time period to release the lock during a time from a change of the setting contents of the regular data or the like, which forms the address book data, to a change of the setting contents of the personal data or the like, and another operator and the application may conduct a request with respect to the setting contents of the address book data. Thus, there is a problem in a case of successively changing the setting contents of the regular data, the personal data, and the management data in the conventional information processing apparatus and image processing apparatus.

SUMMARY OF THE INVENTION

It is a general object of the present invention to provide information processing apparatuses, client terminals, setting content changing methods, and computer-readable recording media thereof in which the above-mentioned problems are eliminated.

A more specific object of the present invention is to provide an information processing apparatus, a client terminal, a setting content changing method, and a computer-readable recording medium thereof, in which the setting contents including a plurality of setting items can be changed in a successive sequence of processes and a request for the setting contents from others can be excluded while the setting contents are being changed.

The above objects of the present invention are achieved by an information processing apparatus capable of changing setting contents including at least one setting item in response to a setting request from at least one client terminal connecting to said information processing apparatus through a network or an input unit of said information processing apparatus, including: a plurality of the setting device managing parts, each setting device managing part having an occupied state in that the setting item cannot be referred to or changed and a settable state in that the setting item can be referred to or changed, and referring to or changing the setting item in the settable state; and a main device managing part managing the occupied state and the settable state of the setting device managing part, and transiting the settable state in that a plurality of setting device managing parts cannot transit at the same time, from one setting device managing part to another setting device managing part.

The above objects of the present invention are achieved by an information processing apparatus capable of changing setting contents including at least one or more setting items in response to a setting request from at least one client terminal connecting to said information processing apparatus through a network or an input unit of said information processing apparatus, including: a setting information managing part including the setting items classified into a plurality of groups, having an occupied state in that the setting items cannot be referred to or changed and the settable state in that the setting items can be referred to or changed for each of the groups, and referring to or changing the setting items in a case of the settable state; and a main information managing part managing the occupied state and the settable state for each of the groups, transferring the settable state in that the groups cannot be transit at the same time, from one group to another group.

BRIEF DESCRIPTION OF THE DRAWINGS

In the following, embodiments of the present invention will be described with reference to the accompanying drawings.

FIG. 4 is a diagram showing one example of a correspondence showing a relationship between each of setting device management services and setting items included in the setting contents;

FIG. 15 is a diagram showing one example of a request SOAP message sent from a client terminal to a WSF device management service as a session start request in step S10 in FIG. 5, according to the first embodiment of the present invention;

FIG. 16 is a diagram showing one example of a response SOAP message sent from the WSF device management service to the client terminal as a response for a session start request in step S14 in FIG. 5, according to the first embodiment of the present invention;

FIG. 17 is a diagram showing one example of a request SOAP message sent from the client terminal to the WSF device management service as an entire device lock start request in step S15 in FIG. 5, according to the first embodiment of the present invention;

FIG. 18 is a diagram showing one example of a response SOAP message sent from the WSF device management service to the client terminal as a response for an entire device start request in step S21 in FIG. 5, according to the first embodiment of the present invention;

FIG. 19 is a diagram showing one example of a request SOAP message sent from the client terminal to the WSF device management service as a property setting request in step S23 in FIG. 6, according to the first embodiment of the present invention;

FIG. 20 is a diagram showing one example of a response SOAP message sent from the WSF device management service to the client terminal as a response for a property setting request in step S26 in FIG. 6, according to the first embodiment of the present invention;

FIG. 21 is a diagram showing one example of a request SOAP message sent from the client terminal to the WSF device management service as a lock authority release request in step S27 in FIG. 6, according to the first embodiment of the present invention;

FIG. 22 is a diagram showing one example a response SOAP message sent from the WSF device management service to the client terminal as a response for a lock authority release request in step S31 in FIG. 6, according to the first embodiment of the present invention;

FIG. 23 is a diagram showing one example of a request SOAP message sent from the client terminal to the WSF device management service as a session end request in step S32 in FIG. 6, according to the first embodiment of the present invention;

FIG. 24 is a diagram showing one example of a response SOAP message sent from the WSF device management service to the client terminal as a response of a session end request in step S35 in FIG. 6, according to the first embodiment of the present invention;

FIG. 25 is a diagram showing one example of a request SOAP message sent from the client terminal to the WSF device management service as a lock authority inherit request in step S40 in FIG. 6, according to the first embodiment of the present invention;

FIG. 26 is a diagram showing one example of a response SOAP message sent from the WSF device management service to the client terminal as a response for a lock authority inherit request in step S45 in FIG. 6, according to the first embodiment of the present invention;

FIG. 27 is a diagram showing one example of a request SOAP message sent from the client terminal to the WSF device management service as a lock release request in step S50 in FIG. 7, according to the first embodiment of the present invention;

FIG. 28 is a diagram showing a response SOAP message sent from the WSF device management service to the client terminal as a response for a lock release request in step S54 in FIG. 7, according to the first embodiment of the present invention;

FIG. 31 is a diagram showing one example of a request SOAP message sent from the client terminal to the WSF device management service as the session/lock authority change request in step S116 in FIG. 30, according to the second embodiment of the present invention;

FIG. 32 is a diagram showing one example of a response SOAP message sent from the WSF device management service to the client terminal as a response of the session/lock authority change request in step S127 in FIG. 30, according to the second embodiment of the present invention;

FIG. 36 is a diagram showing one example of a request SOAP message sent from the client terminal to the WSF device management service as the session start request in step S199 in FIG. 33, according to the third embodiment of the present invention;

FIG. 39 is a diagram showing one example of a request SOAP message sent from the client terminal to the WSF device management service as the session start request in step S299 in FIG. 37, according to the fourth embodiment of the present invention;

FIG. 43 is a diagram showing one example of a request SOAP message sent from the client terminal to the WSF device management service as the lock authority inherit request instep S430 in FIG. 41, according to the fifth embodiment of the present invention;

FIG. 51 is a diagram showing one example of a response SOAP message sent form the WSF device management service to the client terminal as the response with respect to the lock authority release request in step S621 in FIG. 49, according to the seventh embodiment of the present invention;

FIG. 52 is a diagram showing one example of a request SOAP message sent from the client terminal to the WSF device management service as the lock authority inherit request in step S630 in FIG. 49, according to the seventh embodiment of the present invention;

FIG. 53 is a diagram showing combinations of data included in the session start request and data included in the response with respect to the session start request according to the present invention;

FIG. 67 is a diagram showing one example of a request SOAP message sent from the client terminal to the WSF address book management service as the session start request in step S4010 in FIG. 56, according to the eighth embodiment of the present invention;

FIG. 68 is a diagram showing one example of a response SOAP message sent from the WSF address book management service to the client terminal as a response for the session start request in step S4014 in FIG. 56, according to the eighth embodiment of the present invention;

FIG. 69 is a diagram showing one example of a request SOAP message sent from the client terminal to the WSF address book management service as the address book lock start request in step S4015 in FIG. 56, according to the eighth embodiment of the present invention;

FIG. 70 is a diagram showing one example of a response SOAP message sent from the WSF address book management service to the client terminal as a response for the address book lock start request in step S4021 in FIG. 57, according to the eighth embodiment of the present invention;

FIG. 71 is a diagram showing one example of a request SOAP message sent from the client terminal to the WSF address book management service as the property setting request in step S4020 in FIG. 57, according to the eighth embodiment of the present invention;

FIG. 72 is a diagram showing one example of a response SOAP message sent from the WSF address book management service to the client terminal as a response for the property setting request in step S4023 in FIG. 57, according to the eighth embodiment of the present invention;

FIG. 73 is a diagram showing one example of a request SOAP message sent from the client terminal to the WSF address book management service as the lock authority release request in step S4024 in FIG. 57, according to the eighth embodiment of the present invention;

FIG. 74 is a diagram showing one example a response SOAP message sent from the WSF address book management service to the client terminal as a response for the lock authority release request in step S4027 In FIG. 57, according to the eighth embodiment of the present invention;

FIG. 75 is a diagram showing one example of a request SOAP message sent from the client terminal to the WSF address book management service as the session end request in step S4028 in FIG. 57, according to the eighth embodiment of the present invention;

FIG. 76 is a diagram showing one example of a response SOAP message sent from the WSF address book management service to the client terminal as a response of the session end request in step S4031 in FIG. 57, according to the eighth embodiment of the present invention;

FIG. 77 is a diagram showing one example of a request SOAP message sent from the client terminal to the WSF address book management service as the lock authority inherit request in step S4036 in FIG. 57, according to the eighth embodiment of the present invention;

FIG. 78 is a diagram showing one example of a response SOAP message sent from the WSF address book management service to the client terminal as a response for the lock authority inherit request in step S4040 in FIG. 57, according to the eighth embodiment of the present invention;

FIG. 79 is a diagram showing one example of a request SOAP message sent from the client terminal to the WSF address book management service as the lock release request in step S4045 in FIG. 58, according to the eighth embodiment of the present invention;

FIG. 80 is a diagram showing a response SOAP message sent from the WSF address book management service to the client terminal as a response for the lock release request in step S4049 in FIG. 58, according to the eighth embodiment of the present invention;

FIG. 84 is a diagram showing one example of a request SOAP message sent from the client terminal to the WSF address book management service as the session/lock authority change request in step S4114 in FIG. 82, according to the ninth embodiment of the present invention;

FIG. 85 is a diagram showing one example of a response SOAP message sent from the WSF address book management service to the client terminal as a response of the session/lock authority change request in step S4123 in FIG. 82, according to the ninth embodiment of the present invention;

FIG. 89 is a diagram showing one example of a request SOAP message sent from the client terminal to the WSF address book management service as the session start request in step S4200 in FIG. 86, according to the tenth embodiment of the present invention;

FIG. 90 is a diagram showing one example of a request SOAP message sent from the client terminal to the WSF address book management service as the address book lock start request in step S4209 in FIG. 86, according to the tenth embodiment of the present invention;

FIG. 93 is a diagram showing one example of a request SOAP message sent from the client terminal to the WSF device management service as the session start request in step S4300 in FIG. 91, according to the eleventh embodiment of the present invention;

FIG. 97 is a diagram showing one example of a request SOAP message sent from the client terminal to the WSF device management service as the lock authority inherit request instep S4426 in FIG. 95, according to the twelfth embodiment of the present invention;

FIG. 101 is a diagram showing one example of a response SOAP message sent form the WSF device management service to the client terminal as the response with respect to the lock authority release request in step S4512 FIG. 98, according to the thirteenth embodiment of the present invention;

FIG. 102 is a diagram showing one example of a request SOAP message sent from the client terminal to the WSF address book management service as the lock authority inherit request in step S4526 in FIG. 99, according to the thirteenth embodiment of the present invention; and FIG. 103 is a diagram showing combinations of data included in the session start request and data included in the response with respect to the session start request, according to the present invention.

DESCRIPTION OF THE PREFERRED EMBODIMENTS

In the following, an embodiment of the present invention will be described with reference to the accompanying drawings. In the following embodiments, an image processing apparatus will be described as one example but any information processing apparatus in which the setting contents including a plurality of setting items can be remotely changed from a client terminal. Also, the setting contents set for each management subject will be described as one example in the following embodiments but any information including the plurality of the setting items can be applied.

Figure 1:
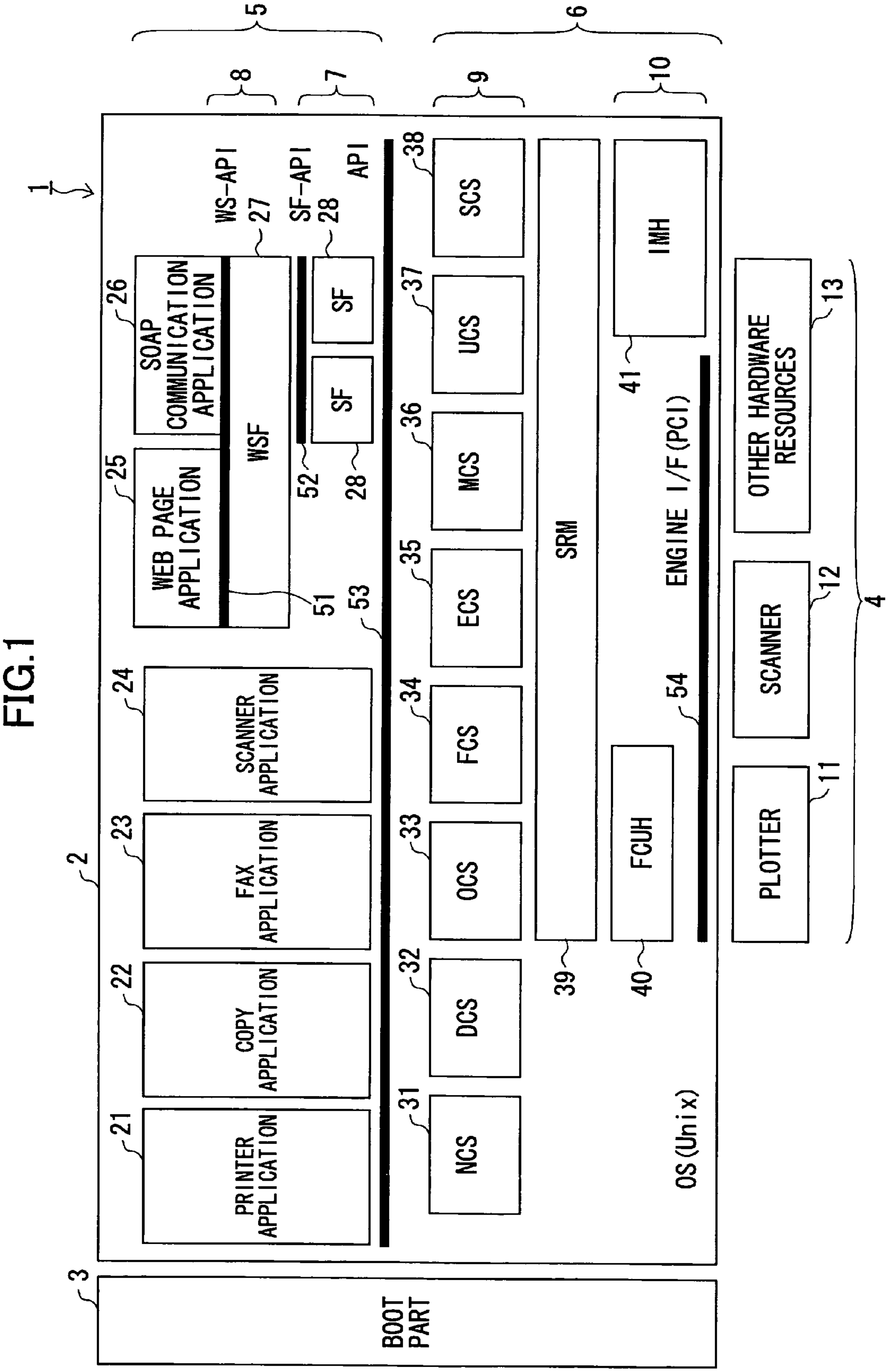
FIG. 1 is a block diagram showing an example of a configuration of an image processing apparatus according to the present invention.

FIG. 1 is a block diagram showing an example of a configuration of an image processing apparatus according to the present invention. An image processing apparatus 1 includes a software group 2, a boot part 3, and hardware resources 4.

The boot part 3 is executed first when the image processing apparatus 1 is turned on, and an application layer 5 and a platform 6 are activated. For example, the boot part 3 reads out programs for the application layer 5 and the platform 6 from a hard disk device (hereinafter, called HDD), transfers each of the programs being read out to a memory area, and activates each of the programs.

The hardware resources 4 includes other hardware resources 13 such as a plotter 11, a scanner 12, a facsimile, and a like. The software group 2 includes the application layer 5 and the platform 6 being activated on an operating system (hereinafter, called OS) such as UNIX™. The application layer 5 includes programs for conducting special processes for each user service concerning to image formation such as a printer, a copier, a facsimile, a scanner, and a like.

The application layer 5 includes a printer application 21, a copy application 22, a facsimile application 23, a scanner application 24, a WEB page application 25, a simple object access protocol (hereinafter, called SOAP) communication application 26, a common function layer 7, and a Web service layer 8.

The common function layer 7 includes one or more common functions (hereinafter, called SF) 28. The Web service layer 8 includes a WEB service function (hereinafter, called WSF) 27 provided between the WEB page application 25 and the SOAP communication application 26 and one or more the SFs 28.

The WSF 27 includes an application program interface (hereinafter, called WS-API) 51 that enables to receive a process request from the WEB page application 25 or the SOAP communication application 26 by a function that is defined beforehand. Also, each of the SFs 28 includes an SF-API 52 that enables to receive the process request from the WSF 27 by a function that is defined beforehand.

When the WSF 27 receives the process request from the WEB page application 25 or the SOAP communication application 26 through the WS-API 51, the WSF 27 selects one of the SFs 28 in response to the process request. The WSF 27 sends the process request received through the WS-API 51, to the SF 28 selected corresponding to the process request through the WS-API 52. When the SF 28 receives the process request through the WS-API 52, the SF 28 conducts a process in response to the process request.

The platform 6 includes a control service layer 9 for supplying a system resource manager (hereinafter, SRM) 39 an acquisition request of the hardware resources 4 by interpreting the process request from the application layer 5, the SRM 39 for mediating the acquisition request from the control service layer 9 by managing one or more hardware resources 4, and a handler layer 10 for managing the hardware resources 4 in response to the acquisition request from the SRM 39. The platform 6 includes an API 53 that enables to receive the process request from the application layer 5 by a function that is defined beforehand. The OS executes software of the application layer 5 and the platform 6 as processes in parallel.

The control service layer 9 includes one or more service modules such as an NCS (Network Control Service) 31, a DCS (Delivery Control Service) 32, an OCS (Operation panel Control Service) 33, a FCS (FAX Control Service) 34, an ECS (Engine Control Service) 35, an MCS (Memory Control Service) 36, an UCS (User information Control Service) 37, and an SCS (System Control Service) 38.

A process of the NCS 31 intermediates to distribute data received by each protocol from a network to each application, or intermediates to send data from each application to the network. For example, the NCS 31 controls a data communication with a network device connected to the image processing apparatus 1 through the network.

A process of the DCS 32 controls to distribute document data being accumulated in the image processing apparatus 1. A process of the OCS 33 controls an operation panel (that will be described later).

A process of the FCS 34 provides an API to send and receive by fax using a PSTN (Public Switched Telephone Networks) or ISDN (Integrated Services Digital Network) from the application layer 5, to register or refer to various fax data managed in a memory for a backup, to read out the fax data, to print a record of fax receive, and a like.

A process of the ECS 35 controls an engine part such as the plotter 11, the scanner 12, the hardware resource 13, and the like. A process of the MCS 36 controls to obtain or release the memory, to use the HDD, to compress and decompress image data, and a like. A process of the UCS 37 manages user information.

A process of the SCS 38 controls an operation part, to display a system screen, to display an LED (Light Emitting Diode), to manage hardware resources, to manage each application, and to interrupt the application.

A process of the SRM 39 controls a system with the SCS 38 and manages the hardware resources 4. For example, the process of the SRM 39 intermediates according to the acquisition request from an upper layer using the hardware resources 4 such as the plotter 11, the scanner 12, and the like, and controls to execute the hardware resources 4.

In detail, the process of the SRM 39 determines whether or not the hardware resources 4, to which the acquisition request is conducted, are available. When the hardware resources 4 are available for the acquisition request, the process of the SRM 39 informs the upper layer that the hardware resources 4, to which the acquisition request is conducted, are available. The process of the SRM 39 schedules to use the hardware resources 4 with respect to the acquisition request received from the upper layer, and directly conducts request contents (an imaging operation and a paper feed by a printer engine, a memory acquisition, a file creation, and a like).

Also, a handler layer 10 includes an FCUH (FAX Control Unit Handler) 40 for managing an FCU (FAX Control Unit) (that will be described later), an IMH (Image Memory Handler) 41 for assigning the memory to a process and managing the memory assigned to the process. The SRM 39 and the FCUH 40 conduct a process request to the hardware resources 4 by using an engine I/F (InterFace) 54 to send the process request to the hardware resources 4 by a function that is defined beforehand.

In the configuration in FIG. 1, the image processing apparatus 1 can consolidate and process processes necessary in common among the applications in the platform 6. Next, hardware configuration of the image processing apparatus 1 will be described.

Figure 2:
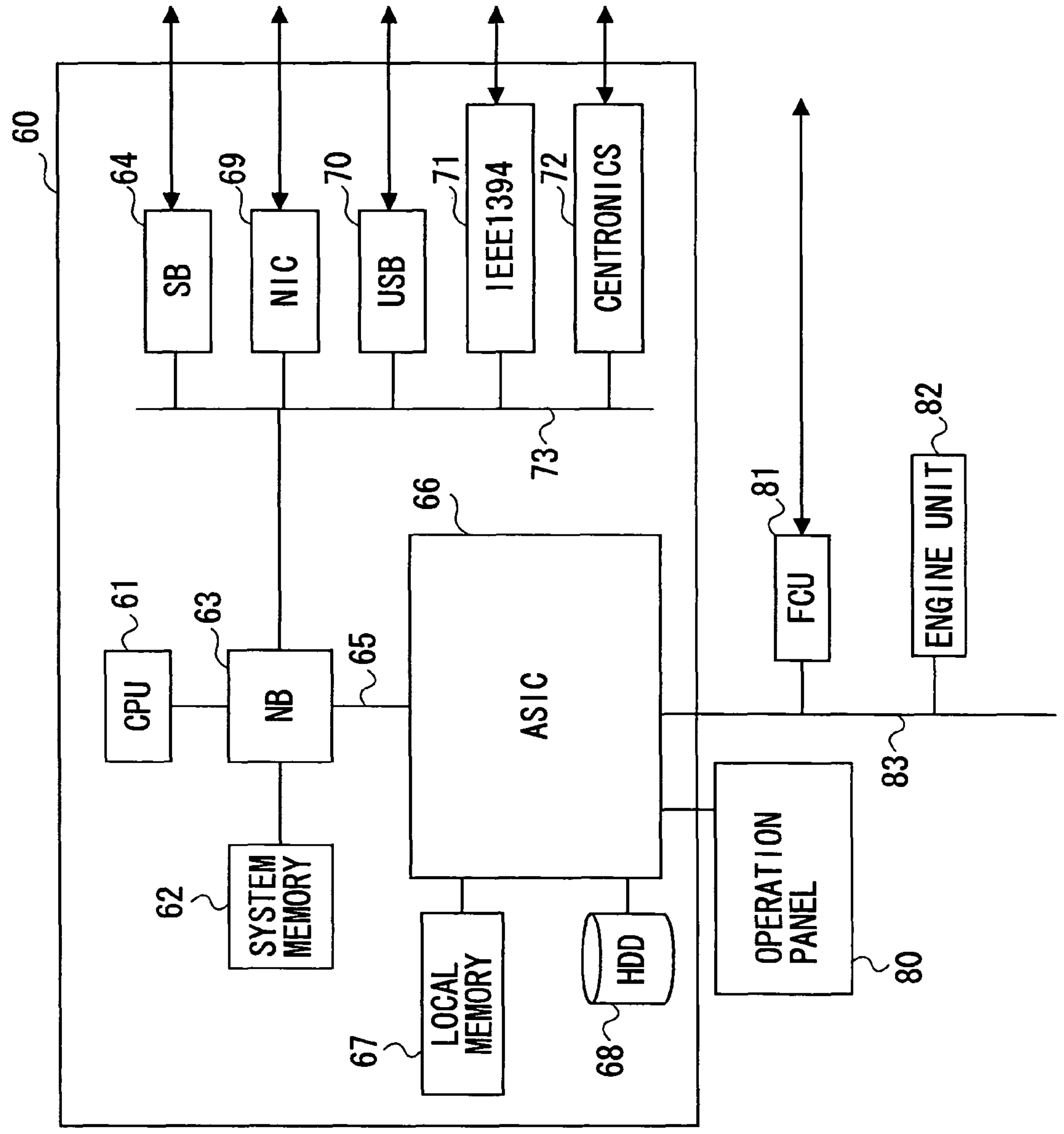
FIG. 2 is a block diagram showing hardware of the image processing apparatus according to the present invention.

FIG. 2 is a block diagram showing the hardware of the image processing apparatus according to the present invention. In FIG. 2, the image processing apparatus 1 includes a controller 60, the operation panel 80, the FCU 81, and an engine part 82.

The controller 60 includes a CPU (Central Processing Unit) 61, a system memory 52, an NB (North Bridge) 63, an SB (South Bridge) 64, an ASIC (Application Specific Integrated Circuit) 66, a local memory 67, the HDD (Hard Disk Device) 68, a NIC (Network Interface Card) 69, a USB (Universal Serial Bus) I/F (InterFace) 70, an IEEE 1394 I/F 71, and a centronics I/F 72.

The operation panel 80 is connected to the ASIC 66 of the controller 60. Also, the FCU 81 and the engine part 82 are connected to the ASIC 66 of the controller 60 through a PCI bus 83.

In the controller 60, the local memory 67 and the HDD 68 are connected to the ASIC 66, and the CPU 61 and the ASIC 66 are connected to each other through the NB 63 of a CPU chip set. The ASIC 66 and the NB 63 are connected to each other through an AGP (Accelerated Graphics Port) 65.

The CPU 61 controls the entire image processing apparatus 1. The CPU 61 activates the NCS 31, the DCS 32, the OCS 33, the FCS 34, the ECS 35, the MCS 36, the UCS 37, and the SCS 38 on the OS, and executes the printer application 21, the copy application 22, the fax application 23, the scanner application 24, the WEB page application 25, the SOAP communication application 26, the WSF 27, and the SFs 28.

The NB 63 is a bridge to connect the CPU 61, the system memory 62, the SB 64, the ASIC 66, the NIC 69, the USB I/F 70, the IEEE 1394 I/F 71, and the centronics I/F 72. The NB 63 connects the SB 64, the NIC 69, the USB I/F 70, the IEEE 1394 I/F 71, and the centronics I/F 72 through a PCI bus 73. The SB 64 is a bridge to connect the PCI bus 73 to a ROM (Random-Only Memory), a peripheral device, and a like.

The system memory 62 is a memory used as an image memory. The local memory 67 is a memory used as an image buffer for a copy, a coding buffer, or a like. The ASIC 66 is an IC (Integrated Circuit) for an image process including hardware element for the image process. Also, the HDD 68 is one example of a storage (auxiliary storage unit) for accumulating image data, document data, a program, font data, a form, and a like.

The NIC 69 is an interface device to connect the image processing apparatus 1 to a network such as the Internet, a LAN (Local Area Network), or a like. The USB I/F 70, the IEEE 1394 I/F 71, and the centronics I/F 72 are interfaces in conformity to relative standards. The operation panel 80 is an operation part that receives an input operation by an operator and also displays information for the operator.

The FCU 81 includes a memory for a backup. For example, the memory included in the FCU 81 temporarily stores facsimile data received when the image processing apparatus 1 is turned off.

Figure 3:
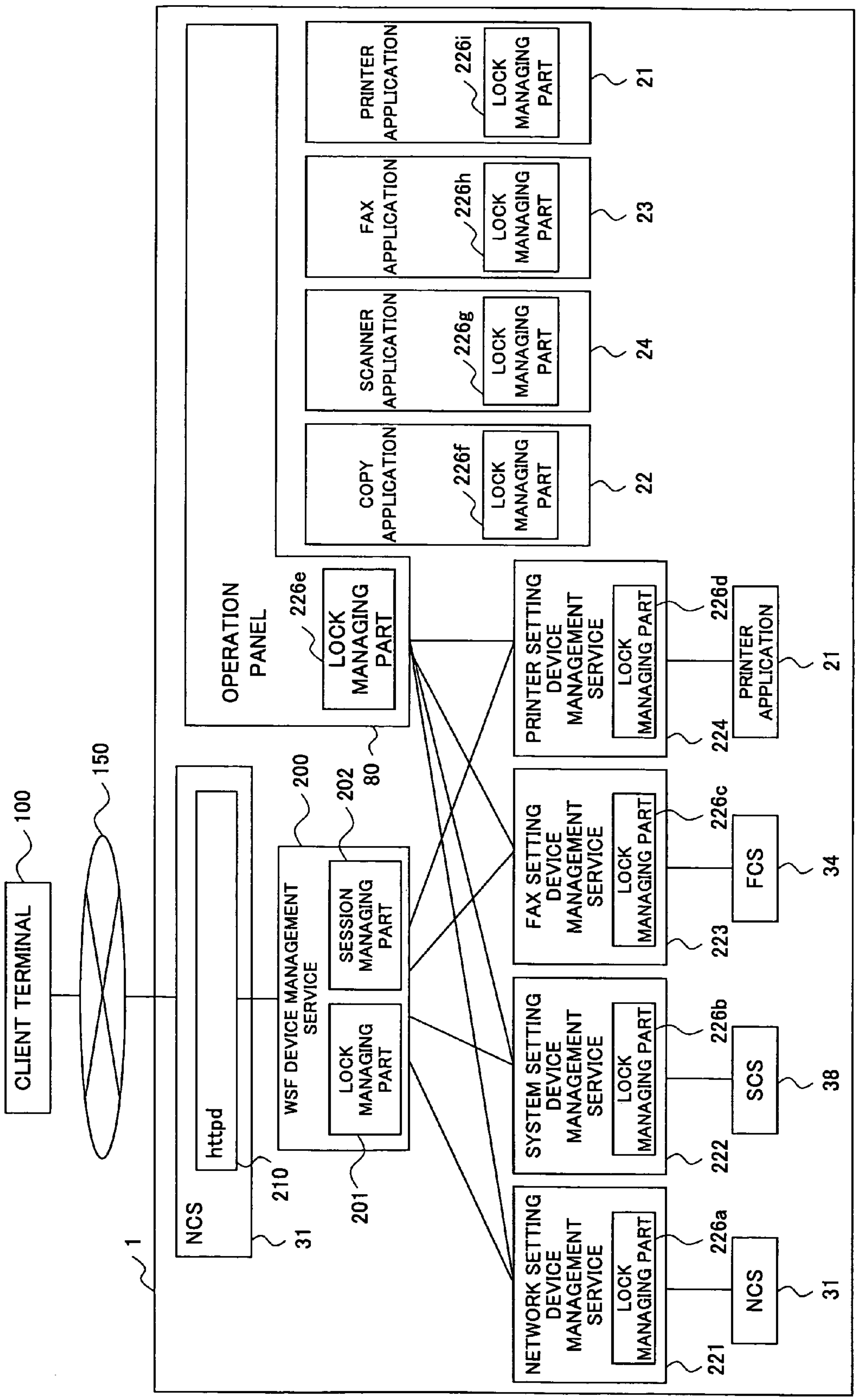
FIG. 3 is a block diagram showing a functional configuration of the image processing apparatus to explain a setting content changing method according to the present invention.

In the following, a setting content changing method realized by the image processing apparatus 1 will be described in reference to the accompanying drawings. FIG. 3 is a block diagram showing a functional configuration of the image processing apparatus to explain the setting content changing method according to the present invention. In the functional configuration shown in FIG. 3, functional parts that are not necessary to explain the setting content changing method will be omitted.

In the functional configuration in FIG. 3, the printer application 21, the copy application 22, the fax application 23, the scanner application 24, the NCS 31, the FCS 34, the SCS 38, the operation panel 80, a WSF device management service 200 as a main device managing part, a network setting device management service 221, a system setting device management service 222, a FAX setting device management service 223, and a printer setting device management service 224 are shown in the image processing apparatus 1. The network setting device management service 221, the system setting device management service 222, the FAX setting device management service 223, and the printer setting device management service 224 are illustrated as one example of a setting device managing part.

The image processing apparatus 1 is connected to a client terminal 100 through a network 150 such as the Internet, the LAN, or the like. In the image processing apparatus 1, various setting contents concerning the network, the system, the FAX, the printer, and the like are stored and the setting contents are referred to or changed remotely from the client terminal 100. Also, the setting contents concerning the network, the system, the FAX, the printer, and the like are referred to or changed by the operator operating the operation panel 80 provided at the image processing apparatus 1.

For example, the image processing apparatus 1 conducts a data exchange with the client terminal 100 in an XML (extensible Markup Language) form. For example, the image processing apparatus 1 and the client terminal 100 use a communication protocol, which is called SOAP (Simple Object Access Protocol) as a data access protocol.

In a case of referring to or change the setting contents remotely from the client terminal 100, the operator connects the client terminal 100 to the WSF device management service 200 through the network 150, and the NCS 31. For example, the NCS 31 controls the data communication with the client terminal 100 in accordance with a HTTP (HyperText Transfer Protocol) by an httpd (HyperText Transfer Protocol Daemon) 210.

The WSF device management service 200 includes a lock managing part 201, and a session managing part 202. The lock managing part 201 manages a state called a lock (lock state) in that the setting contents cannot be referred to and changed by other operators or any application (copy application 22) of the image processing apparatus 1 while one operator is referring to or changing the setting contents. As described later, the lock (lock state) includes an occupied state in that the setting contents are occupied (used) and cannot be referred to and changed, and a settable state in that the setting contents are occupied but can be referred to or changed.

The session managing part 202 manages each session that is established with each of various setting device management services (system setting device management service 222 and the like) as a management subject corresponding to the setting contents to refer to or change. The WSF device management service 200 makes a correspondence between the lock and the session by using the lock managing part 201 and the session managing part 202. For example, the WSF device management service 200 is realized as one function of the WSF 27 shown in FIG. 1.

The network setting device management service 221 conducts a process concerning a change or a reference of the setting contents managed by the NCS 31. The system setting device management service 222 conducts a process concerning a change or a reference of the setting contents managed by the SCS 38. The FAX setting device management service 223 conducts a process concerning a change or a reference of the setting contents managed by the FCS 34. Also, the printer setting device management service 224 conducts a process concerning a change or a reference of the setting contents managed by the printer application 21. For example, the network setting device management service 221, the system setting device management service 222, the FAX setting device management service 223, and the printer setting device management service 224 are realized as the SF 28 shown in FIG. 1.

In the image processing apparatus 1 shown in FIG. 3, the network setting device management service 221, the system setting device management service 222, the FAX setting device management service 223, the printer setting device management service 224, the operation panel 80, the copy application 22, the scanner application 24, the FAX application 23, and the printer application 21 include lock managing parts 226*a* through 226*i*, respectively, and conduct respective processes corresponding to the lock state, which will be described later.

FIG. 4 is a diagram showing one example of a correspondence showing a relationship between each of setting device management services and setting items included in the setting contents. In FIG. 4, for example, the setting contents for the process concerning the change or the reference by the network setting device management service 221 include setting items such as IP address of device, gateway, available protocol, host name, domain name, and a like.

First Embodiment

Figure 5:
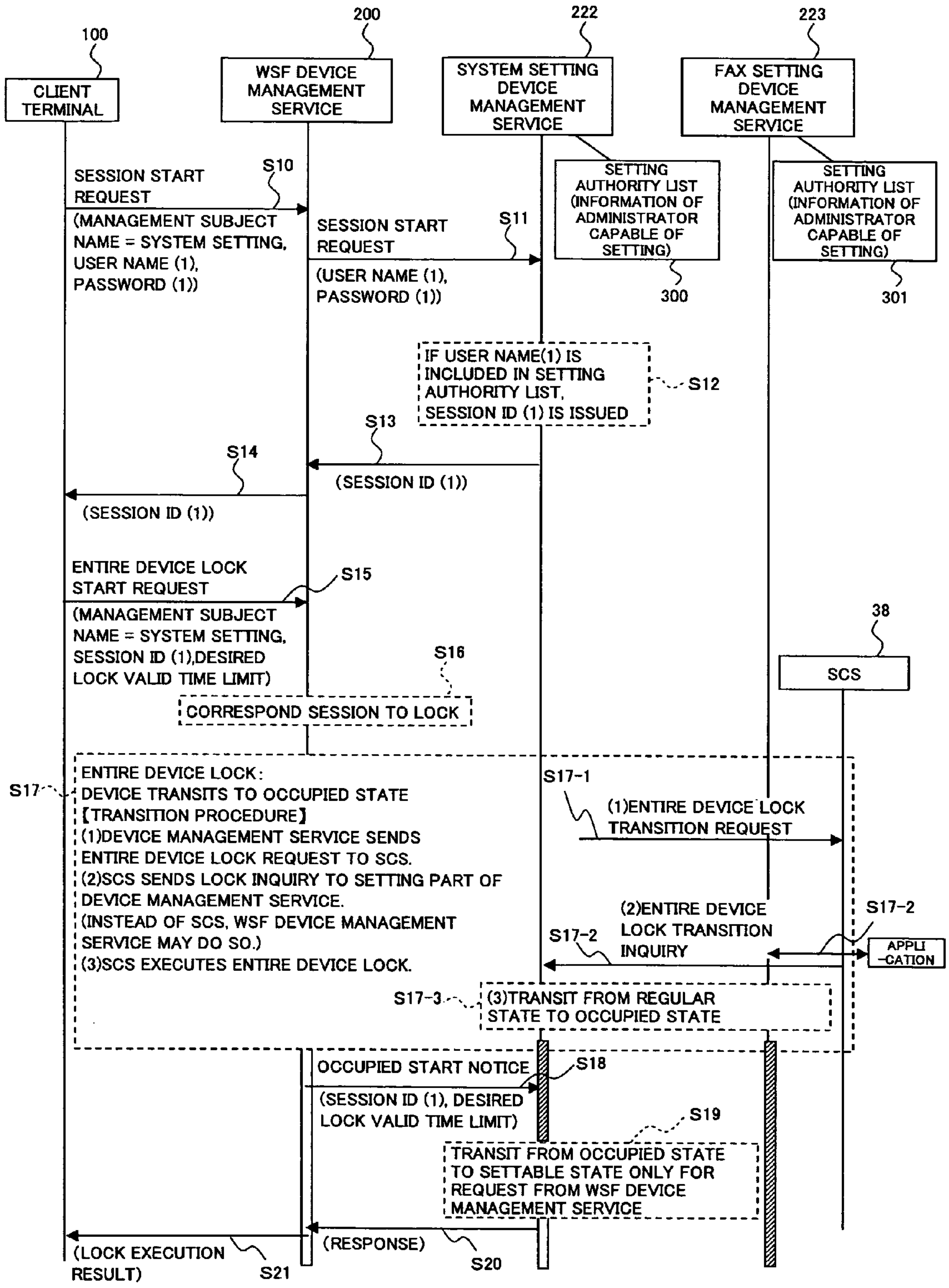
FIG. 5 is a flowchart for explaining a setting content changing process according to a first embodiment of the present invention.
Figure 6:
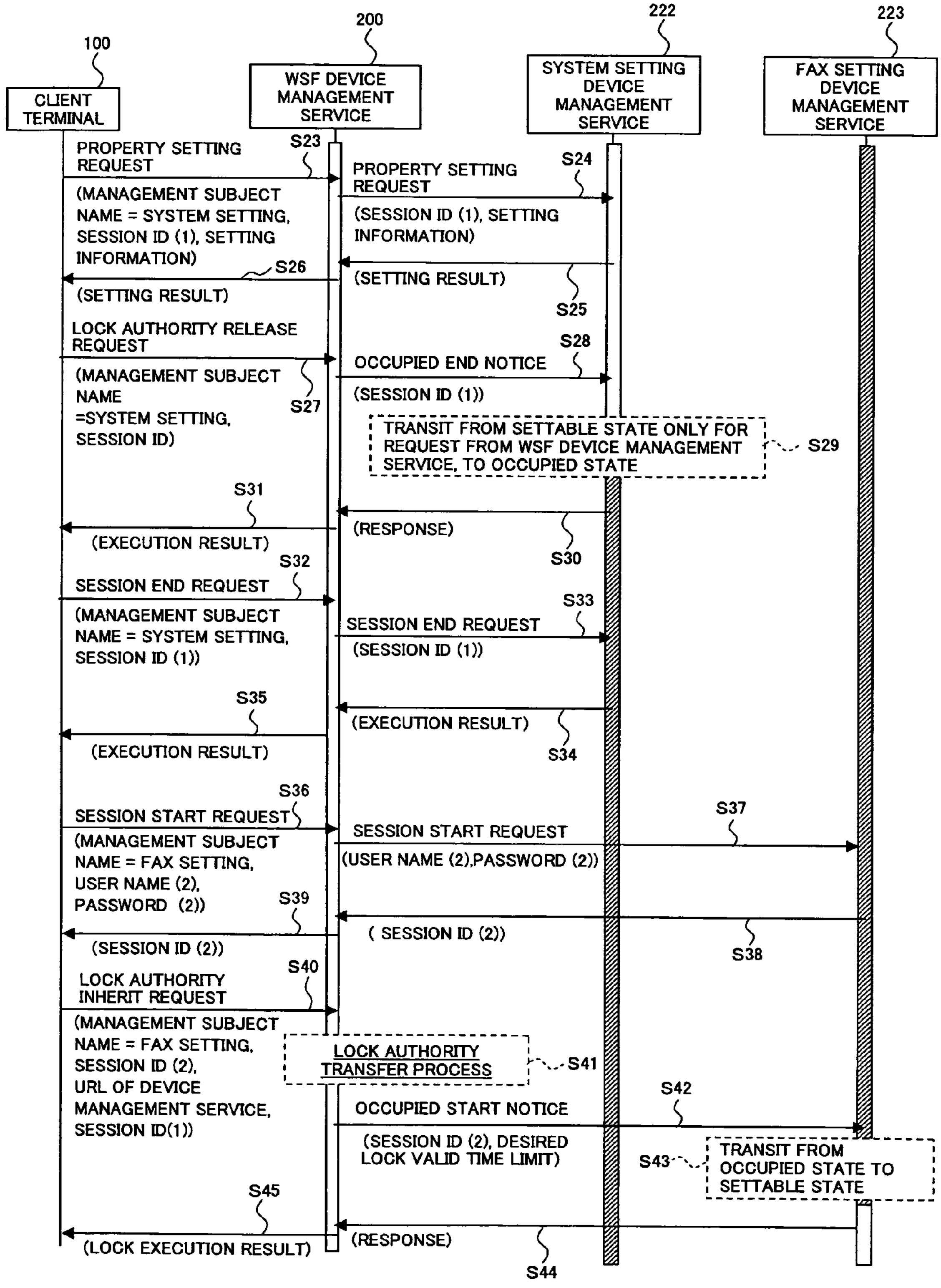
FIG. 6 is a flowchart for explaining the setting content changing process according to the first embodiment of the present invention.
Figure 7:
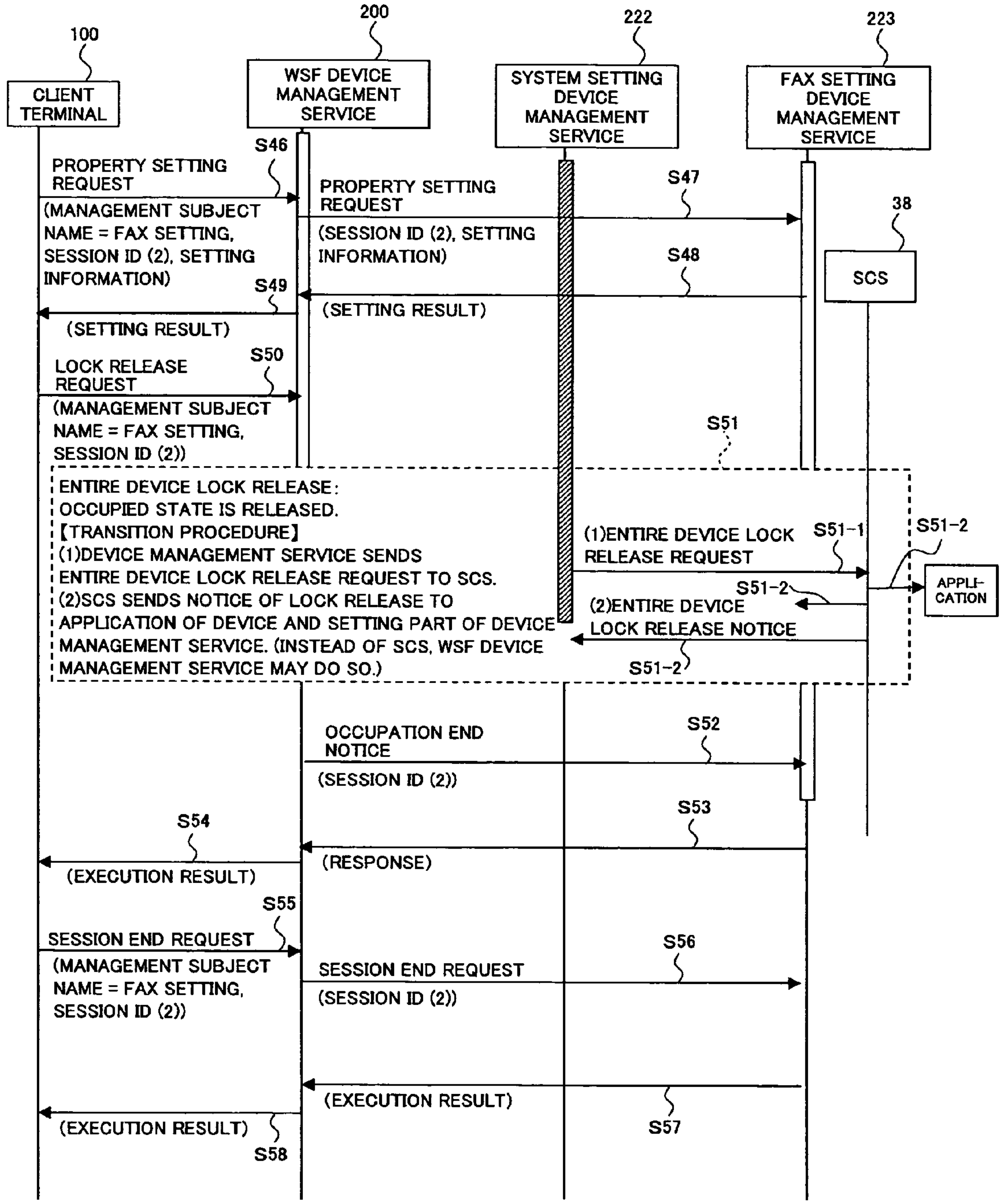
FIG. 7 is a flowchart for explaining the setting content changing process according to the first embodiment of the present invention.

Next, the process conducted by the image processing apparatus 1 in FIG. 3 will be described with reference to flowcharts. FIG. 5, FIG. 6, and FIG. 7 are flowcharts for explaining a setting content changing process according to a first embodiment of the present invention.

Figure 8:
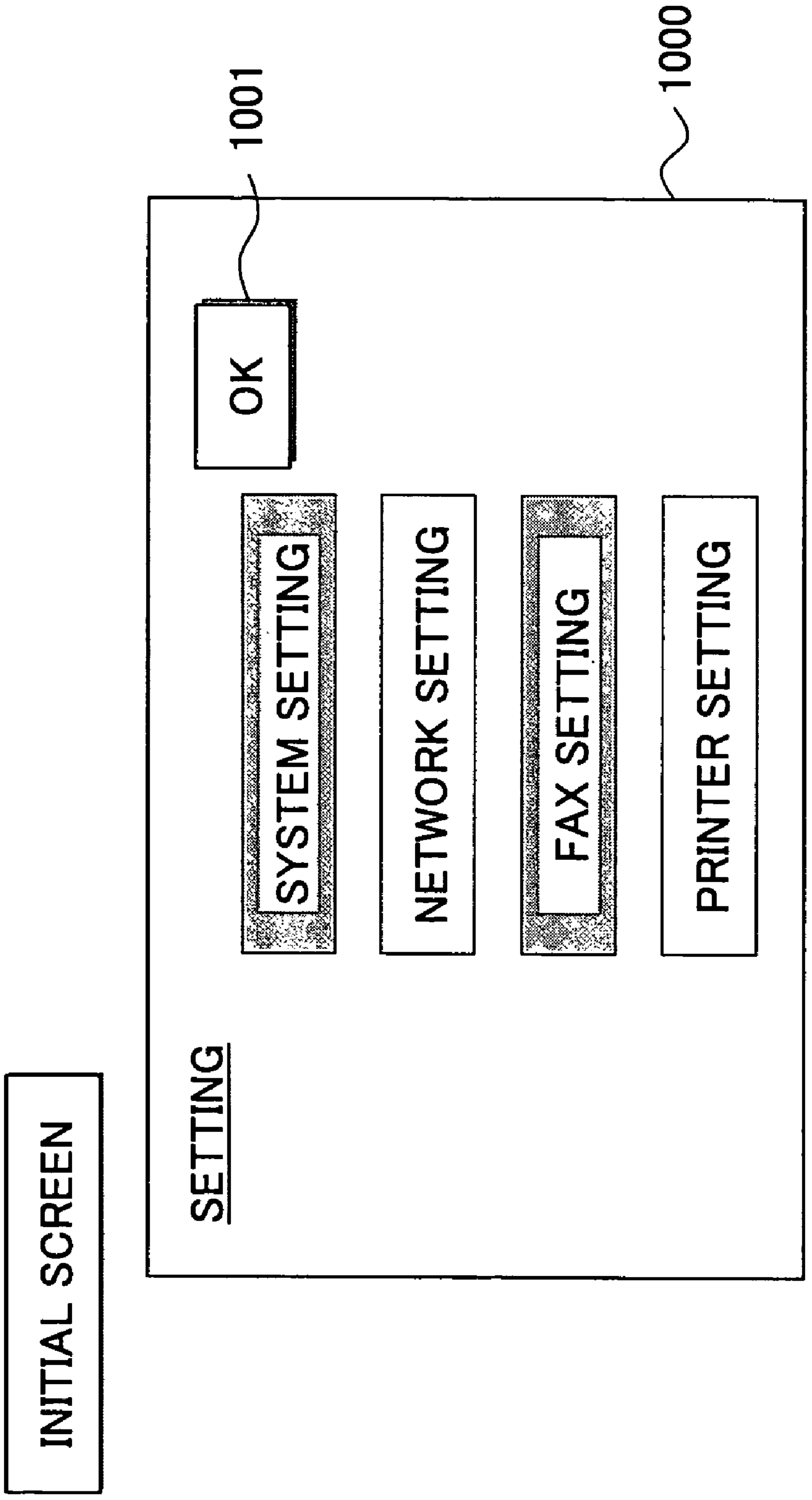
FIG. 8 is a diagram illustrating one example of an initial screen according to the first embodiment of the present invention.

In a case of remotely referring to or changing the setting contents stored in the image processing apparatus 1 from the client terminal 100, the operator (hereinafter, called administrator) operates the client terminal 100 and requests to display an initial screen 1000 as shown in FIG. 8. The client terminal 100 displays the initial screen 1000 as shown in FIG. 8 at a display unit. Screen data of the initial screen 1000 may be stored in the client terminal 100 beforehand, or obtained from the image processing apparatus 1.

Figure 9:
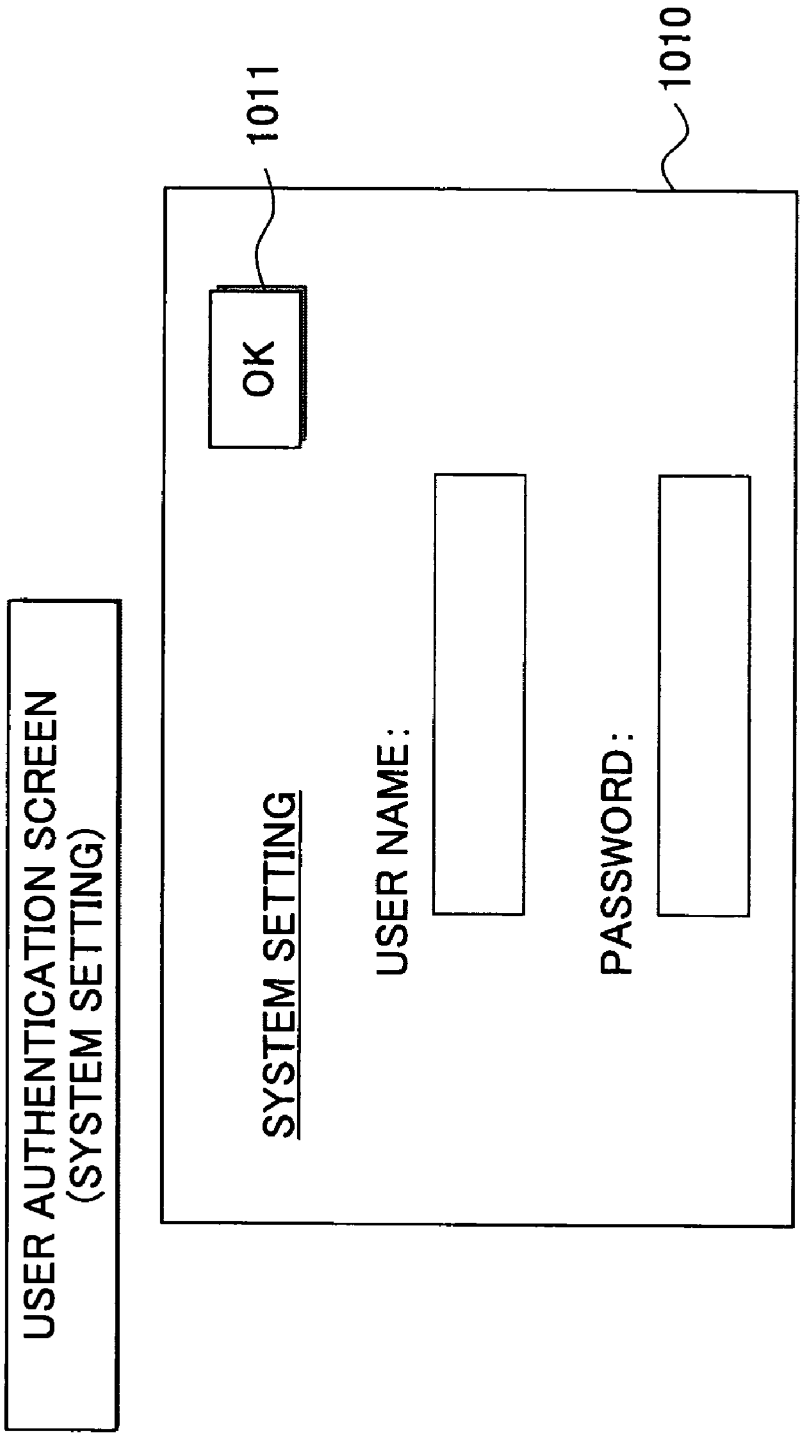
FIG. 9 is a diagram illustrating one example of a user authentication screen according to the first embodiment of the present invention.

FIG. 8 is a diagram illustrating one example of the initial screen. The administrator selects a type (management subject name) of the setting contents to refer to or change, and presses an OK button 1001. In the initial screen 1000 in FIG. 8, a system setting and a FAX setting are selected. When the administrator presses the OK button 1001, the client terminal 100 displays a user authentication screen 1010 as shown in FIG. 9. Screen data of the user authentication screen 1010 may be stored in the client terminal 100 beforehand, or obtained from the image processing apparatus 1.

FIG. 9 is a diagram illustrating one example of the user authentication screen. The administrator inputs a user name and a password, and presses an OK button 1011. When the administrator presses the OK button 1011, the setting content changing process advances to step S10. In step S10, the client terminal 100 sends a session start request to the WSF device management service 200 through the NCS 31.

The session start request in step S10 includes a management subject name “system setting”, the user name, and the password. The user name in step S10 indicates an administrator having an authority of the system setting.

The setting content changing process advances step S11. In step S11, the WSF device management service 200 selects the system setting device management service 222 corresponding to the management subject name “system setting” included in a session start request received from the client terminal 100, and sends the session start request to the system setting device management service 222. The session start request in step S11 includes the user name and the password.

The setting content changing process advances step S12. In step S12, the system setting device management service 222 obtains the user name and the password from the session start request received from the client terminal 100, and establishes a session with the client terminal 100 if the user name and the password are included in a setting authority list 300 included in the system setting device management service 222. The setting authority table 200 included in the system setting device management service 222 indicates the user name and the password of the administrator who is allowed to access the system setting.

The setting content changing process advances step S13. In step S13, the system setting device management service 222 sends a session ID of the session established in step S12 to the WSF device management service 200. The setting content changing process advances step S14. In step S14, the WSF device management service 200 sends the session ID received in step S13 to the client terminal 100.

The setting content changing process advances step S15. In step S15, the client terminal 100 sends the lock start request for the entire device to the WSF device management service 200. The lock start request in step S15 includes the management subject name “system setting”, the session ID, and a desired lock valid time limit. The session ID is an identification to prove that the operator operating the operation panel or the client terminal 100 has a management authority of various setting device management services. That is, the session ID is used as information to prove that the management authority is authenticated. The setting content changing process advances step S16. In step S16, the WSF device management service 200 corresponds the lock to the session by using the lock managing part 201 and the session managing part 202.

Figure 10:
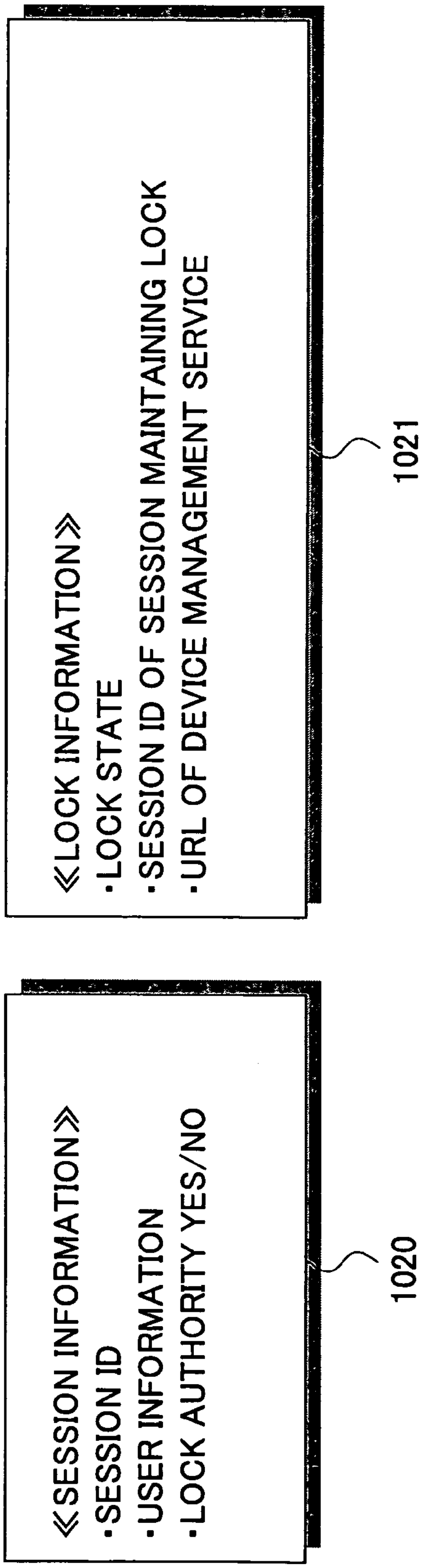
FIG. 10 is a diagram for explaining a correspondence between a lock and a session according to the first embodiment of the present invention.

FIG. 10 is a diagram for explaining a correspondence between the lock and the session. The session managing part 202 generates session information 1020 for each session. The session information 1020 includes information having a session ID, user information, lock authority yes/no, and a like. The lock managing part 201 generates lock information 1021 when the setting contents are locked. The lock information 1021 includes information having the lock state, the session ID of the session maintaining the lock, a URL (Uniform Resource Locator) of the setting device management service maintaining the lock, and a like. That is, the lock and the session are corresponded to each other by “session ID” forming the session information 1020 and “session ID of the session maintaining the lock” forming the lock information 1021.

The setting content changing process advances step S17. In step S17, the WSF device management service 200 starts an entire device lock transiting process to transit the image processing apparatus 1 to the occupied state. The occupied state is positioned between a regular state and a settable state, and is a state in that the setting contents cannot be referred to and changed.

The setting content changing process advances step S17-1. In step S17-1, the WSF device management service 200 sends an entire device lock transition request to the SCS 38. The setting content changing process advances step S17-2. In step S17-2, the SCS 38 sends an entire device lock transition inquiry with respect to the applications in the image processing apparatus 1 and the various setting device management services. The setting content changing process advances step S17-3. In step S17-3, the SCS 38 executes an entire device lock transition. The entire device lock transiting process in step S17 may be conducted by the WSF device management service 200, instead of the SCS 38.

After step S17, the various setting device management services transit from the regular state to the occupied state. The setting content changing process advances step S18. In step S18, the WSF device management service 200 selects the system setting device management service 222 corresponding to the management subject name “system setting” included in the entire device lock start request received in step S15, and sends an occupied start notice to the system setting device management service 222. The occupied start notice in step S18 includes the session ID received in step S15 and the desired lock valid time limit.

The setting content changing process advances step S19. In step S19, the system setting device management service 222 transits from the occupied state to the settable state. The settable state is a state in that a request only from the WSF device management service 200 is received and the setting contents can be referred to and changed.

The setting content changing process advances step S20. In step S20, the system setting device management service 222 sends a response with respect to the occupied start notice in step S18, to the WSF device management service 200. Then, the setting content changing process advances step S21. In step S21, the WSF device management service 200 sends a lock execution result to the client terminal 100.

Figure 11:
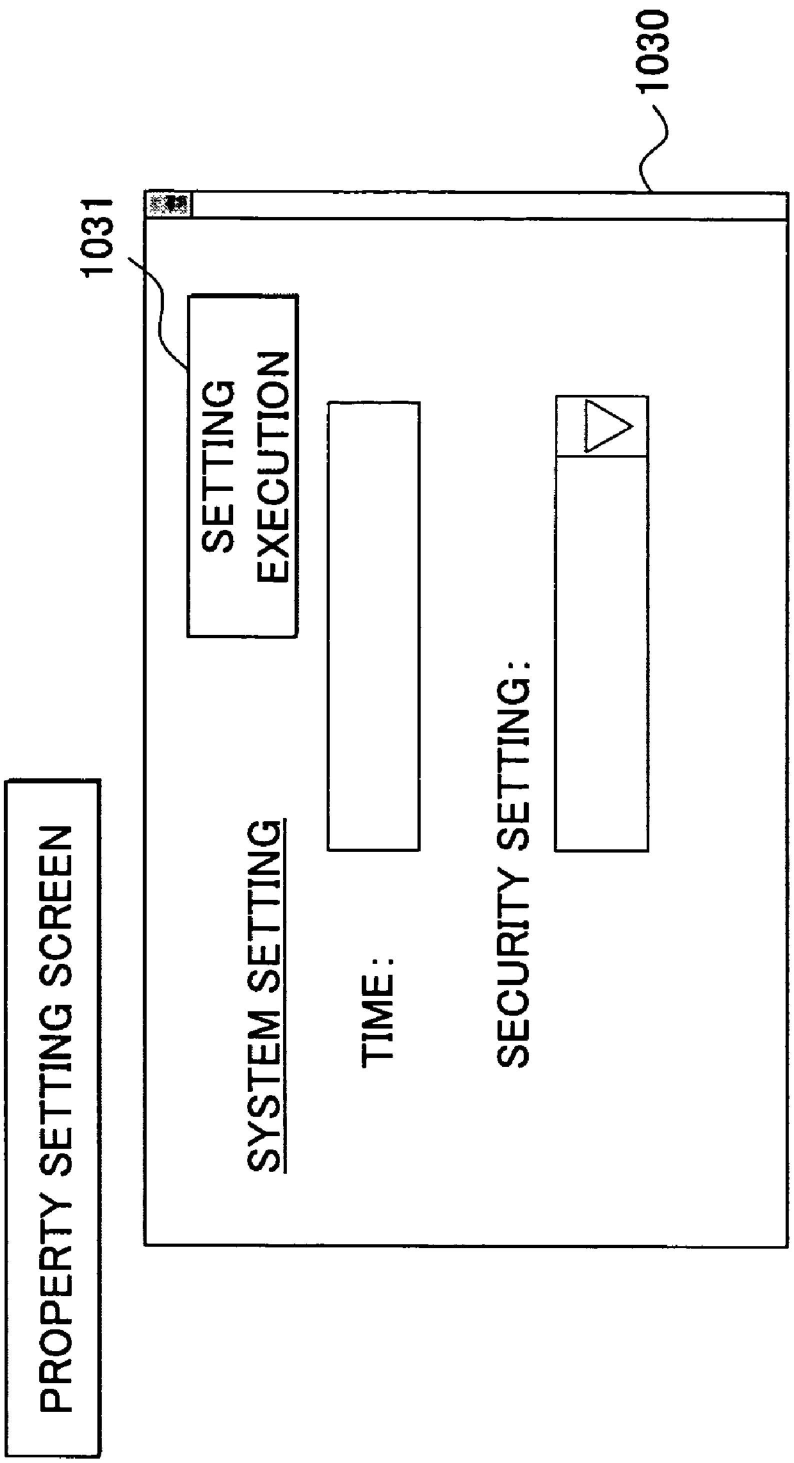
FIG. 11 is a diagram illustrating one example of a property setting screen according to the first embodiment of the present invention.

When the client terminal 100 receives the lock execution result in step S21, the client terminal 100 displays a property setting screen 1030 as shown in FIG. 11. Screen data of the property setting screen 1030 may be stored in the client terminal 100 beforehand, or obtained from the image processing apparatus 1.

FIG. 11 is a diagram illustrating one example of a property setting screen. The administrator sets a property and presses a setting execution button 1031. In the property setting screen 1030 in FIG. 11, time and security settings are conducted. When the administrator presses the setting execution button 1031, the setting content changing process advances to step S23.

In step S23, the client terminal 100 sends a property setting request to the WSF device management service 200. The property setting request in step S23 includes the management subject name "system setting", the session ID and setting information. The setting information includes the time and security settings set at the property setting screen 1030 in FIG. 11.

The setting content changing process advances step S24. In step S24, the WSF device management service 200 selects the system setting device management service 222 corresponding to the management subject name "system setting" included in the property setting request received in step S23, and sends the property setting request to the system setting device management service 222. The property setting request in step S24 includes the session ID and the setting information.

When the system setting device management service 222 receives the property setting request, the system setting device management service 222 obtains the session ID and the setting information from the property setting request, and changes the setting contents of the system setting device management service 222 by using setting information. The setting content changing process advances step S25. In step S25, the system setting device management service 222 sends setting result with respect to the property setting request received in step S24 to the WSF device management service 200. The setting content changing process advances step S26. In step S26, the WSF device management service 200 sends the setting result received in step S25 to the client terminal 100.

The setting content changing process advances step S27. In step S27, the client terminal 100 sends a lock authority release request to the WSF device management service 200. The lock authority release request in step S27 includes the management subject name "system setting", and the session ID. The setting content changing process advances step S28. In step S28, the WSF device management service 200 selects the system setting device management service 222 corresponding to the management subject name "system setting" included in the lock authority release request received in step S27, and sends an occupied end notice to the system setting device management service 222. The occupied end notice in step S28 includes the session ID received in step S27.

The setting content changing process advances step S29. In step S29, the system setting device management service 222 transits from the settable state to the occupied state. The setting content changing process advances step S30. In step S30, the system setting device management service 222 sends a response with respect to the occupied end notice in step S28 to the WSF device management service 200. The setting content changing process advances step S31. In step S31, the WSF device management service 200 sends an execution result of the lock authority release request to the client terminal 100.

The setting content changing process advances step S32. In step S32, the client terminal 100 sends a session end request to the WSF device management service 200. The session end request in step S32 includes the management subject name "system setting" and the session ID. The setting content changing process advances step S33. In step S33, the WSF device management service 200 selects the system setting device management service 222 corresponding to the management subject name "system setting" included in the session end request received in step S32, and sends the session end request to the system setting device management service 222. The session end request in step S33 includes the session ID.

When the system setting device management service 222 receives the session end request, the system setting device management service 222 obtains the session ID from the session end request received in step S33, and releases the session corresponding to the session ID. The setting content changing process advances step S34. In step S34, the system setting device management service 222 sends an execution result with respect to the session end request in step S33 to the WSF device management service 200. The setting content changing process advances step S35. In step S35, the WSF device management service 200 sends the execution result received in step S34 to the client terminal 100.

When the client terminal 200 receives the execution result in step S35, the client terminal 100 displays a user authentication screen 1040 at the display unit. In order to explain an example in that each administrator is different in response to a type of the setting contents, a login is conducted for each type of the setting contents. Screen data of the user authentication screen 1040 may be stored in the client terminal 100 beforehand, or obtained from the image processing apparatus 1.

Figure 12:
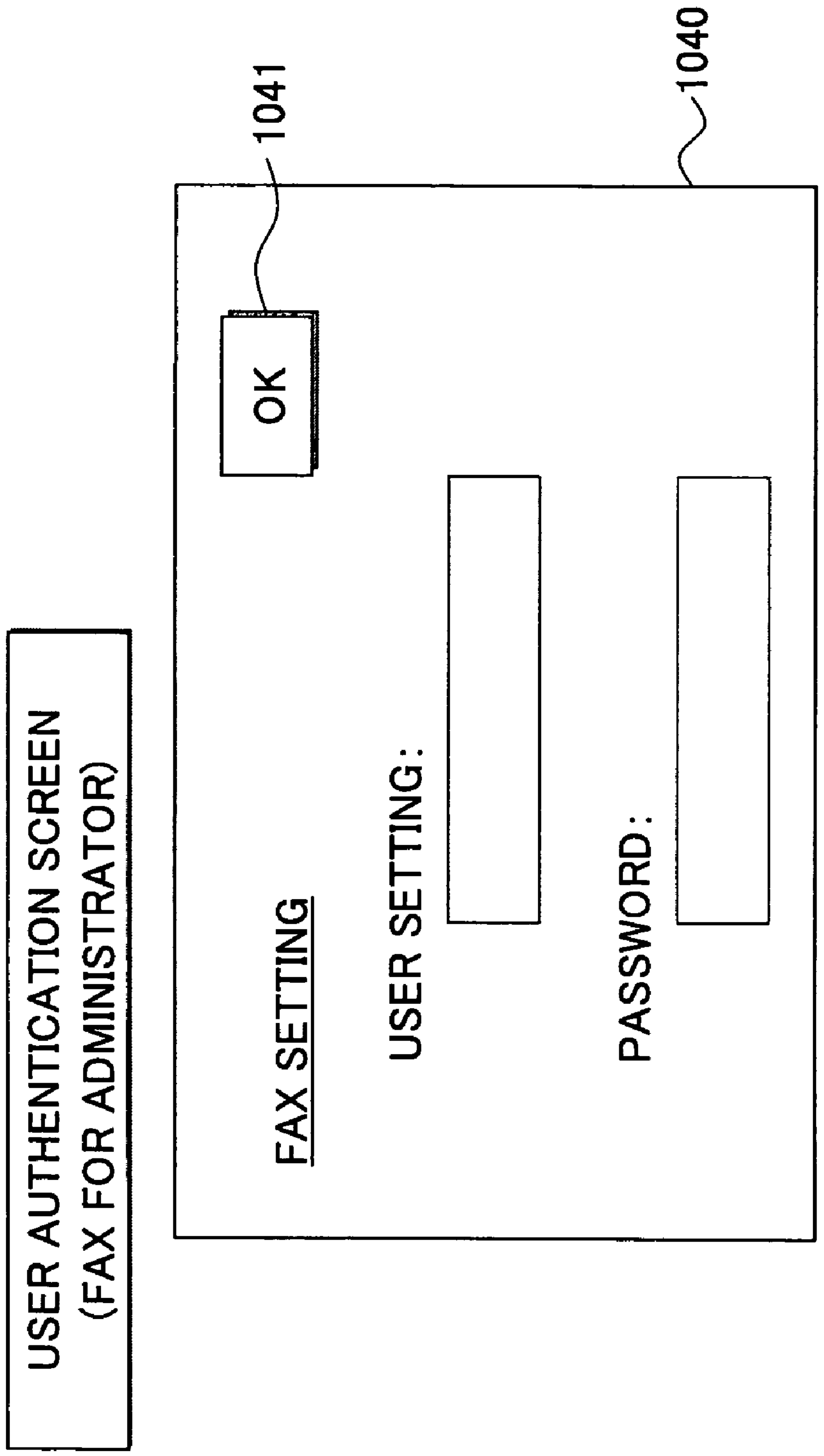
FIG. 12 is a diagram illustrating another example of the user authentication screen according to the first embodiment of the present invention.

FIG. 12 is a diagram illustrating another example of the user authentication screen. The administrator inputs the user name and the password, and presses an OK button 1041. When the administrator presses the OK button 1041, the setting content changing process advances to step S36.

The setting content changing process advances step S36. In step S36, the client terminal 100 sends a session start request to the WSF device management service 200. The session start request in step S36 includes a management subject name "FAX setting", a user name, and a password. The user name in step S36 indicates an administrator having an authority of the FAX setting.

The setting content changing process advances step S37. In step S37, the WSF device management service 200 selects the FAX setting device management service 223 corresponding to the management subject name "FAX setting" included in the session start request received in step S36, and sends the session start request to the FAX setting device management service 223. The session start request in step S37 includes the user name and the password.

The FAX setting device management service 223 obtains the user name and the password from the session start request received in step S37, as described above in step S12, and establishes a session with the client terminal 100 if the user name and the password are included in a setting authority list 301 included in the FAX setting device management service 223. The setting authority list 301 included in the FAX setting device management service 223 indicates the user name and the password of the administrator who can access the FAX setting.

After the session is established, the setting content changing process advances to step S38. In step S38, the FAX setting device management service 223 sends a session ID of the session being established between the client terminal 100 and the FAX setting device management service 223. The setting content changing process advances to step S39. Instep S39, the WSF device management service 200 sends the session ID received in step S38 to the client terminal 100.

When the client terminal 100 receives the session ID in step S39, the setting content changing process advances to step S40. In step S40, the client terminal 100 sends a lock authority inherit request to the WSF device management service 200. The lock authority inherit request in step S40 includes the management subject name "FAX setting", the session ID of the session being established between the client terminal 100 and the FAX setting device management service 223, an URL of the system setting device management service 222, and the session ID of the session being established between the client terminal 100 and the system setting device management service 222.

The lock authority inherit request in step S40 includes the URL and the session ID of the management subject service that previously had the lock authority because security can be improved by confirming that the client terminal 100 knows the URL and the session ID of the management subject service which previously had the lock authority.

The setting content changing process advances to step S41. In step S41, the WSF device management service 200 transfers the lock authority possessed by the session established between the client terminal 100 and the system setting device management service 222, to the session being established between the client terminal 100 and the FAX setting device management service 223.

The setting content changing process advances to step S42. In step S42, the WSF device management service 200 selects the FAX setting device management service 223 in response to the management subject name "FAX setting" included in the lock authority inherit request received in step S40, and sends an occupied start notice to the FAX setting device management service 223. The occupied start notice in step S42 includes the session ID of the session established between the client terminal 100 and the FAX setting device management service 223, and a desired lock valid time limit.

The setting content changing process advances to step S43. In step S43, the FAX setting device management service 223 transits from the occupied state to the settable state. The setting content changing process advances to step S44. In step S44, the FAX setting device management service 223 sends a response with respect to the occupied start notice in step S42, to the WSF device setting service 200. The setting content changing process advances to step S45. In step S45, the WSF device management service 200 sends a lock execution result to the client terminal 100.

Figure 13:
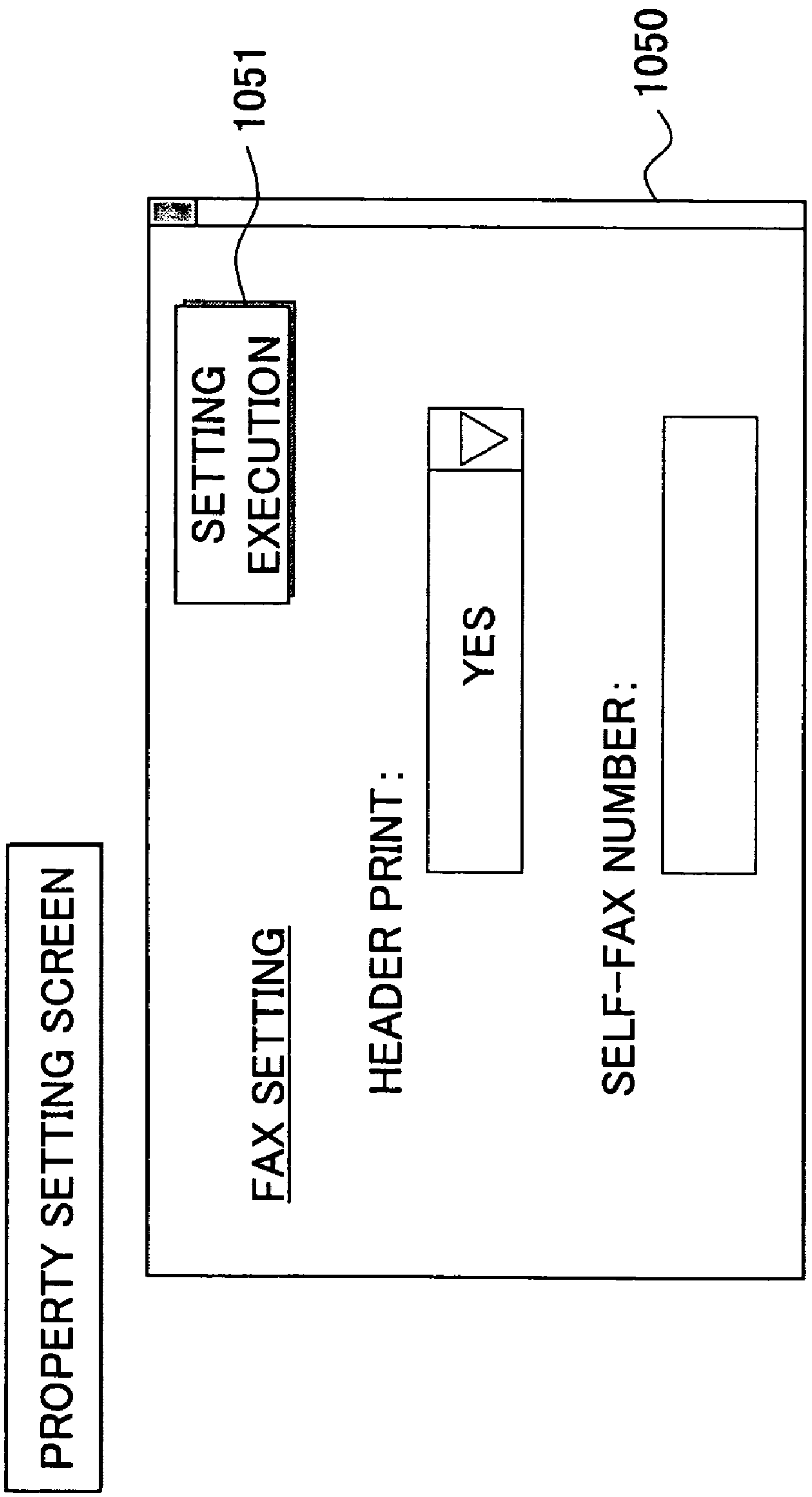
FIG. 13 is a diagram illustrating another example of the property setting screen according to the first embodiment of the present invention.

When the client terminal 100 receives the lock execution result in step S45, the client terminal 100 displays a property setting screen 1050 at the display unit as shown in FIG. 13. Screen data of the property setting screen 1050 may be stored in the client terminal 100 beforehand, or obtained from the image processing apparatus 1.

FIG. 13 is a diagram illustrating another example of the property setting screen. The administrator sets a property and presses a setting execution button 1051. In the property setting screen 1050 in FIG. 13, a header print yes/no and a self-FAX number are set. When the administrator presses the setting execution button 1051, the setting content changing process advances to step S46.

In step S46, the client terminal 100 sends a property setting request to the WSF device management service 200. The property setting request in step S46 includes the management subject name "FAX setting", the session ID of the session established between the client terminal 100 and the FAX setting device management service 223, and the setting information. The setting information is information indicating the header print yes/no and the self-FAX number set in the property setting screen 1050 in FIG. 13.

The setting content changing process advances to step S47. In step S47, the WSF device management service 200 selects the FAX setting device management service 223 in response to the management subject name "FAX setting" included in the property setting request received in step S46, and sends the property setting request to the FAX setting device management service 223. The property setting request in step S47 includes the session ID of the session established between the client terminal 100 and the FAX setting device management service 223 and the setting information.

When the property setting request is received, the FAX setting device management service 223 obtains the session ID of the session established between the client terminal 100 and the FAX setting device management service 223 and the setting information from the property setting request, and changes the setting contents of the FAX setting device management service 223. The setting content changing process advances to step S48. In step S48, the FAX setting device management service 223 sends the setting result with respect to the property setting request received in step S47, to the WSF device management service 200. The setting content changing process advances to step S49. In step S49, the WSF device management service 200 sends the setting result received in step S48, to the client terminal 100.

The setting content changing process advances to step S50. In step S50, the client terminal 100 sends a lock release request to the WSF device management service 200. The lock release request in step S50 includes the management subject name "FAX setting", and the session ID of the session established between the client terminal 100 and the FAX setting device management service 223.

The setting content changing process advances to step S51. In step S51, the WSF device management service 200 starts an entire device lock releasing process for releasing the occupied state of the image processing apparatus 1. The setting content changing process advances to step S51-1. In step S51-1, the WSF device management service 200 sends an entire device lock release request to the SCS 38. The setting content changing process advances to step S51-2. In step S51-2, the SCS 38 sends an entire device lock release notice with respect to the application in the image processing apparatus 1 and the various setting device management services. The entire device lock releasing process in step S51 may be conducted by the WSF device management service 200, instead of the SCS 38.

After step S51, the various setting device management services transit from the occupied state to the regular state. The setting content changing process advances to step S52. In step S52, the WSF device management service 200 selects the FAX setting device management service 223 in response to the management subject name "FAX setting" included in the lock release request received in step S50, and sends an occupied end notice to the FAX setting device management service 223. The occupied end notice in step S52 includes the session ID of the session established between the client terminal 100 and the FAX setting device management service 223, which is received in step S50.

The setting content changing process advances to step S53. In step S53, the FAX setting device management service 223 sends a response with respect to the occupied end notice in step S52, to the WSF device management service 200. The setting content changing process advances to step S54. In step S54, the WSF device management service 200 sends an execution result with respect to the lock release request to the client terminal 100.

The setting content changing process advances to step S55. In step S55, the client terminal 100 sends a session end request to the WSF device management service 200. The session end request in step S55 includes the management subject name "FAX setting", and the session ID of the session established between the client terminal 100 and the FAX setting device management service 223.

The setting content changing process advances to step S56. In step S56, the WSF device management service 200 selects the FAX setting device management service 223 in response to the management subject name "FAX setting" included in the session end request received in step S55, and sends the session end request to the FAX setting device management service 223. The session end request in step S56 includes the session ID of the session established between the client terminal 100 and the FAX setting device management service 223.

When the FAX setting device management service 223 receives the session end request, the FAX setting device management service 223 obtains the session ID of the session established between the client terminal 100 and the FAX setting device management service 223 from the session end request received in step S56, and releases the session corresponding to the session ID. The setting content changing process advances to step S57. In step S57, the FAX setting device management service 223 sends an execution result with respect to the session end request received in step S56, to the WSF device management service 200. The setting content changing process advances to step S58. In step S58, the WSF device management service 200 sends the execution result received in step S57 to the client terminal 100. It should be noted that steps S52 through S54 can be conducted before step S51.

Figure 14:
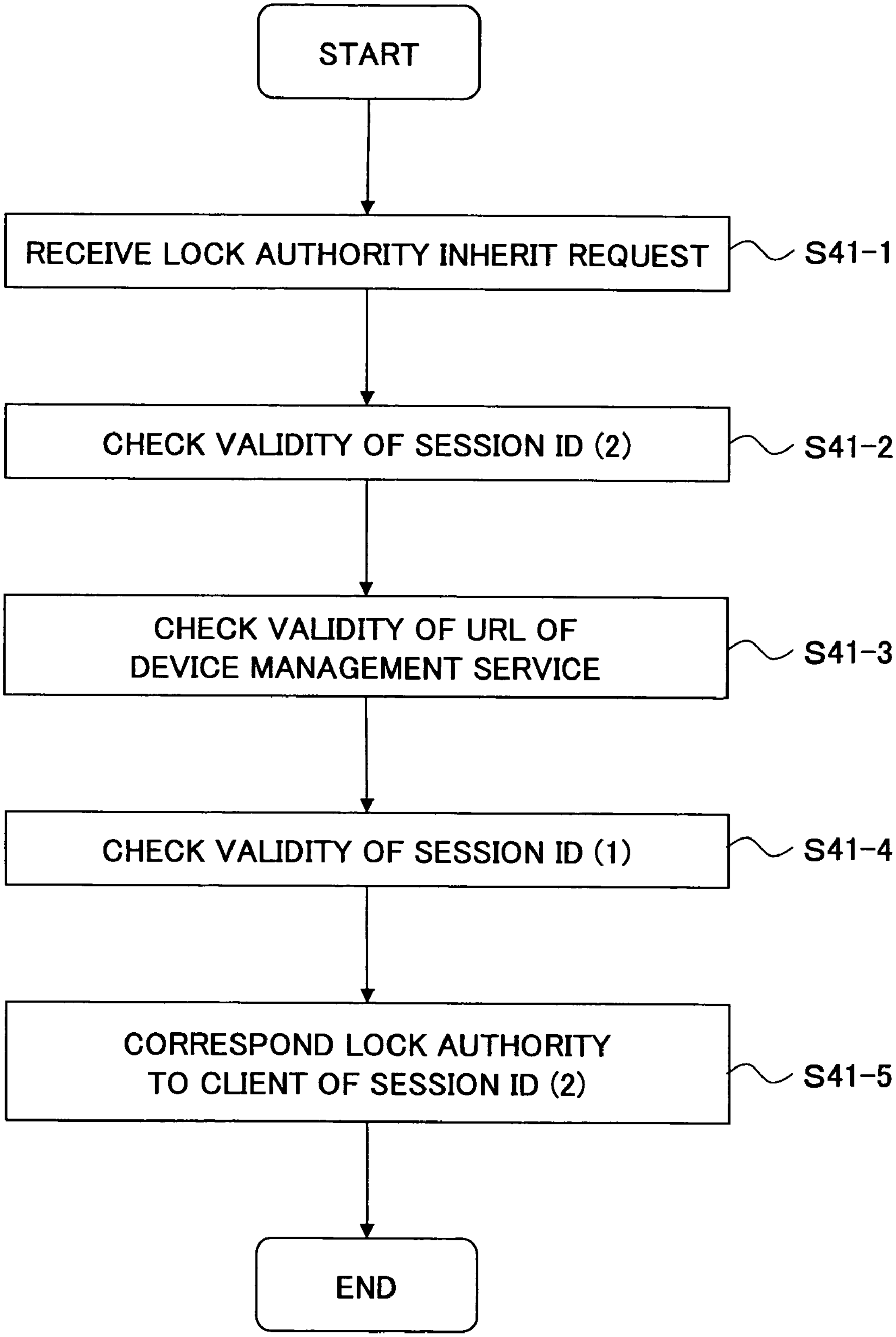
FIG. 14 is a flowchart for explaining one example of a lock authority transferring process according to the first embodiment of the present invention.

Next, the lock authority transferring process in step S41 will be described with reference to a flowchart. FIG. 14 is a flowchart for explaining one example of the lock authority transferring process. The lock authority transferring process advances to step S41-1. In step S41-1, the WSF device management service 200 receives a lock authority inherit request from the client terminal 100.

The lock authority inherit request from the client terminal 100 includes the management subject name "FAX setting", the session ID of the session established between the client terminal 100 and the FAX setting device management service 223, the URL of the system setting device management service 222, and the session ID of the session established between the client terminal 100 and the system setting device management service 222.

The lock authority transferring process advances to step S41-2. In step S41-2, the WSF device management service 200 checks a validity of the session ID of the session established between the client terminal 200 and the FAX setting device management service 223, which is included in the lock authority inherit request. The lock authority transferring process advances to step S41-3. In step S41-3, the WSF device management service 200 checks a validity of the URL of the system setting device management service 222 included in the lock authority inherit request. The lock authority transferring process advances to step S41-4. In step S41-4, the WSF device management service 200 checks a validity of the session ID of the session established between the client terminal 100 and the system setting device management service 222, which is included in the lock authority inherit request.

When validity checks in steps S41-2 through S41-4 are normally ended, the lock authority transferring process advances to step S41-5. In step S41-5, the WSF device management service 200 corresponds the lock authority maintained for the session established between the client terminal 100 and the system setting device management service 222, to the session established between the client terminal 100 and the FAX setting device management service 223, by rewriting the lock information 1021. It should be noted that steps S41-3 and S41-4 are not mandatory in the lock authority transferring process and can be omitted.

Next, in the flowcharts shown in FIG. 5, FIG. 6, and FIG. 7, messages sent and received between the client terminal 100 and the image processing apparatus 1 will be described in detail with reference to FIG. 15 through FIG. 28.

FIG. 15 is a diagram showing one example of a request SOAP message sent from the client terminal to the WSF device management service as the session start request in step S10 in FIG. 5. A request SOAP message 1060 in FIG. 15 includes a user name 1061, a password 1062, and a management subject name 1063.

FIG. 16 is a diagram showing one example of a response SOAP message sent from the WSF device management service to the client terminal as a response for the session start request in step S14 in FIG. 5. A response SOAP message 1070 in FIG. 16 includes the session ID 1071 of the session established between the client terminal 100 and the system setting device management service 222.

FIG. 17 is a diagram showing one example of a request SOAP message sent from the client terminal to the WSF device management service as the entire device lock start request in step S15 in FIG. 5. A request SOAP message 1080 in FIG. 17 includes the session ID 1081 of the session established between the client terminal 100 and the system setting device management service 222, a management subject name 1082, and a desired lock valid time limit 1083.

FIG. 18 is a diagram showing one example of a response SOAP message sent from the WSF device management service to the client terminal as a response for the entire device lock start request in step S21 in FIG. 5. A response SOAP message 1090 in FIG. 18 includes a lock execution result 1091 in response to the entire device lock start request.

FIG. 19 is a diagram showing one example of a request SOAP message sent from the client terminal to the WSF device management service as the property setting request in step S23 in FIG. 6. A request SOAP message 1100 in FIG. 19 includes a session ID 1101 of the session established between the client terminal 100 and the system setting device management service 222, a management subject name 1102, and setting information 1103.

FIG. 20 is a diagram showing one example of a response SOAP message sent from the WSF device management service to the client terminal as a response for the property setting request in step S26 in FIG. 6. A response SOAP message 1110 in FIG. 20 includes a setting result 1111 corresponding to the property setting request.

FIG. 21 is a diagram showing one example of a request SOAP message sent from the client terminal to the WSF device management service as the lock authority release request in step S27 in FIG. 6. A request SOAP message 1120 in FIG. 21 includes a session ID 1121 established between the client terminal 100 and the system setting device management service 222, and a management subject name 1122.

FIG. 22 is a diagram showing one example a response SOAP message sent from the WSF device management service to the client terminal as a response for the lock authority release request instep S31 in FIG. 6. A response SOAP message 1130 in FIG. 22 includes an execution result 1131 in response to the lock authority release request.

FIG. 23 is a diagram showing one example of a request SOAP message sent from the client terminal to the WSF device management service as the session end request in step S32 in FIG. 6. A request SOAP message 1140 in FIG. 23 includes a session ID 1141 of the session established between the client terminal 100 and the system setting device management service 222, and a management subject name 1142.

FIG. 24 is a diagram showing one example of a response SOAP message sent from the WSF device management service to the client terminal as a response of the session end request in step S35 in FIG. 6. A response SOAP message 1150 in FIG. 24 includes an execution result 1151 in response to the session end request.

A request SOAP message as the session start request in step S36 sent from the client terminal 100 to the WSF device management service 200 is the same as the request SOAP message 1060 in FIG. 15, and the explanation thereof will be omitted. A response SOAP message as a response for the session start request in step S39 sent from the WSF device management service 200 to the client terminal 100 is the same as the response SOAP message 1070 in FIG. 16, and the explanation thereof will be omitted.

FIG. 25 is a diagram showing one example of a request SOAP message sent from the client terminal to the WSF device management service as the lock authority inherit request in step S40 in FIG. 6. A request SOAP message 1160 in FIG. 25 includes a session ID 1161 of the session established between the client terminal 100 and the FAX setting device management service 223, a management subject name 1162, an URL 1163 of the system setting device management service 222, and a session ID 1164 of the session established between the client terminal 100 and the system setting device management service 222.

FIG. 26 is a diagram showing one example of a response SOAP message sent from the WSF device management service to the client terminal as a response for the lock authority inherit request in step S45 in FIG. 6. A response SOAP message 1170 in FIG. 26 includes a lock execution result 1171 corresponding to the lock authority inherit request.

A request SOAP message sent from the client terminal 100 to the WSF device management service 200 as the property setting request in step S46 is the same as the request SOAP message 1100 in FIG. 19, and the explanation thereof will be omitted. A response SOAP message sent from the WSF device management service 200 to the client terminal 100 as a response for the property setting request in step S49 is the same as the response SOAP message 1110 in FIG. 20, and the explanation thereof will be omitted.

FIG. 27 is a diagram showing one example of a request SOAP message sent from the client terminal to the WSF device management service as the lock release request in step S50 in FIG. 7. A request SOAP message 1180 in FIG. 27 includes a session ID 1181 of the session established between the client terminal 100 and the FAX setting device management service 223, and a management subject name 1182.

FIG. 28 is a diagram showing a response SOAP message sent from the WSF device management service to the client terminal as a response for the lock release request in step S54 in FIG. 7. A response SOAP message 1190 in FIG. 28 includes an execution result 1191 corresponding to the lock release request.

A request SOAP message sent from the client terminal 100 to the WSF device management service 200 as the session end request in step S55 is the same as the request SOAP message 1140 in FIG. 23, and the explanation thereof will be omitted. A response SOAP message sent from the WSF device management service 200 to the client terminal 100 as a response for the session end request in step S58 is the same as the response SOAP message in FIG. 24, and the explanation thereof will be omitted.

As described above, in the setting content changing process according to the first embodiment of the present invention, since the session and the lock authority are managed by corresponding to each other in the WSF device management service 200, the lock authority can be transferred between sessions. Therefore, there is no time interval to release the lock, so that the setting contents formed by a plurality of setting items for a plurality of management subjects can be changed in a successive sequence of processes.

Second Embodiment

Figure 29:
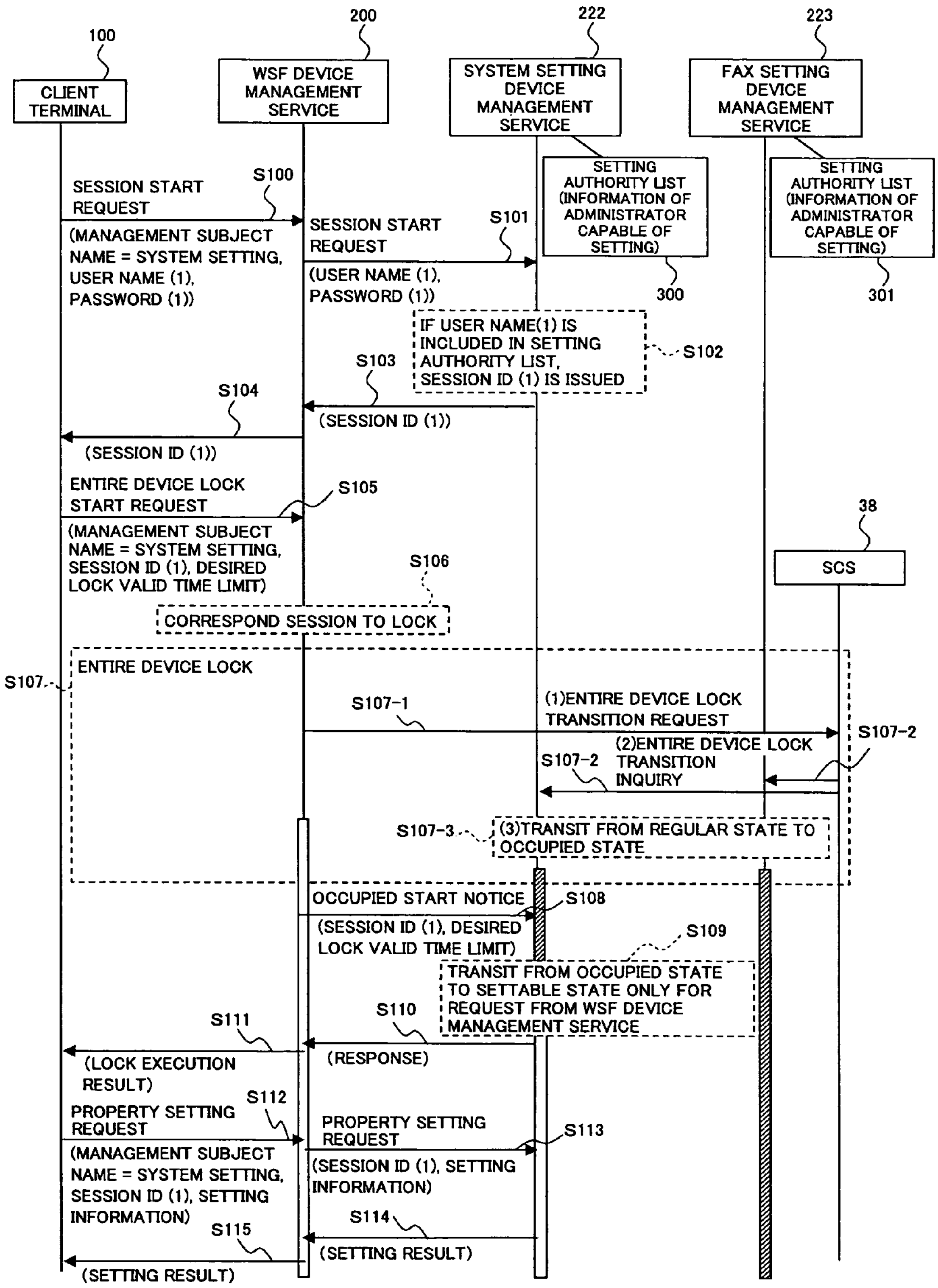
FIG. 29 is a flowchart for explaining the setting content changing process according to a second embodiment of the present invention.
Figure 30:
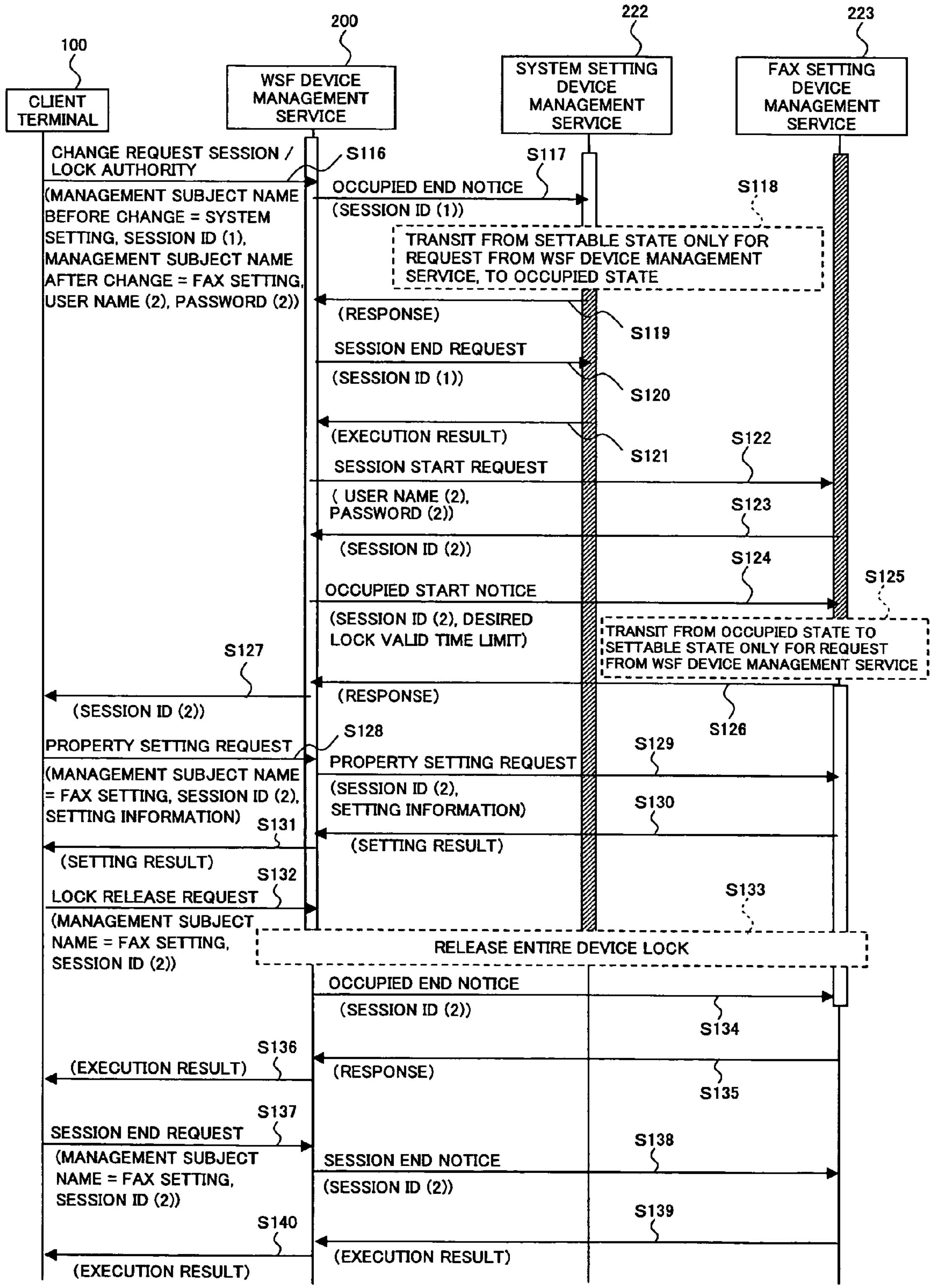
FIG. 30 is a flowchart for explaining the setting content changing process according to the second embodiment of the present invention.

Next, a setting content changing process according to a second embodiment of the present invention will be described. FIG. 29 and FIG. 30 are flowcharts for explaining the setting content changing process according to a second embodiment of the present invention. Steps S100 through S115 in the flowcharts in FIG. 29 and FIG. 30 are the same as steps S10 through S26 in FIG. 5 through FIG. 7, and the explanation thereof will be omitted.

The setting content changing process advances to step S116. In step S116, the client terminal 100 sends a session/lock authority change request to the WSF device management service 200. The session/lock authority change request in step S116 includes a management subject name before change "system setting", a session ID of the session established between the client terminal 100 and the system setting device management service 222, a management subject name after change "FAX setting", a user name, and a password. The user name in step S116 indicates an administrator having an authority of the FAX setting.

The setting content changing process advances to step S117. In step S117, the WSF device management service 200 selects the system setting device management service 222 corresponding to the management name before change "system setting" included in the session/lock authority change request received in step S116, and sends an occupied end notice to the system setting device management service 222. The occupied end notice in step S117 includes the session ID received in step S116.

The setting content changing process advances to step S118. In step S118, the system setting device management service 222 transits from the settable state to the occupied state. The setting content changing process advances to step S119. In step S119, the system setting device management service 222 sends a response with respect to the occupied end notice in step S117 to the WSF device management service 200.

The setting content changing process advances to step S120. In step S120, the WSF device management service 200 selects the system setting device management service 222 corresponding to the management subject name before change "system setting" included in the session/lock authority change request received in step S116, and sends a session end request to the system setting device management service 222. The session end request in step S120 includes the session ID received in step S116.

When the system setting device management service 222 receives the session end request, the system setting device management service 222 obtains the session ID from the session end request received in step S120, and releases the session corresponding to the session ID. The setting content changing process advances to step S121. In step S121, the system setting device management service 222 sends an execution result with respect to the session end request received in step S120, to the WSF device management service 200.

The setting content changing process advances to step S122. In step S122, the WSF device management service 200 selects the FAX setting device management service 223 corresponding to the management subject name after change "FAX setting" included in the session/lock authority change request received in S121, and sends a session start request to the Fax setting device management service 223. The session start request in step S122 includes the user name and the password received in step S116.

The FAX setting device management service 223 obtains the user ID and the password from the session start request received in step S122, and establishes a session with the client terminal 100 if the user ID and the password are included in the setting authority list 301 included in the FAX setting device management service 223.

After the session is established, the setting content changing process advances to step S123. In step S123, the FAX setting device management service 223 sends a session ID of the session established between the client terminal 100 and the FAX setting device management service 223. After step S123, the WSF device management service 200 conducts a lock authority transferring process that is the same as the lock authority transferring process in step S41 in the first embodiment.

The setting content changing process advances to step S124. In step S124, the WSF device management service 200 selects the FAX setting device management service 223 corresponding to the management subject name after change "FAX setting" included in the session/lock authority change request received in step S116, and sends an occupied start notice to the FAX setting device management service 223. The occupied start notice in step S124 includes the session ID of the session established between the client terminal 100 and the FAX setting device management service 223, and a desired lock valid time limit.

The setting content changing process advances to step S125. In step S125, the FAX setting device management service 223 transits from the occupied state to the settable state. The setting content changing process advances to step S126. In step S126, the FAX setting device management service 223 sends a response with respect to the occupied start notice in step S124 to the WSF device management service 200. The setting content changing process advances to step S127. In step S127, the WSF device management service 200 sends a session/lock authority change result to the client terminal 100. The session/lock authority change result in step S127 includes the session ID of the session established between the client terminal 100 and the FAX setting device management service 223. Steps S128 through S140 after step S127 are the same as steps S46 through S58 in FIG. 5 through FIG. 7 in the first embodiment, and the explanation thereof will be omitted.

Next, messages sent and received between the client terminal 100 and the WSF device management service 200 of the image processing apparatus 1 in the flowcharts in FIG. 29 and FIG. 30 will be described with reference to FIG. 31 and FIG. 32 in detail.

Steps S100 through S115 and steps S128 through S140 in the flowcharts in FIG. 29 and FIG. 30 are the same as steps S10 through S26 and steps S46 through S58 in FIG. 5 through FIG. 7, and the detailed explanation of messages sent and received between the client terminal 100 and the WSF device management service 200 of the image processing apparatus 1 will be omitted.

FIG. 31 is a diagram showing one example of a request SOAP message sent from the client terminal to the WSF device management service as the session/lock authority change request in step S116. A request SOAP message 1200 in FIG. 31 includes a session ID 1201 of the session established between the client terminal 100 and the system setting device management service 222, a management subject name before change "system setting" 1202, a management subject name after change "FAX setting" 1203, a user name 1204 after change, a password 1205 after change.

FIG. 32 is a diagram showing one example of a response SOAP message sent from the WSF device management service to the client terminal as a response of the session/lock authority change request in step S127. A response SOAP message 1210 in FIG. 32 includes a session ID 1211 of the session established between the client terminal 100 and the FAX setting device management service 223. In the setting content changing process in the second embodiment of the present invention, it is possible for a single request to switch the sessions and transfer the lock authority by a plurality of requests in the first embodiment.

Third Embodiment

Figure 33:
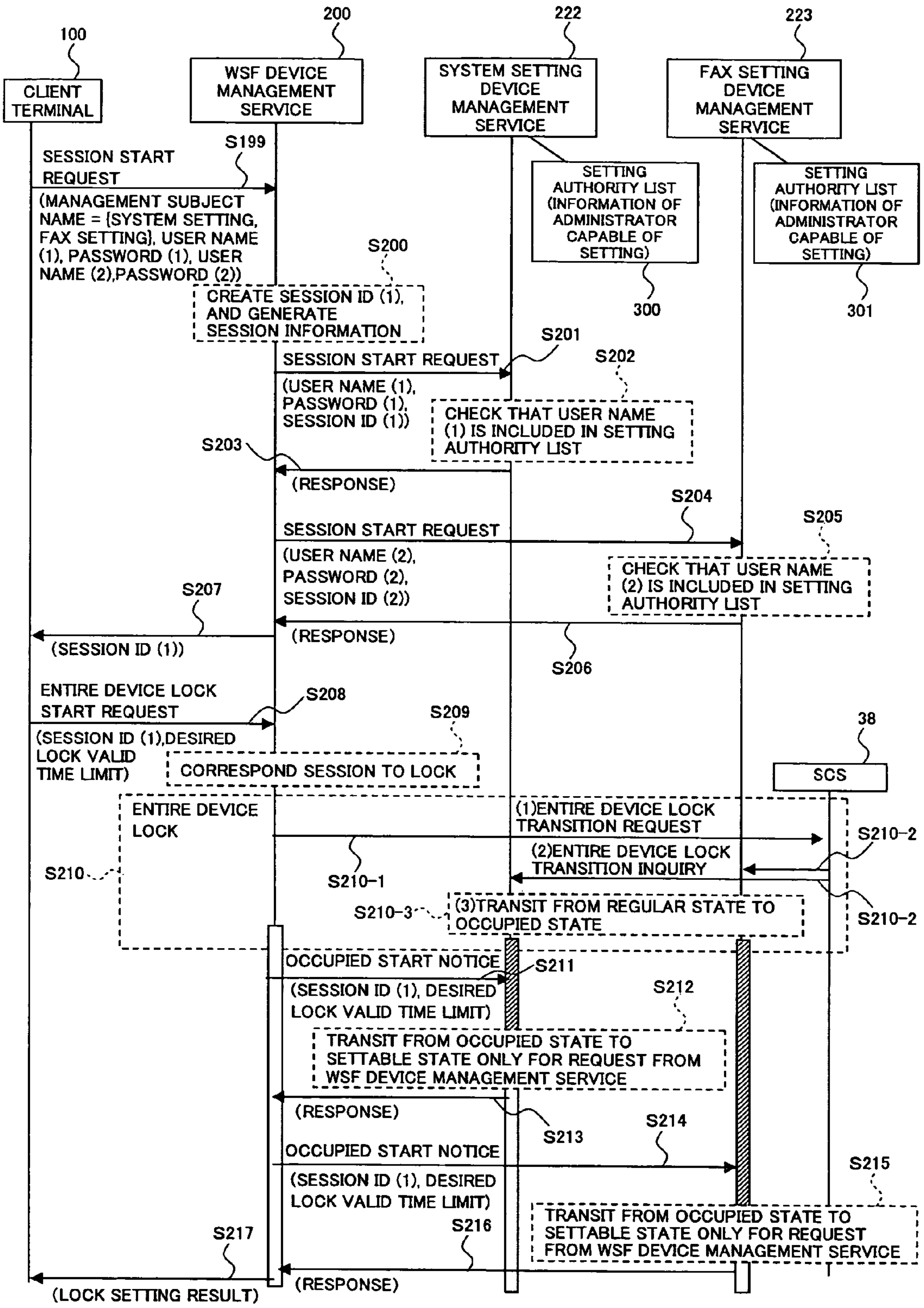
FIG. 33 is a flowchart for explaining the setting content changing process according to a third embodiment of the present invention.
Figure 34:
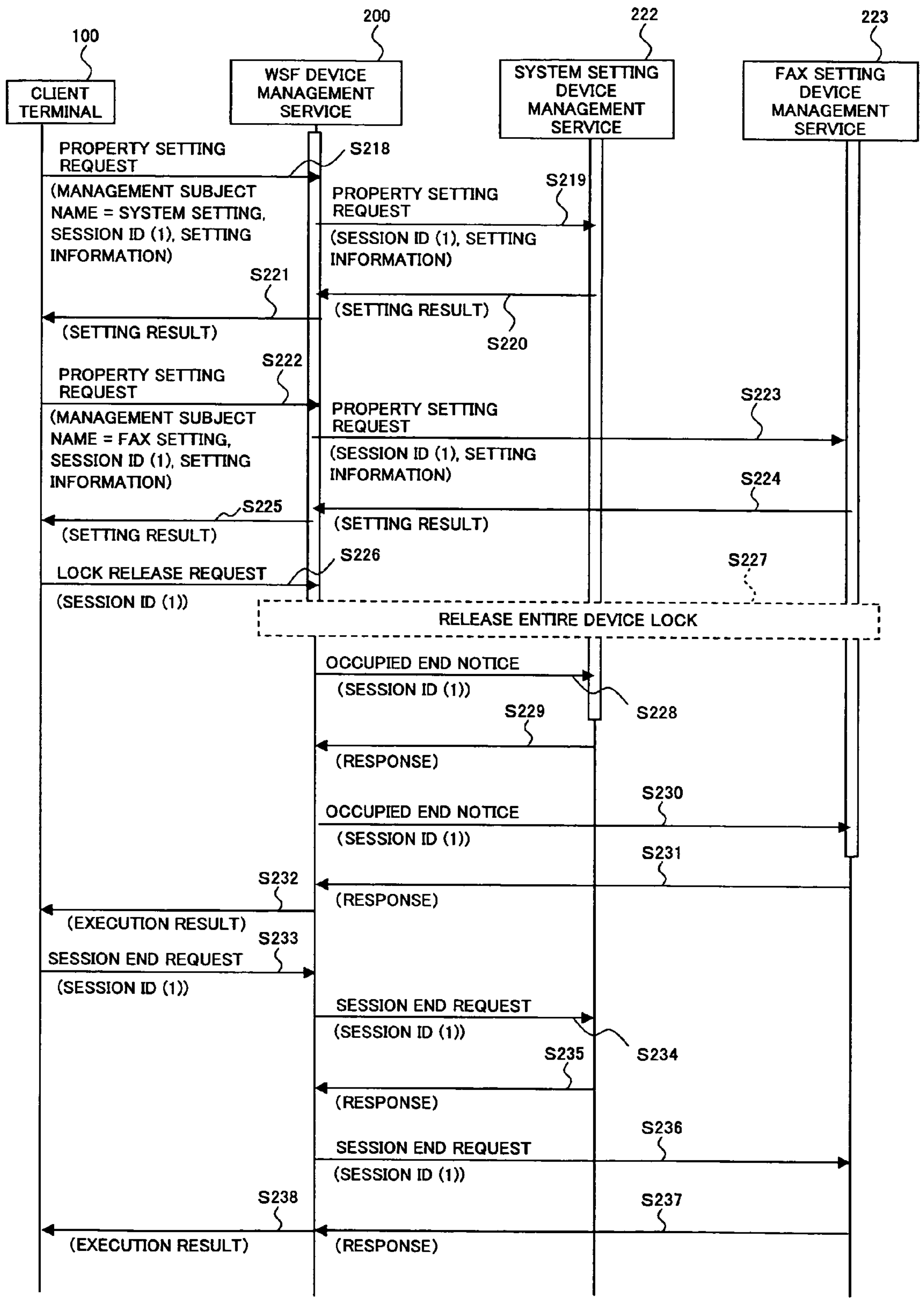
FIG. 34 is a flowchart for explaining the setting content changing process according to the third embodiment of the present invention.

Next, a setting content changing process according to a third embodiment of the present invention will be described. FIG. 33 and FIG. 34 are flowcharts for explaining the setting content changing process according to the third embodiment of the present invention. An administrator operates the client terminal 100 to request displaying the initial screen 1000 as shown in FIG. 8 as described above. The client terminal 100 displays the initial screen 1000 at a display unit.

Figure 35:
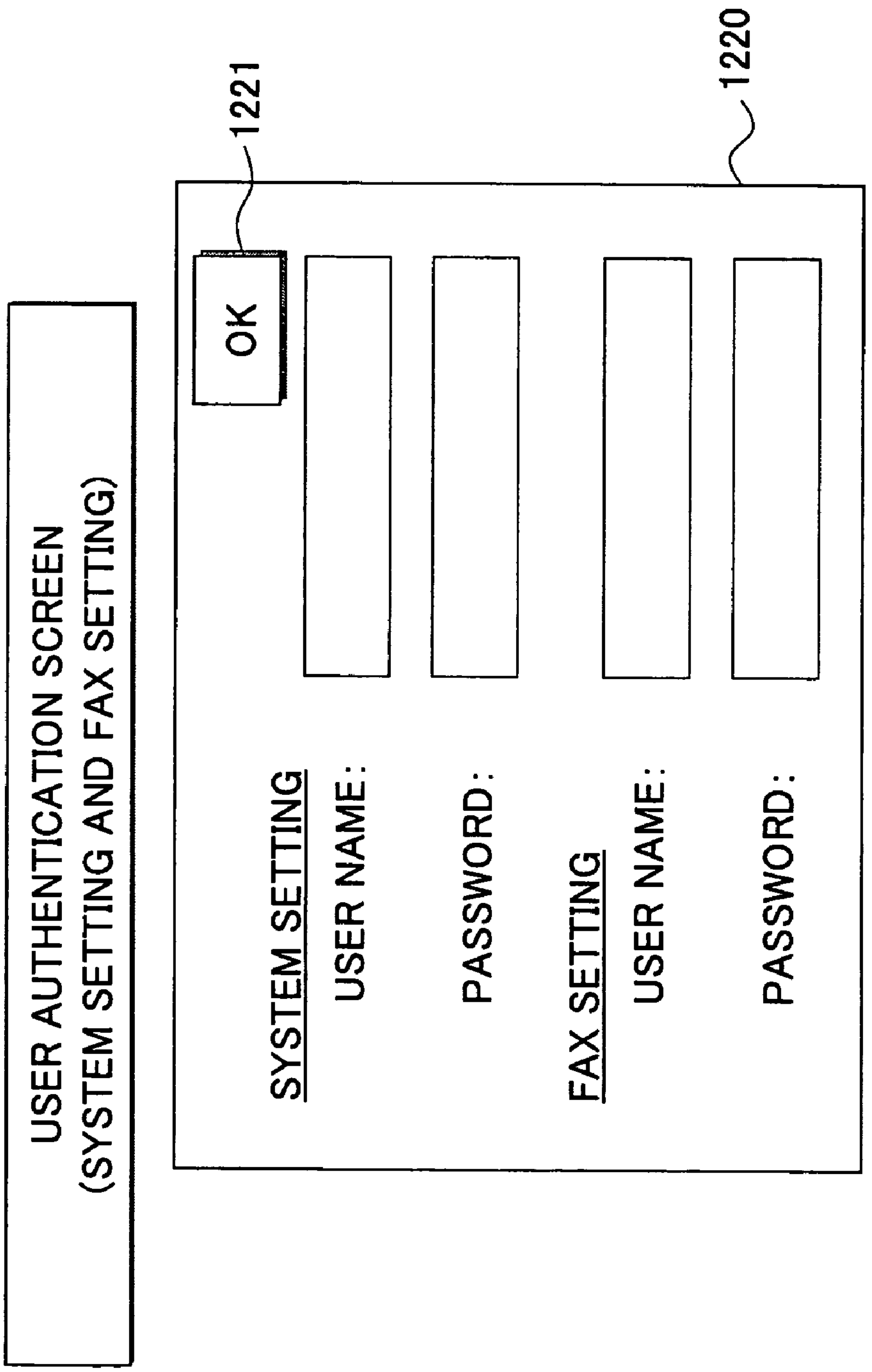
FIG. 35 is a diagram showing another user authentication screen according to the third embodiment of the present invention.

The administrator selects a type of setting contents (management subject name) to refer to or change, and presses an OK button 1001. When the administrator presses the OK button 1001, the client terminal 100 displays a user authentication screen 1220 as shown in FIG. 35 at the display unit. Screen data of the user authentication screen 1220 may be stored in the client terminal 100, or obtained from the image processing apparatus 1.

FIG. 35 is a diagram showing another user authentication screen. The administrator inputs a user name and a password for the system setting, inputs a user name and a password for the FAX setting, and presses an OK button 1221. When the administrator presses the OK button 1221, the setting content changing process advances to step S199. In step S199, the client terminal 100 sends a session start request to the WSF device management service 200. The session start request in step S199 includes management subject names "system setting, FAX setting", the user name and password for the system setting, and the user name and password for the FAX setting.

The setting content changing process advances to step S200. In step S200, the WSF device management service 200 creates a session ID of a session to establish between the client terminal 100 and the WSF device management service 200, and generates session information.

The setting content changing process advances to step S201. In step S201, the WSF device management service 200 selects the system setting device management service 222 corresponding to the management subject name "system setting" included in the session start request received in step S199, and sends a session start request to the system setting device management service 222. The session start request in step S201 includes the user name and password for the system setting, and the session ID.

The setting content changing process advances to step S202. In step S202, the system setting device management service 222 obtains the user ID and the password from the session start request received in step S201, and checks whether or not the user ID and the password are included in the setting authority list 300 included in the system setting device management service 222.

The setting content changing process advances to step S203. In step S203, the system setting device management service 222 sends a check result showing whether or not the user ID and the password obtained from the session start request are included in the setting authority list 300, as a response for the session start request in step S201.

The setting content changing process advances to step S204. In step S204, the WSF device management service 200 selects the FAX setting device management service 223 corresponding to the management subject name "FAX setting" included in the session start request received in step S119, and sends a session start request to the FAX setting device management service 223. The session start request in step S204 includes the user name and the password for the FAX setting, and session ID.

The setting content changing process advances to step S205. In step S205, the FAX setting device management service 223 obtains the user ID and the password from the session start request received in step S204, and checks whether or not the user ID and the password are included in the setting authority list 301 included in the FAX setting device management service 223.

The setting content changing process advances to step S206. In step S206, the FAX setting device management service 223 sends a check result showing whether or not the user ID and the password obtained from the session start request are included in the setting authority list 301, as a response for the session start request in step S204, to the WSF device management service 200. The setting content changing process advances to step S207. In step S207, the WSF device management service 200 sends the response for the session start request in step S199 to the client terminal 100. The response in step S207 includes the session ID.

The setting content changing process advances to step S208. In step S208, the client terminal 100 sends an entire device lock start request to the WSF device management service 200. The entire device lock start request in step S208 includes the session ID, and a desired lock valid time limit. The setting content changing process advances to step S209. In step S209, the WSF device management service 200 corresponds a lock and the session by using the lock managing part 201 and the session managing part 202. The setting content changing process advances to step S210. In step S210, the WSF device management service 200 starts an entire device lock transiting process to transit the image processing apparatus 1 to the occupied state.

After step S210, the various setting device management service transits from the regular state to the occupied state. The setting content changing process advances to step S211. In step S211, the WSF device management service 200 selects the system setting device management service 222 corresponding to the management subject name "system setting" included in the session start request received in step S199, and sends an occupied start notice to the system setting device management service 222. The occupied start notice in step S211 includes the session ID received in step S208 and the desired lock valid time limit.

The setting content changing process advances to step S212. In step S212, the system setting device management service 222 transits from the occupied state to the settable state. The setting content changing process advances to step S213. In step S213, the system setting device management service 222 sends a response for the occupied start notice in step S211 to the WSF device management service 200.

The setting content changing process advances to step S214. In step S214, the WSF device management service 200 selects the FAX setting device management service 223 corresponding to the management subject name "FAX setting" included in the session start request received in step S199, and sends the occupied start notice to the FAX setting device management service 223. The occupied start notice in step S214 includes the session ID received in step S208 and the desired lock valid time limit.

The setting content changing process advances to step S215. In step S215, the FAX setting device management service 223 transits from the occupied state to the settable state. The setting content changing process advances to step S216. In step S216, the FAX setting device management service 223 sends a response for the occupied start notice in step S214 to the WSF device management service 200. The setting content changing process advances to step S217. In step S217, the WSF device management service 200 sends a lock execution result to the client terminal 100.

When the client terminal 100 receives the lock execution result in step S217, the client terminal 100 displays the property setting screen 1030 as shown in FIG. 11 at the display unit. The administrator sets the property and presses the setting execution button 1031. When the administrator presses the setting execution button 1031, the setting content changing process advances to step S218.

The setting content changing process advances to step S218. In step S218, the client terminal 100 sends a property setting request to the WSF device management service 200. The property setting request in step S218 includes the management subject name "system setting", the session ID, and the setting information. The setting information is information showing time and a security setting set at the property setting screen 1030 in FIG. 11.

The setting content changing process advances to step S219. In step S219, the WSF device management service 200 selects the system setting device management service 222 corresponding to the management subject name "system setting" included in the property setting request received in step S218, and sends a property setting request to the system setting device management service 222. The property setting request in step S219 includes the session ID and the setting information.

When the system setting device management service 22 receives the property setting request, the system setting device management service 222 obtains the session ID and the setting information from the property setting request, and changes the setting contents of the system setting device management service 222 by using the setting information. The setting content changing process advances to step S220. In step S220, the system setting device management service 222 sends a setting result for the property setting request received in step S219, to the WSF device management service 200. The setting content changing process further advances to step S221. In step S221, the WSF device management service 200 sends the setting result received in step S220 to the client terminal 100.

The setting content changing process advances to step S222. In step S222, the client terminal 100 displays the property setting screen 1050 as shown in FIG. 13 at the display unit. The administrator sets the property, and presses the setting execution button 1051. When the administrator presses the setting execution button 1051, the setting content changing process advances to step S222.

In step S222, the client terminal 100 sends a property setting request to the WSF device management service 200. The property setting request in step S222 includes the management subject name “FAX setting”, the session ID, and the setting information. The setting information shows header print yes/no and a self-FAX number set at the property setting screen 1050 in FIG. 13.

The setting content changing process advances to step S223. In step S223, the WSF device management service 200 selects the FAX setting device management service 223 corresponding to the management subject name “FAX setting” included in the property setting request received in step S222, and sends the property setting request to the FAX setting device management service 223. The property setting request in step S223 includes the session ID of the session established between the client terminal 100 and the FAX setting device management service 223 and the session information.

When the FAX setting device management service 223 receives the property setting request, the FAX setting device management service 223 obtains the session ID and the setting information from the property setting request, and changes the setting contents of the FAX setting device management service 223 by using the setting information. The setting content changing process advances to step S224. In step S224, the FAX setting device management service 223 sends a setting result with respect to the property setting request received in step S223, to the WSF device management service 200. The setting content changing process advances to step S225. In step S225, the WSF device management service 200 sends the setting result received in step S224 to the client terminal 100.

The setting content changing process advances to step S226. In step S226, the client terminal 100 sends a lock release request to the WSF device management service 200. The lock release request in step S226 includes the session ID. The setting content changing process advances to step S227. In step S227, the WSF device management service 200 conducts an entire device lock releasing process to release the occupied state of the image processing apparatus 1.

The setting content changing process advances to step S228. In step S228, the WSF device management service 200 sends an occupied end notice to the system setting device management service 222. The occupied end notice in step S228 includes the session ID received in step S226. The setting content changing process advances to step S229. In step S229, the system setting device management service 222 sends a response for the occupied end notice to the WSF device management service 200.

The setting content changing process advances to step S230. In step S230, the WSF device management service 200 sends the occupied end notice to the FAX setting device management service 223. The occupied end notice in step S230 includes the session ID received in step S226. The setting content changing process advances to step S231. In step S231, the system setting device management service 223 sends a response for the occupied end notice in step S230 to the WSF device management service 200. The setting content changing process advances to step S232. In step S232, the WSF device management service 200 sends an execution result of the lock release request to the client terminal 100.

The setting content changing process advances to step S233. In step S233, the client terminal 100 sends a session end request to the WSF device management service 200. The session end request in step S233 includes the session ID. The setting content changing process advances to step S234. In step S234, the WSF device management service 200 sends the session end request to the system setting device management service 222. The session end request in step S234 includes the session ID.

When the system setting device management service 222 receives the session end request, the system setting device management service 222 obtains the session ID from the session end request received in step 233, and releases the session. The setting content changing process advances to step S235. In step S235, the system setting device management service 222 sends a response for the session end request received in step S234 to the WSF device management service 200. The setting content changing process advances to step S236. In step S236, the WSF device management service 200 sends the session end request to the FAX setting device managing service 223. The session end request in step S236 includes the session ID.

When the FAX setting device management service 223 receives the session end request, the FAX setting device management service 223 obtains the session ID from the session end request received in step S236, and releases the session. The setting content changing process advances to step S237. In step S237, the FAX setting device management service 223 sends a response for the session end request received in step S236 to the WSF device management service 200. The setting content changing process advances to step S238. In step S238, the WSF device management service 200 sends the response received in steps S235 and S237 to the client terminal 100.

Next, messages sent and received between the client terminal 100 and the WSF device management service 200 of the image processing apparatus 1 in the flowcharts in FIG. 33 and FIG. 34 will be described with reference to FIG. 36 in detail.

In the flowcharts in FIG. 33 and FIG. 34, the messages sent and received between the client terminal 100 and the WSF device management service 200 of the image processing apparatus 1 are the same as the messages in the flowcharts in FIG. 5 through FIG. 7, and FIG. 29 and FIG. 30, other than step S199, and the explanation thereof will be omitted.

FIG. 36 is a diagram showing one example of a request SOAP message sent from the client terminal to the WSF device management service as the session start request in step S199 in FIG. 33. A request SOAP message 1230 in FIG. 36 includes a subject name 1231, a user name 1232, and a password 1233. As described above, in the setting content changing process according to the third embodiment of the present invention, a single request can realize the same process for which a request is conducted for each management subject in the first embodiment.

Fourth Embodiment

Figure 37:
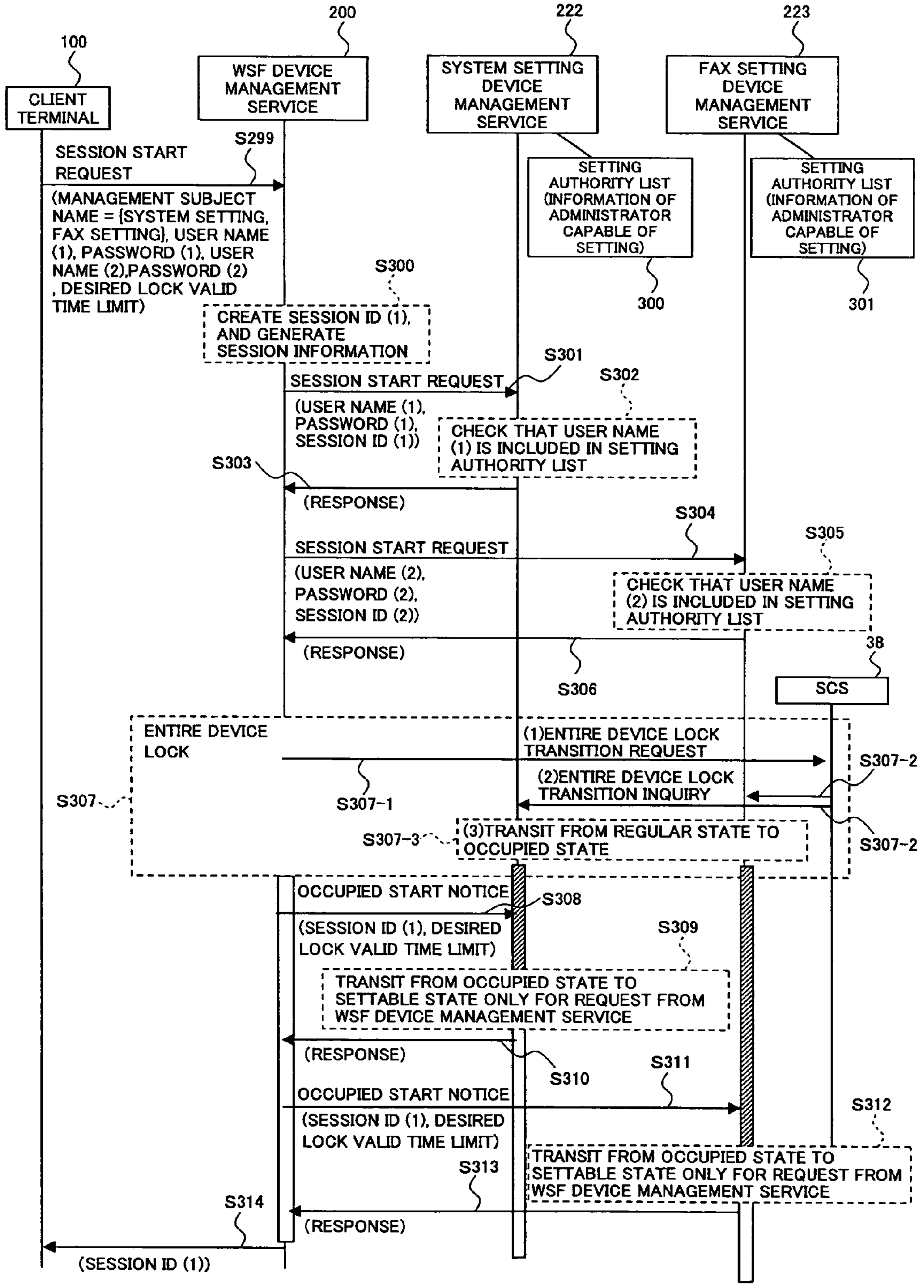
FIG. 37 is a flowchart for explaining the setting content changing process according to a fourth embodiment of the present invention.
Figure 38:
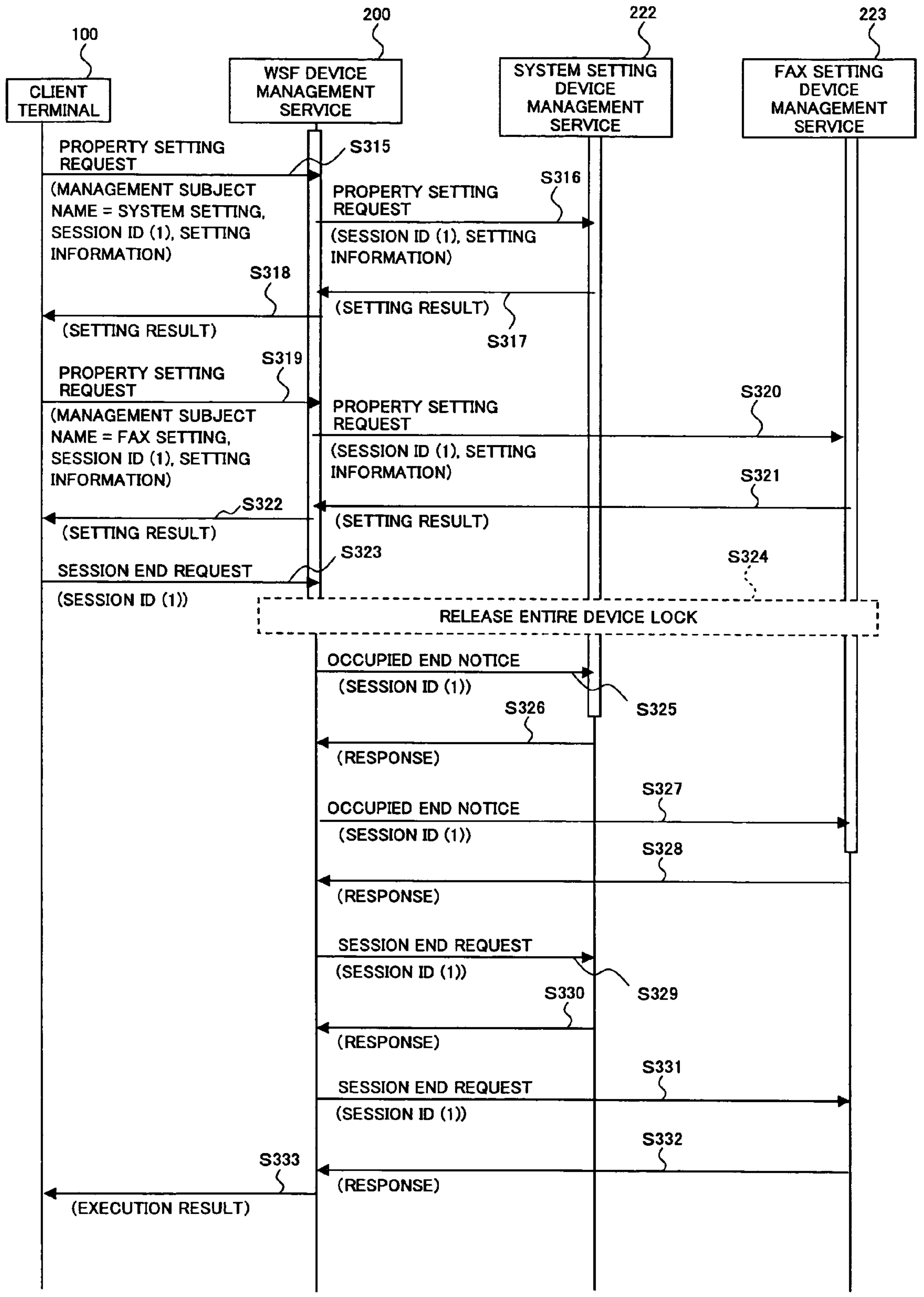
FIG. 38 is a flowchart for explaining the setting content changing process according to the fourth embodiment of the present invention.

Next, a setting content changing process according to a fourth embodiment of the present invention will be described. FIG. 37 and FIG. 38 are flowcharts for explaining the setting content changing process according to the fourth embodiment of the present invention. First, an administrator operates the client terminal 100 to request displaying the initial screen 1000 as shown in FIG. 8 as described above. The client terminal 100 displays the initial screen 1000 at the display unit.

The administrator selects a type of the setting contents (management subject name) to refer to or change, and presses the OK button 1001. When the administrator presses the OK button 1001, the client terminal 100 displays the user authentication screen 1220 as shown in FIG. 35. The administrator inputs a user name and a password for the system setting and a user name and a password for the FAX setting, and presses the OK button 1221. When the administrator presses the OK button 1221, the setting content changing process advances to step S299.

In step S299, the client terminal 100 sends a session start request to the WSF device management service 200. The session start request in step S299 includes a management subject names "system setting, FAX setting", the user name and the password for the system setting, the user name and the password for the FAX setting, and a desired lock valid time limit.

Steps S300 through S306 in FIG. 37 are the same as steps S200 through S206 in FIG. 33, and the explanation thereof will be omitted. After step S306, the WSF device management service 200 corresponds a lock to the session by using the lock managing part 201 and the session managing part 202. Steps S307 through S313 in FIG. 37 are the same as steps S210 through S216 in FIG. 33, and the explanation thereof will be omitted.

The setting content changing process advances to step S314. In step S314, the WSF device management service 200 sends a response for the session start request in step S299 to the client terminal 100. The response in step S314 includes the session ID. Steps S315 through S322 in FIG. 38 are the same as steps S218 through S225 in FIG. 34, and the explanation thereof will be omitted.

The setting content changing process advances to step S323. In step S323, the client terminal 100 sends a session end request to the WSF device management service 200. The session end request in step S323 includes the session ID. Steps S324 through S328 in FIG. 38 are the same as steps S227 through S231 in FIG. 34, and the explanation thereof will be omitted. Steps S329 through S333 in FIG. 38 are the same as steps S234 through S238 in FIG. 34, and the explanation thereof will be omitted.

Next, messages sent and received between the client terminal 100 and the WSF device management service 200 of the image processing apparatus 1 in the flowcharts in FIG. 37 and FIG. 38 will be described with reference to FIG. 39 in detail.

In the flowcharts in FIG. 37 and FIG. 38, the messages sent and received between the client terminal 100 and the WSF device management service 200 of the image processing apparatus 1 are the same as the messages in the flowcharts in FIG. 5 through FIG. 7, FIG. 29 and FIG. 30, and FIG. 33 and FIG. 34, other than step S299, and the explanation thereof will be omitted.

FIG. 39 is a diagram showing one example of a request SOAP message sent from the client terminal to the WSF device management service as the session start request in step S299 in FIG. 37. A request SOAP message 1240 in FIG. 39 includes a management subject name 1241, a user name 1242, a password 1243, a desired lock valid time limit 1244. As described above, the setting content changing process according to the fourth embodiment of the present invention, it is possible for a single request to correspond the session and the lock authority, which are conducted by a plurality of requests in the first embodiment.

Fifth Embodiment

Figure 40:
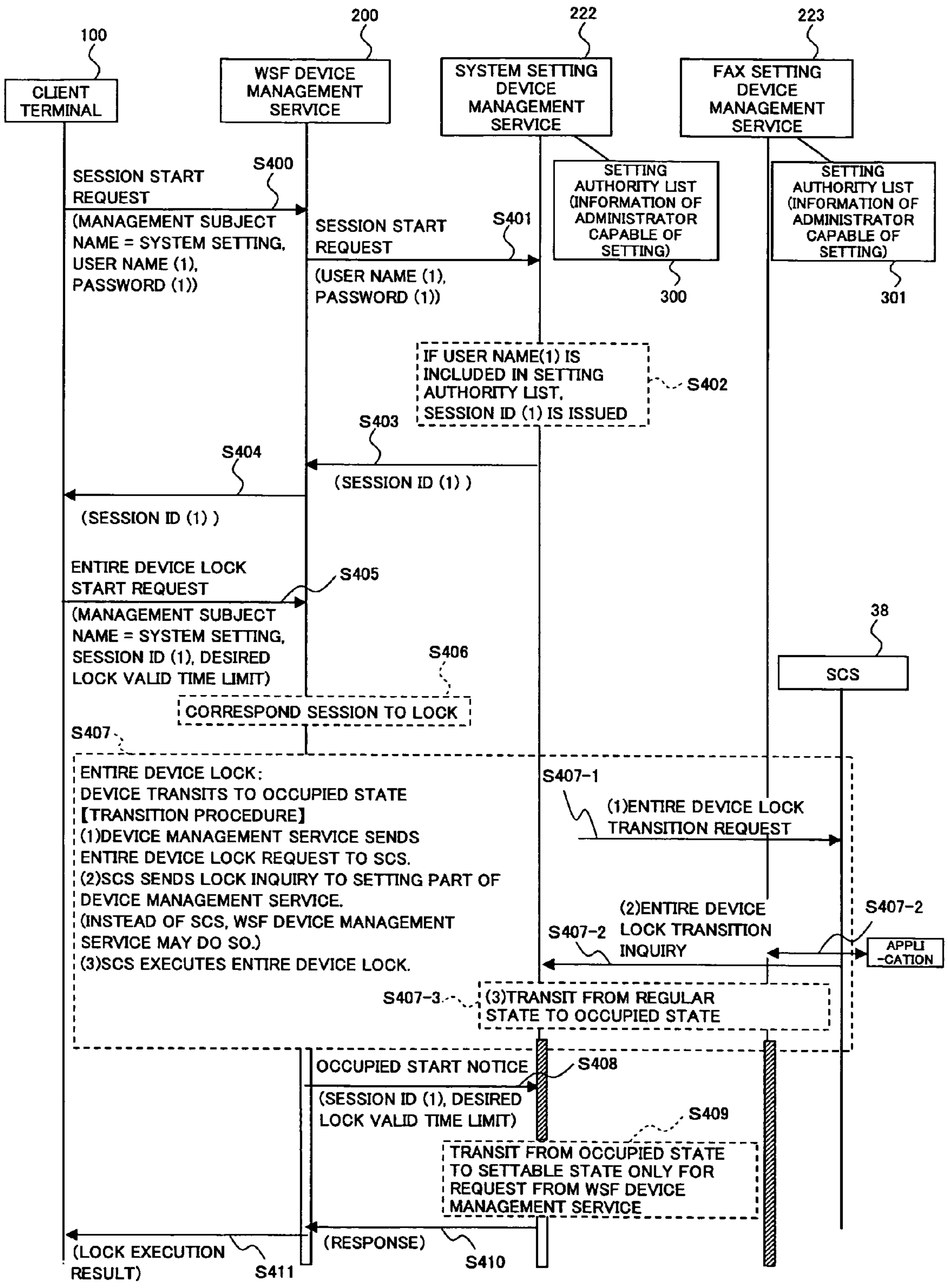
FIG. 40 is a flowchart for explaining the setting content changing process according to a fifth embodiment of the present invention.
Figure 41:
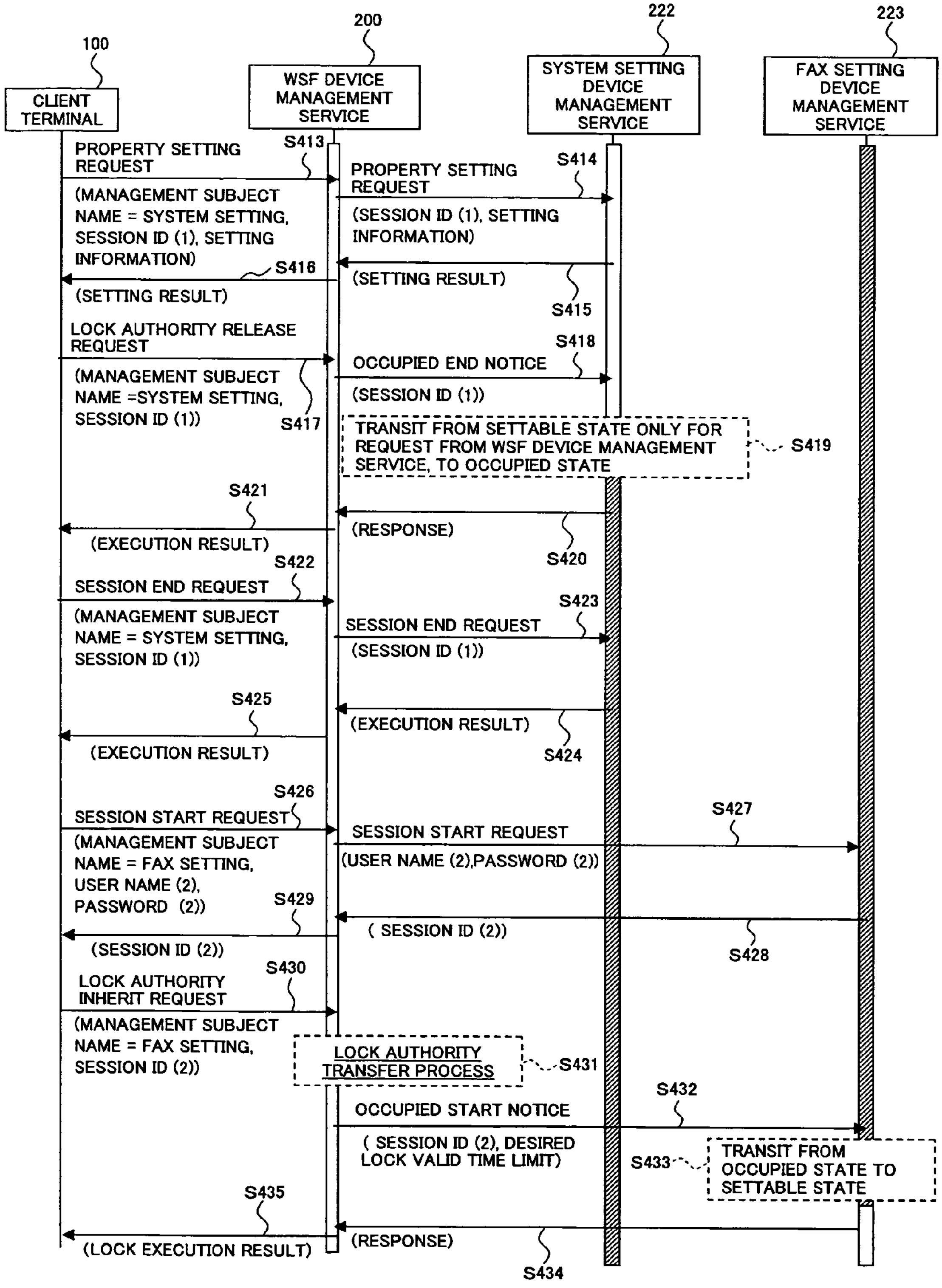
FIG. 41 is a flowchart for explaining the setting content changing process according to the fifth embodiment of the present invention.
Figure 42:
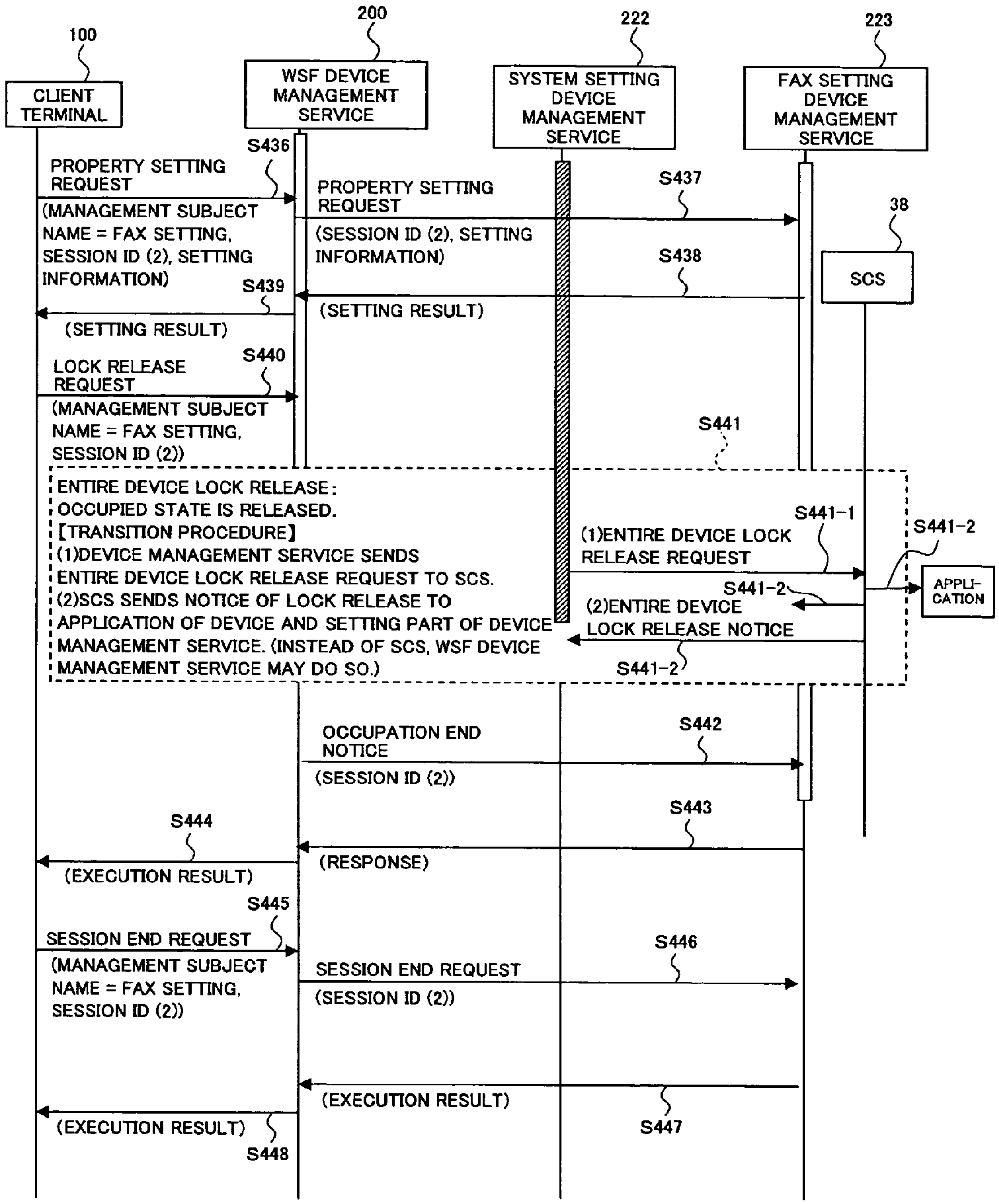
FIG. 42 is a flowchart for explaining the setting content changing process according to the fifth embodiment of the present invention.
Figure 44:
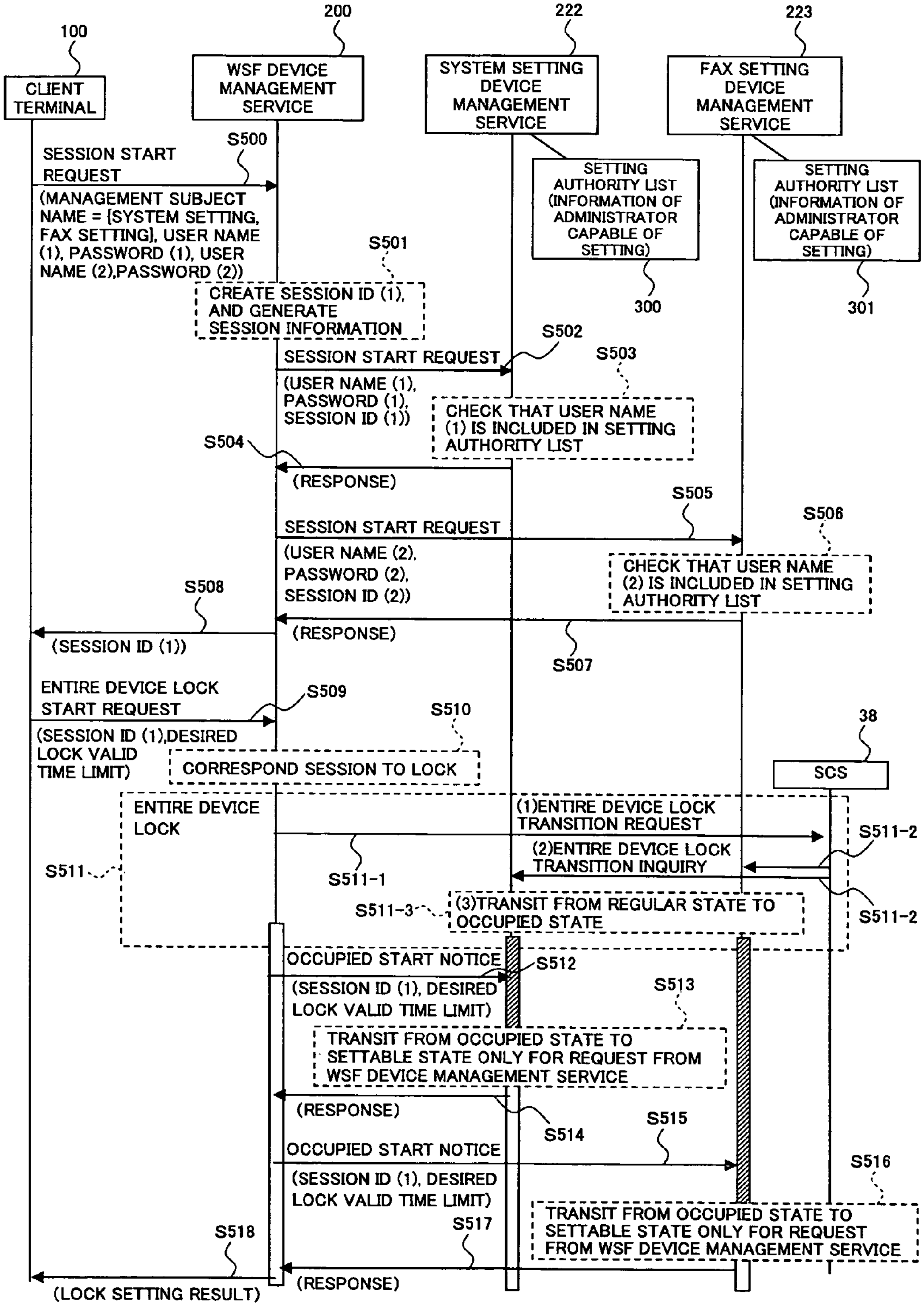
FIG. 44 is a flowchart for explaining the setting content changing process according to a sixth embodiment of the present invention.
Figure 45:
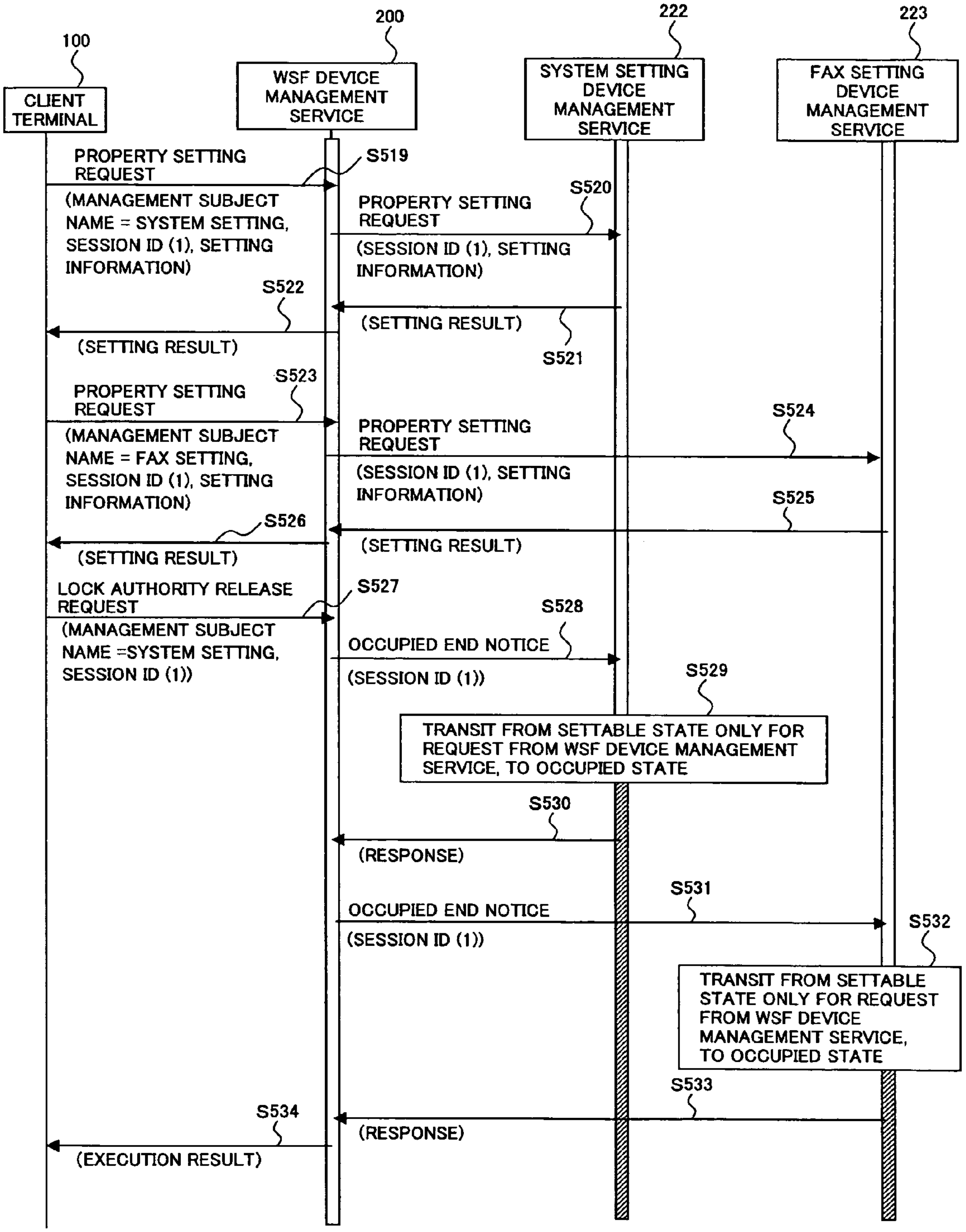
FIG. 45 is a flowchart for explaining the setting content changing process according to the sixth embodiment of the present invention.
Figure 46:
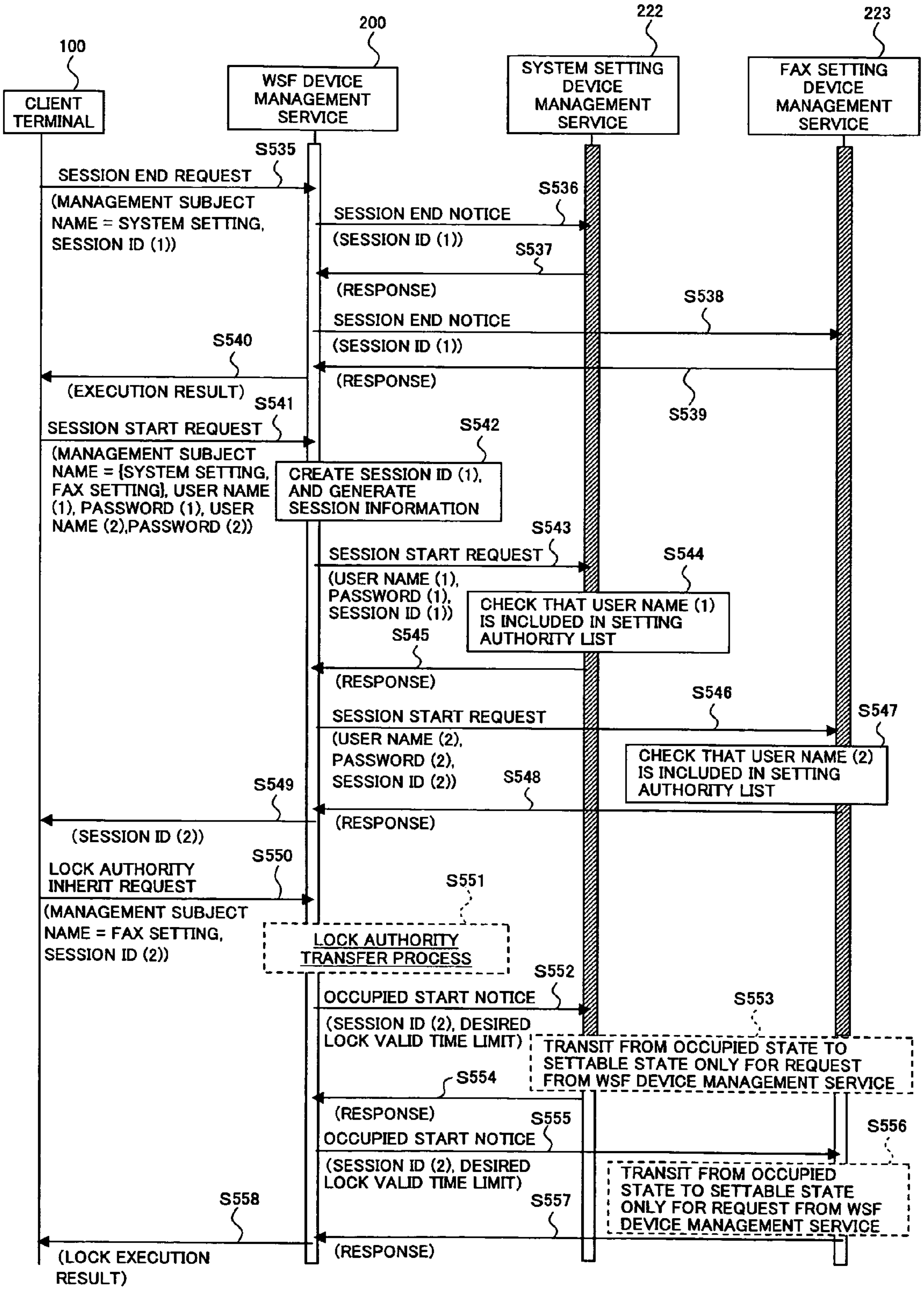
FIG. 46 is a flowchart for explaining the setting content changing process according to the sixth embodiment of the present invention.
Figure 47:
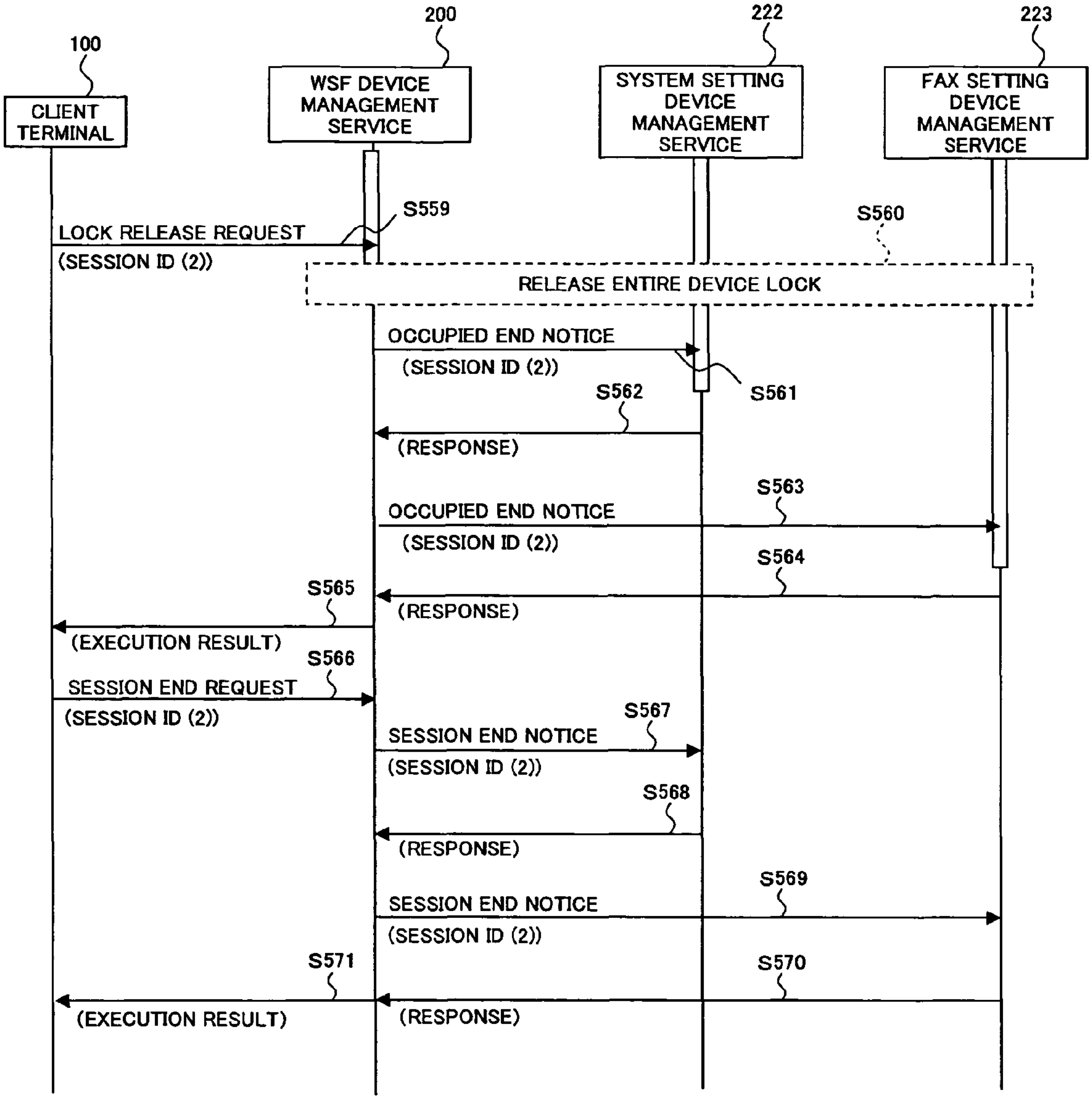
FIG. 47 is a flowchart for explaining the setting content changing process according to the sixth embodiment of the present invention.

Next, a setting content changing process according to a fifth embodiment of the present invention will be described. FIG. 40 through FIG. 42 are flowcharts for explaining the setting content changing process according to the fifth embodiment of the present invention. Steps S400 through S429 in the flowcharts in FIG. 40 through FIG. 42 are the same as steps S10 through S39 in FIG. 5 through FIG. 7, and the explanation thereof will be described.

When the client terminal 100 receives the session ID in step S429, the setting content changing process advances to step S430. In step S430, the client terminal 100 sends a lock authority inherit request to the WSF device management service 200. The lock authority inherit request in step S430 includes the management subject name "FAX setting", and the session ID of the session established between the client terminal 100 and the FAX setting device management service 223.

In the lock authority inherit request in the fifth embodiment, the URL of the system setting device management service 222 included in the lock authority inherit request and the session ID of the session established between the client terminal 100 and the system setting device management service 222 in the first embodiment are deleted. That is, in the lock authority inherit request in the fifth embodiment, it is possible to conduct the lock authority transferring process without sending the URL and the session ID of the device management service, which releases a lock, from the client terminal 100 to the WSF device management service 200. Steps s431 through S448 after step S430 are the same as steps S41 through S58 in FIG. 5 through FIG. 7, and the explanation thereof will be omitted.

Next, in the flowcharts in FIG. 40 through FIG. 42, messages sent and received between the client terminal 100 and the WSF device management service 200 of the image processing apparatus 1 will be described with reference to FIG. 43 in detail.

Steps S400 through S429, and steps S431 through S448 in the flowcharts in FIG. 40 through FIG. 42 are the same as steps S10 through S39 and steps S41 through S58 in FIG. 5 through FIG. 7, and the detailed explanation of the messages sent and received between the client terminal 100 and the WSF device management service 200 of the image processing apparatus 1 will be omitted.

FIG. 43 is a diagram showing one example of a request SOAP message sent from the client terminal to the WSF device management service as the lock authority inherit request instep S430 in FIG. 41. A request SOAP message 1250 in FIG. 43 includes a session ID 1251 of the session established between the client terminal 100 and the FAX setting device management service 223, and a management subject name 1252. That is, in the request SOAP message 1250 in FIG. 43, the URL of the system setting device management service 222 and the session ID of the session established between the client terminal 100 and the system setting device management service 222 included in the request SOAP message 1160 in FIG. 25 are deleted.

As described above, in the setting content changing process according to the fifth embodiment of the present invention, it is possible to conduct the lock authority transferring process even if the URL of the system setting device management service 222 and the session ID of the session established between the client terminal 100 and the system setting device management service 222 included in the lock authority inherit request in the first embodiment are deleted.

Sixth Embodiment

Next, a setting content changing process according to a sixth embodiment of the present invention will be described. FIG. 44 through FIG. 47 are flowcharts for explaining the setting content changing process according to the sixth embodiment of the present invention. Steps S500 through S526 in the flowcharts in FIG. 44 through FIG. 47 are the same as steps S199 through S225 in FIG. 33 through FIG. 34, and the explanation thereof will be omitted.

When the client terminal 100 receives the setting result in step S526, the setting content changing process advances to step S527. In step S527, the client terminal 100 sends a lock authority release request to the WSF device management service 200. The lock authority release request in step S527 includes the management subject name "system setting", and the session ID. The setting content changing process advances to step S528. In step S528, the WSF device management service 200 selects the system setting device management service 222 corresponding to the management subject name "system setting" included in the lock authority release request receive in step S527, and sends an occupied end notice to the system setting device management service 222. The occupied end notice in step S528 includes the session ID received in step S527.

The setting content changing process advances to step S529. In step S529, the system setting device management service 222 transits from the settable state to the occupied state. The setting content changing process advances to step S530. In step S530, the system setting device management service 222 sends a response for the occupied end notice in step S528 to the WSF device management service 200.

The setting content changing process advances to step S531. In step S531, the WSF device management service 200 selects the FAX setting device management service 223 corresponding to the management subject name "FAX setting" included in the session start request received in step S500, and sends an occupied end notice to the FAX setting device management service 223. The occupied end notice includes the session ID received in step S527.

The setting content changing process advances to step S532. In step S532, the FAX setting device management service 223 transits from the settable state to the occupied state. The setting content changing process advances to step S533. In step S533, the FAX setting device management service 223 sends a response with respect to the occupied end notice in step S531 to the WSF device management service 200. Then, setting content changing process advances to step S534. In step S534, the WSF device management service 200 sends an execution result of the lock authority release request to the client terminal 100.

The setting content changing process advances to step S535. In step S535, the client terminal 100 sends a session end request to the WSF device management service 200. The session end request in step S535 includes the session ID. The setting content changing process advances to step S536. In step S536, the WSF device management service 200 selects the system setting device management service 222 corresponding to the management subject name "system setting" included in the session start request received in step S500, and sends a session end notice to the system setting device management service 222. The session end notice in step S536 includes the session ID.

When the system setting device management service 222 receives the session end notice, the system setting device management service 222 obtains the session ID from the session end notice received in step S536, and releases the session corresponding to the session ID. The setting content changing process advances to step S537. In step S537, the system setting device management service 222 sends a response with respect to the session end notice received in step S537 to the WSF device management service 200.

The setting content changing process advances to step S538. In step S538, the WSF device management service 200 selects the FAX setting device management service 223 corresponding to the management subject name "FAX setting" included in the session start request received in step S500, and sends the session end notice to the FAX setting device management service 223. The session end notice in step S538 includes the session ID.

When the FAX setting device management service 223 receives the session end notice, the FAX setting device management service 223 obtains the session ID from the session end notice received in step S538, and release the session corresponding to the session ID. The setting content changing process advances to step S539. In step S539, the FAX setting device management service 223 sends a response with respect to the session end notice received step S538 to the WSF device management service 200. The setting content changing process advances to step S540. In step S540, the WSF device management service 200 sends an execution result of the session end request to the client terminal 100.

Steps S541 through S549 are the same as steps S500 through S508, and the explanation thereof will be omitted. In step S541 through S549, a new session ID for a session to establish between the client terminal 100 and the WSF device management service 200 is created and sent to the client terminal 100.

When the client terminal 100 receives the session ID in step S549, the setting content changing process advances to step S550, and sends the lock authority inherit request to the WSF device management service 200. The lock authority release request in step S550 includes the management subject name "FAX setting", and the session ID received in step S549.

The setting content changing process advances to step S551. In step S551, the WSF device management service 200 transfers the lock authority possessed by the session corresponding the session ID created in step S501 to another session created in step S542.

The setting content changing process advances to step S552. In step S552, the WSF device management service 200 selects the system setting device management service 222 corresponding to the management subject name "system setting" included in the session start request received in step S541, and sends an occupied start notice to the system setting device management service 222. The occupied start notice in step S552 includes the session ID received in step S550 and the desired lock valid time limit.

The setting content changing process advances to step S553. In step S553, the system setting device management service 222 transits from the occupied state to the settable state. The setting content changing process advances to step S554. In step S554, the system setting device management service 222 sends a response with respect to the occupied start notice in step S552 to the WSF device management service 200.

The setting content changing process advances to step S555. In step S555, the WSF device management service 200 selects the FAX setting device management service 223 corresponding to the management subject name "FAX setting" included in the lock authority inherit request receive in step S550, and sends an occupied start notice to the FAX setting device management service 223. The occupied start notice in step S555 includes the session ID received in step S550 and the desired lock valid time limit.

The setting content changing process advances to step S556. In step S556, the FAX setting device management service 223 transits from the occupied state to the settable state. The setting content changing process advances to step S557. In step S557, the FAX setting device management service 223 sends a response with respect to the occupied start notice in step S555 to the WSF device management service 200. The setting content changing process advances to step S558. In step S558, the WSF device management service 200 sends a lock execution result to the client terminal 100.

The setting content changing process advances to step S559. In step S559, the client terminal 100 sends a lock release request to the WSF device management service 200. The lock release request in step S559 includes the session ID received in step S549. The setting content changing process advances to step S560. In step S560, the WSF device management service 200 conducts an entire device lock releasing process to release the occupied state of the image processing apparatus 1.

The setting content changing process advances to step S561. In step S561, the WSF device management service 200 sends the occupied end notice to the system setting device management service 222. The occupied end notice in step S561 includes the session ID received in step S559. The setting content changing process advances to step S562. In step S562, the system setting device management service 222 sends a response with respect to the occupied end notice in step S561 to the WSF device management service 200.

The setting content changing process advances to step S563. In step S563, the WSF device management service 200 sends the occupied end notice to the FAX setting device management service 223. The occupied end notice in step S563 includes the session ID received in step S559. The setting content changing process advances to step S564. In step S564, the FAX setting device management service 223 sends a response with respect to the occupied end notice in step S563 to the WSF device management service 200. The setting content changing process advances to step S565. In step S565, the WSF device management service 200 sends an execution result of the lock release request to the client terminal 100.

The setting content changing process advances to step S566. In step S566, the client terminal 100 sends a session end request to the WSF device management service 200. The session end request in step S566 includes the session ID received in step S549. The setting content changing process further advances to step S567. In step S567, the WSF device management service 200 sends a session end notice to the system setting device management service 222. The session end notice in step S567 includes the session ID received in step S566.

When the system setting device management service 222 receives the session end notice, the system setting device management service 222 obtains the session ID from the session end notice received in step S567, and releases the session. The setting content changing process advances to step S568. In step S568, the system setting device management service 222 sends a response with respect to the session end notice received in step S567 to the WSF device management service 200. The setting content changing process advances to step S569. In step S569, the WSF device management service 200 sends a session end notice to the FAX setting device management service 223. The session end notice in step S569 includes the session ID received in step S566.

When the FAX setting device management service 223 receives the session end notice, the FAX setting device management service 223 obtains the session ID from the session end notice received in step S569, and release the session. The setting content changing process advances to step S570. In step S570, the FAX setting device management service 223 sends a response with respect to the session end notice received in step 569 to the WSF device management service 200. The setting content changing process advances to step S571. Instep S571, the WSF device management service 200 sends a response with respect to the session end request to the client terminal 100.

As described above, in the setting content changing process according to the sixth embodiment of the present invention, it is possible to maintain the lock state after the lock authority is released, even if an original session in which the lock authority is released ends.

Seventh Embodiment

Figure 48:
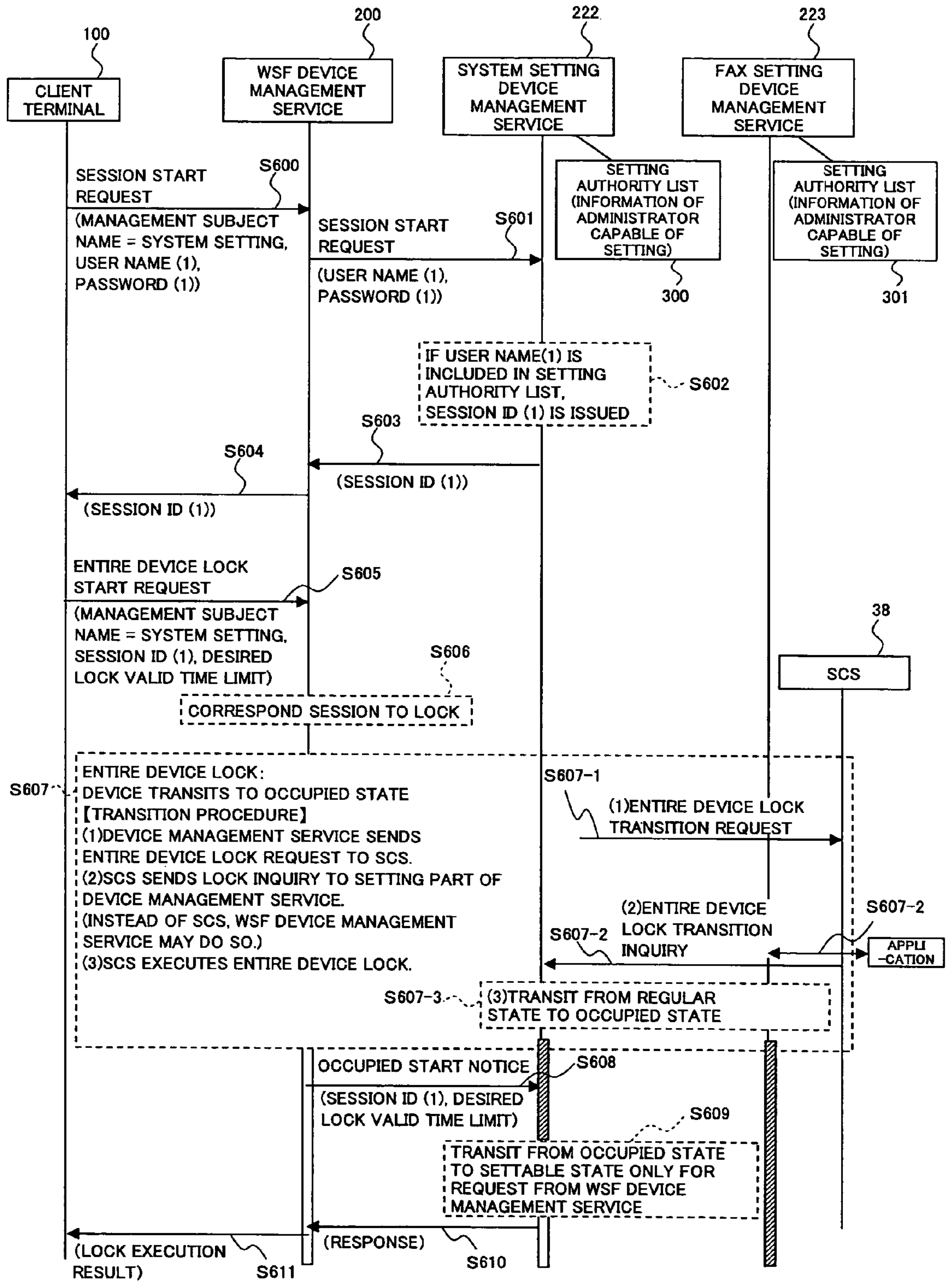
FIG. 48 is a flowchart for explaining the setting content changing process according to a seventh embodiment of the present invention.
Figure 49:
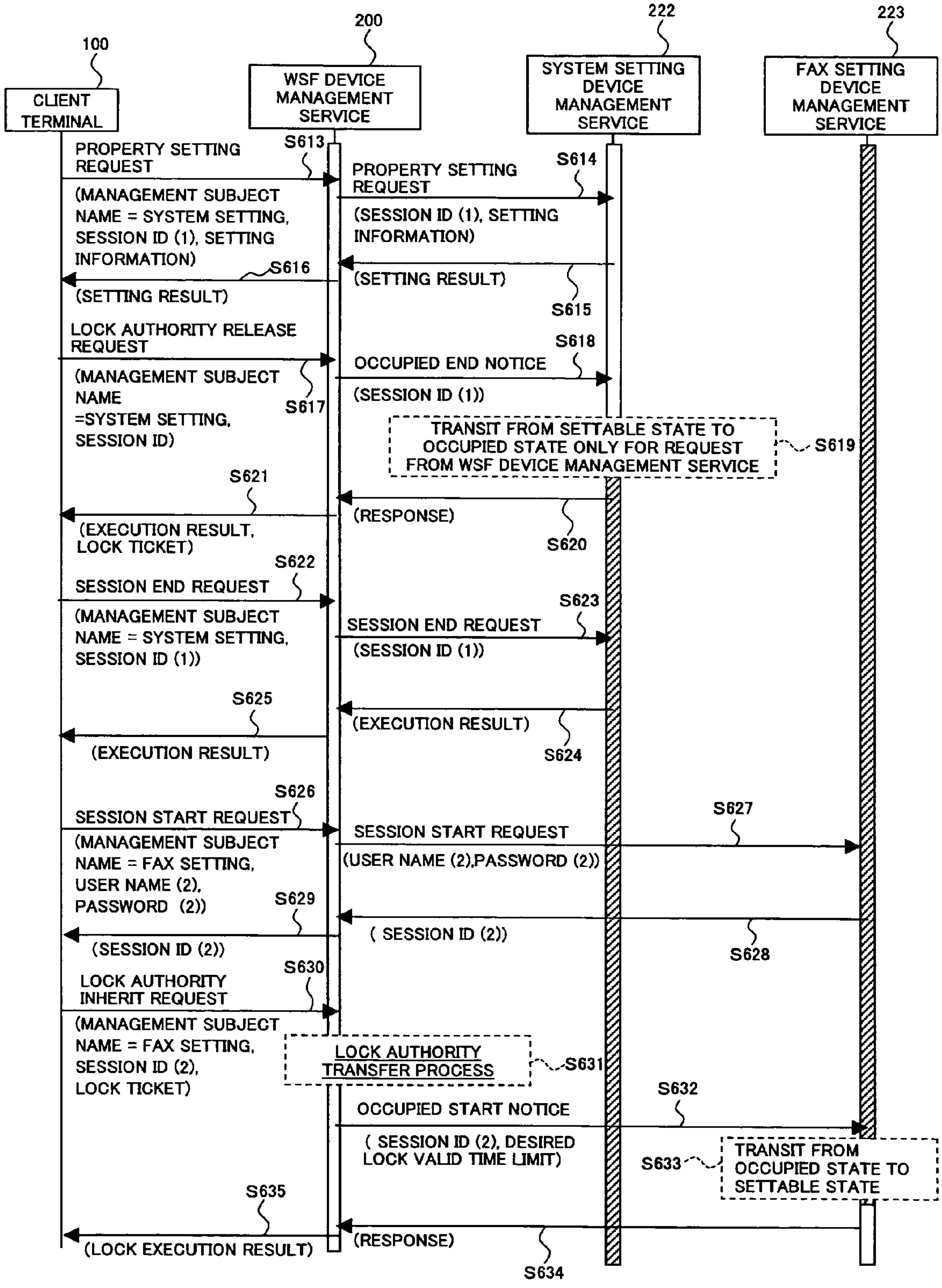
FIG. 49 is a flowchart for explaining the setting content changing process according to the seventh embodiment of the present invention.
Figure 50:
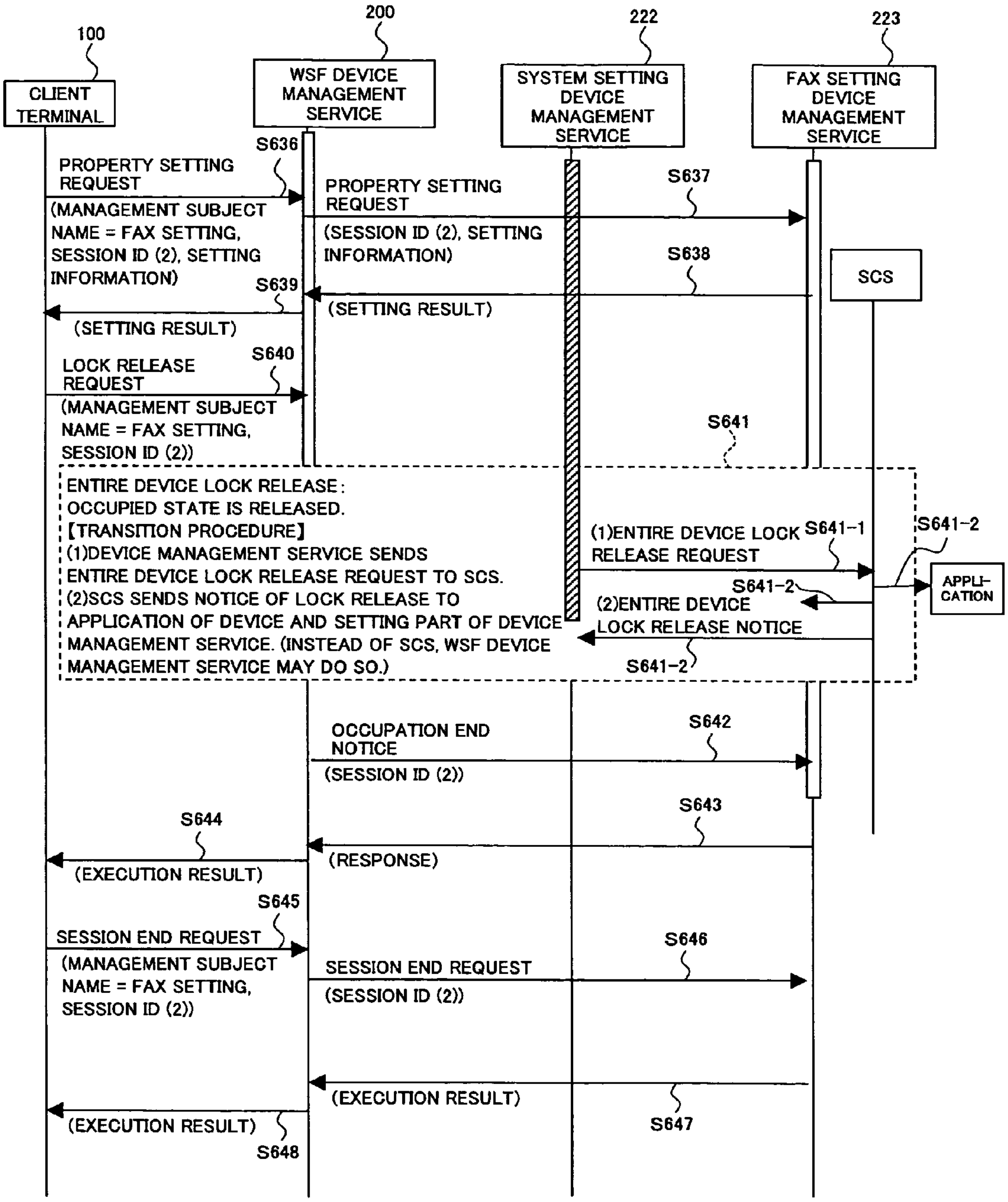
FIG. 50 is a flowchart for explaining the setting content changing process according to the seventh embodiment of the present invention.

Next, a setting content changing process according to a seventh embodiment of the present invention will be described. FIG. 48 through FIG. 50 are flowcharts for explaining the setting content changing process according to the seventh embodiment of the present invention. Steps S600 through S616 in FIG. 48 through FIG. 50 are the same as step S10 through S26, and the explanation thereof will be omitted.

When the client terminal 100 receives a setting result in step S616, the setting content changing process advances to step S617. In step S617, the WSF device management service 200 sends a lock authority release request. The lock authority release request in step S617 includes a management subject name "system setting", and the session ID. The setting content changing process advances to step S618. In step S618, the WSF device management service 200 selects the system setting device management service 222 corresponding to the management subject name "system setting" included in the lock authority release request received in step S617, and sends an occupied end notice to the system setting device management service 222. The occupied end notice in step S618 includes the session ID received in step S617.

The setting content changing process advances to step S619. In step S619, the system setting device management service 222 transits from the settable state to the occupied state. The setting content changing process advances to step S620. In step S620, the system setting device management service 222 sends a response with respect to the occupied end notice in step S618 to the WSF device management service 200. The setting content changing process advances to step S621. In step S621, the WSF device management service 200 sends an execution result of the lock authority release request and a lock ticket to the client terminal 100.

The lock ticket is information to prove a possession of an authority for inheriting the lock authority, instead of the URL of the management subject service previously possessing the lock authority and the session ID.

Steps S622 through S629 are the same as step S32 through S39, and the explanation thereof will be omitted. When the client terminal 100 receives the session ID in step S629, the setting content changing process advances to step S630. In step S630, the WSF device management service 200 sends the lock authority inherit request. The lock authority inherit request in step S630 includes the management subject name "FAX setting", the session ID received in step S629, and the lock ticket.

The setting content changing process advances to step S631. In step S631, the WSF device management service 200 transfers the lock authority possessed by the session established between the client terminal 100 and the system setting device management service 222, to another session established between the client terminal 100 and the FAX setting device management service 223.

The setting content changing process advances to step S632. In step S632, the WSF device management service 200 selects the FAX setting device management service 223 corresponding to the management subject name "FAX setting" included in the lock authority inherit request received in step S630, and sends the occupied start notice to the FAX setting device management service 223. The occupied start notice in step S632 includes the session ID established between the client terminal 100 and the FAX setting device management service 223, and the desired lock valid time limit.

The setting content changing process advances to step S633. In step S633, the FAX setting device management service 223 transits from the occupied state to the settable state. The setting content changing process advances to step S634. In step S634, the FAX setting device management service 223 sends a response with respect to the occupied start notice in step S632 to the WSF device management service 200. The setting content changing process advances to step S635. In step S635, the WSF device management service 200 sends a lock execution result to the client terminal 100.

Steps S636 through S648 are the same as step S46 through S58 in FIG. 5 through FIG. 7, and the explanation thereof will be omitted. Next, messages sent and received between the client terminal 100 and the WSF device management service 200 of the image processing apparatus 1 in the flowcharts in FIG. 48 through FIG. 50 will be described with reference to FIG. 51 and FIG. 52.

The messages sent and received between the client terminal 100 and the WSF device management service 200 of the image processing apparatus 1 in the flowcharts in FIG. 48 through FIG. 50 are the same as the messages in the flowcharts in FIG. 5 through FIG. 7, other than step S621 and S630, and the explanation thereof will be omitted.

FIG. 51 is a diagram showing one example of a response SOAP message sent form the WSF device management service to the client terminal as the response with respect to the lock authority release request in step S621 in FIG. 49. A response SOAP message 1260 in FIG. 51 includes an execution result 1261 in response to the lock authority release request and a lock ticket 1262.

FIG. 52 is a diagram showing one example of a request SOAP message sent from the client terminal to the WSF device management service as the lock authority inherit request in step S630 in FIG. 49. A request SOAP message 1270 in FIG. 52 includes a session ID 1271 of the session established between the client terminal 100 and the FAX setting device management service 223, a management subject name 1272, and a lock ticket 1273.

As described above, in the setting content changing process according to the seventh embodiment of the present invention, it is possible to use the lock ticket without sending the session ID of the session releasing the lock authority at the lock authority release request.

In the following, as one example of the setting contents including the plurality of setting items, address book data will be applied. However, any information including one or more setting items classified into a plurality of groups can be applied as the setting contents.

In the following embodiments, the configuration in FIG. 1 and the hardware configuration in FIG. 2 are applied to an image processing apparatus 4001.

Figure 54:
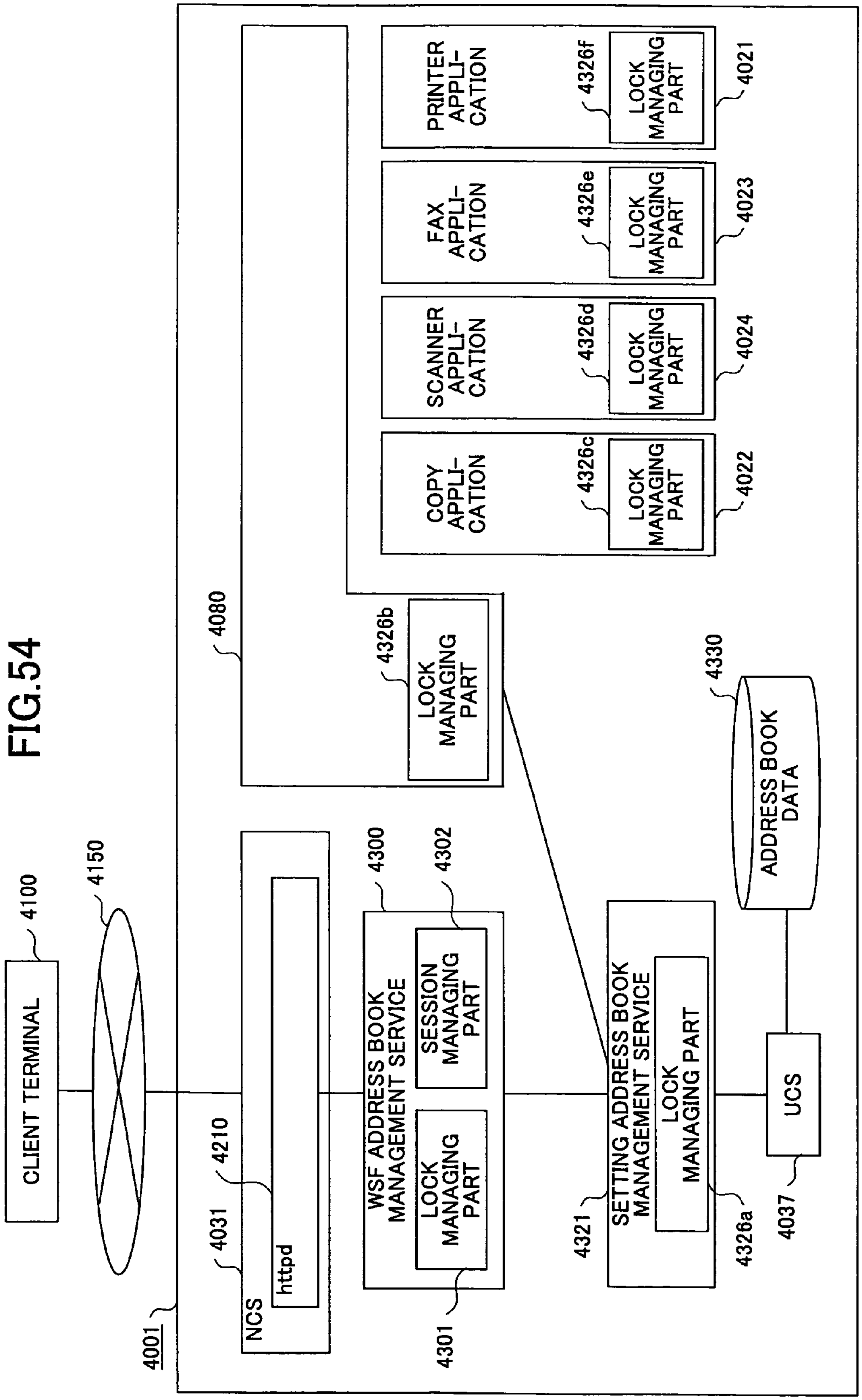
FIG. 54 is a block diagram showing another functional configuration of the image processing apparatus to explain a setting content changing method according to the present invention.

FIG. 54 is a block diagram showing another functional configuration of the image processing apparatus to explain a setting content changing method according to the present invention. In the functional configuration shown in FIG. 3, functional parts that are not necessary to explain the setting content changing method will be omitted.

In the functional configuration in FIG. 54, a printer application 4021, a copy application 4022, a fax application 4023, a scanner application 4024, a UCS 4037 (corresponding to the UCS 37 in FIG. 3), an operation panel 4080, a WSF address book management service 4300 as a main information managing part, a setting address book management service 4321 as a setting information managing part, and address book data 4330 including data concerning a plurality of address books are shown in the image processing apparatus 4001.

The image processing apparatus 4001 is connected to a client terminal 4100 through a network 4150 such as the Internet, a LAN, or a like. In the image processing apparatus 4001, various setting contents concerning an address book are stored as the address book data 4330 and the address book data 4330 are referred to or changed remotely from the client terminal 4100. Also, the address book data 4330 are referred to or changed by a operator operating the operation panel 4080 provided at the image processing apparatus 4001.

For example, the image processing apparatus 4001 conducts a data exchange with the client terminal 4100 in an XML (extensible Markup Language) form. For example, the image processing apparatus 1 and the client terminal 4100 use a communication protocol, which is called SOAP (Simple Object Access Protocol) as a data access protocol.

In a case of referring to or changing the address book data 4330 remotely from the client terminal 4100, the operator connects the client terminal 4100 to the WSF address book management service 4300 through the network 4150, and an NCS 4031 (corresponding to the NCS 31 in FIG. 3). For example, the NCS 4031 controls the data communication with the client terminal 4100 in accordance with an HTTP (HyperText Transfer Protocol) by an httpd (HyperText Transfer Protocol Daemon) 4210 (corresponding to the httpd 21 in FIG. 3).

The WSF address book management service 4300 includes a lock managing part 4301, and a session managing part 4302. The lock managing part 4301 manages a state called a lock (lock state) in that the setting contents cannot be referred to and changed from other operators or any application (copy application 4022 corresponding to the copy application 22 in FIG. 3) of the image processing apparatus 4001 while one operator is referring to or changing the address book data 4330. As described later, the lock (lock state) includes an occupied state in that the address book data 4330 are occupied and cannot be referred to and changed, and a settable state in that the address book data 4330 are occupied but can be referred to or changed.

The session managing part 4302 manages each session that is established with the setting address book management service 4321 as a management subject. The WSF address book management service 4300 makes a correspondence between the lock and the session by using the lock managing part 4301 and the session managing part 4302. For example, the WSF address book management service 4300 is realized as one function of the WSF 27 shown in FIG. 1.

The setting address book management service 4321 conducts a process concerning a change or a reference of the address book data 4330 managed by the UCS 4037. For example, the setting address book management service 4321 is realized as the SFs 28 in FIG. 1. In the image processing apparatus 4001 in FIG. 54, the setting address book management service 4321, the operation panel 4080, the copy application 4022 (corresponding to the copy application 22 in FIG. 3), the scanner application 4024 (corresponding to the scanner application 24), the FAX application 4023 (corresponding to the FAX application 23), and the printer application 4021 (corresponding to the printer application 21) include lock managing parts 4326*a* through 4326*f*, respectively, and conduct respective processes corresponding to the lock state, which will be described later.

Figure 55:
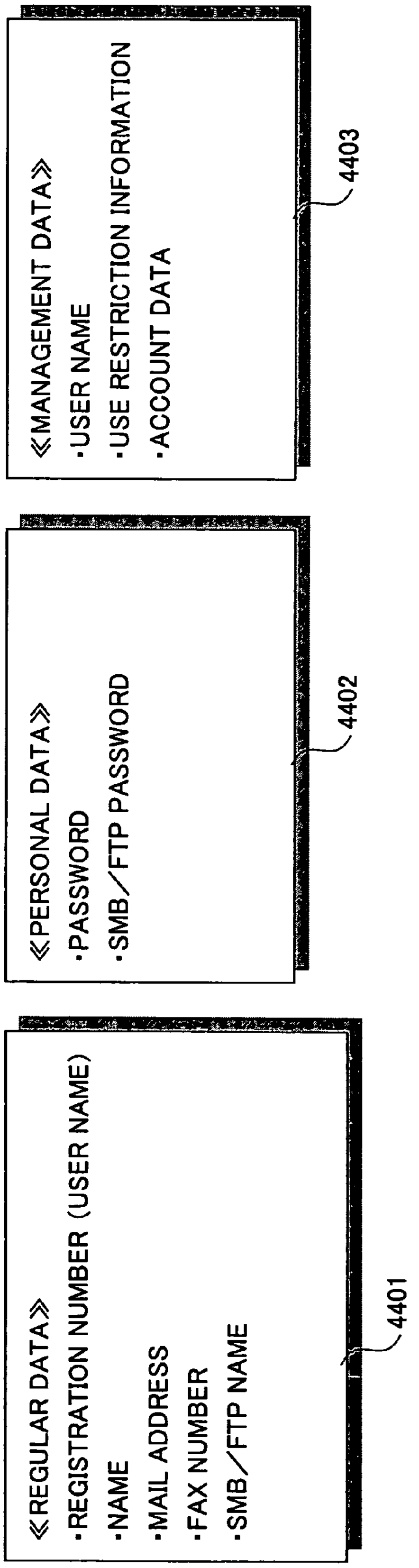
FIG. 55 is a diagram showing one example of a configuration of address book data classified into a plurality of groups, according to the present invention.

FIG. 55 is a diagram showing one example of a configuration of the address book data classified into the plurality of groups. The address book data in FIG. 55 is classified into groups of regular data 4401, personal data 4402, and management data 4403. The regular data 4401 include contents such as an e-mail address for an e-mail transmission to open to the public. For example, the regular data 4401 include a registration number (user name), a name, an e-mail address, a FAX number or a SMB (Server Message Block)/FTP (File Transfer Protocol) name, and a like.

The personal data 4402 are data such as a password that is used personally by a user. For example, the personal data 4402 include the password, a SMB/FTP password, and a like. The management data 4403 are data such as account data which are used by the administrator. For example, the management data include the user name, user restriction information, the account data, and the like.

The acceptable subject for each of the regular data 4401, the personal data 4402, and the management data 4403 shown in FIG. 55, which form the address book data 4330, is different in the viewpoint of the data protection. For example, the regular data 4401 can be accessed by the regular user and the administrator. The personal data 4402 can be accessed by the regular user. The management data 4403 can be accessed by the administrator.

Eighth Embodiment

Figure 56:
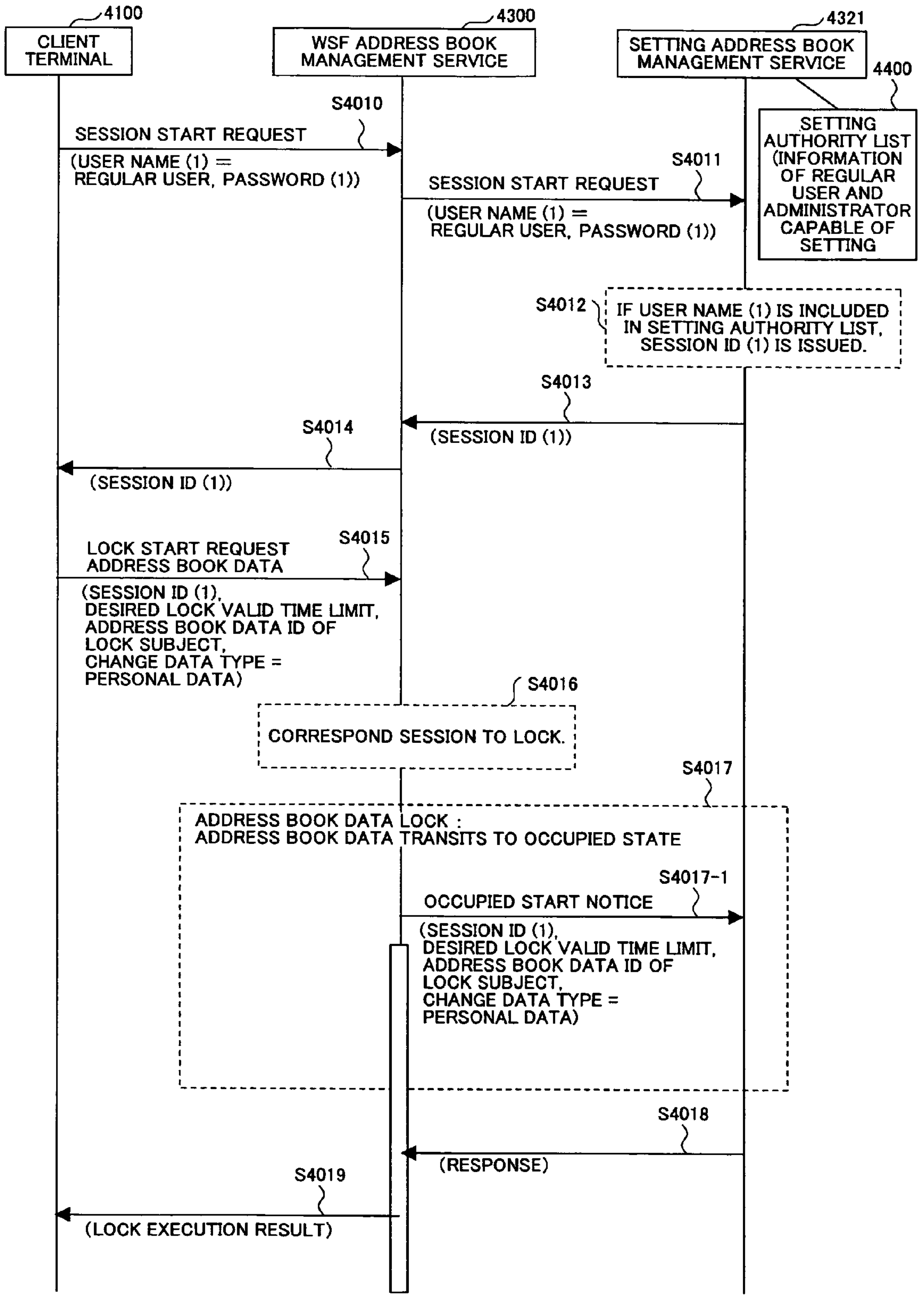
FIG. 56 is a flowchart for explaining a setting content changing process according to an eighth embodiment of the present invention.
Figure 57:
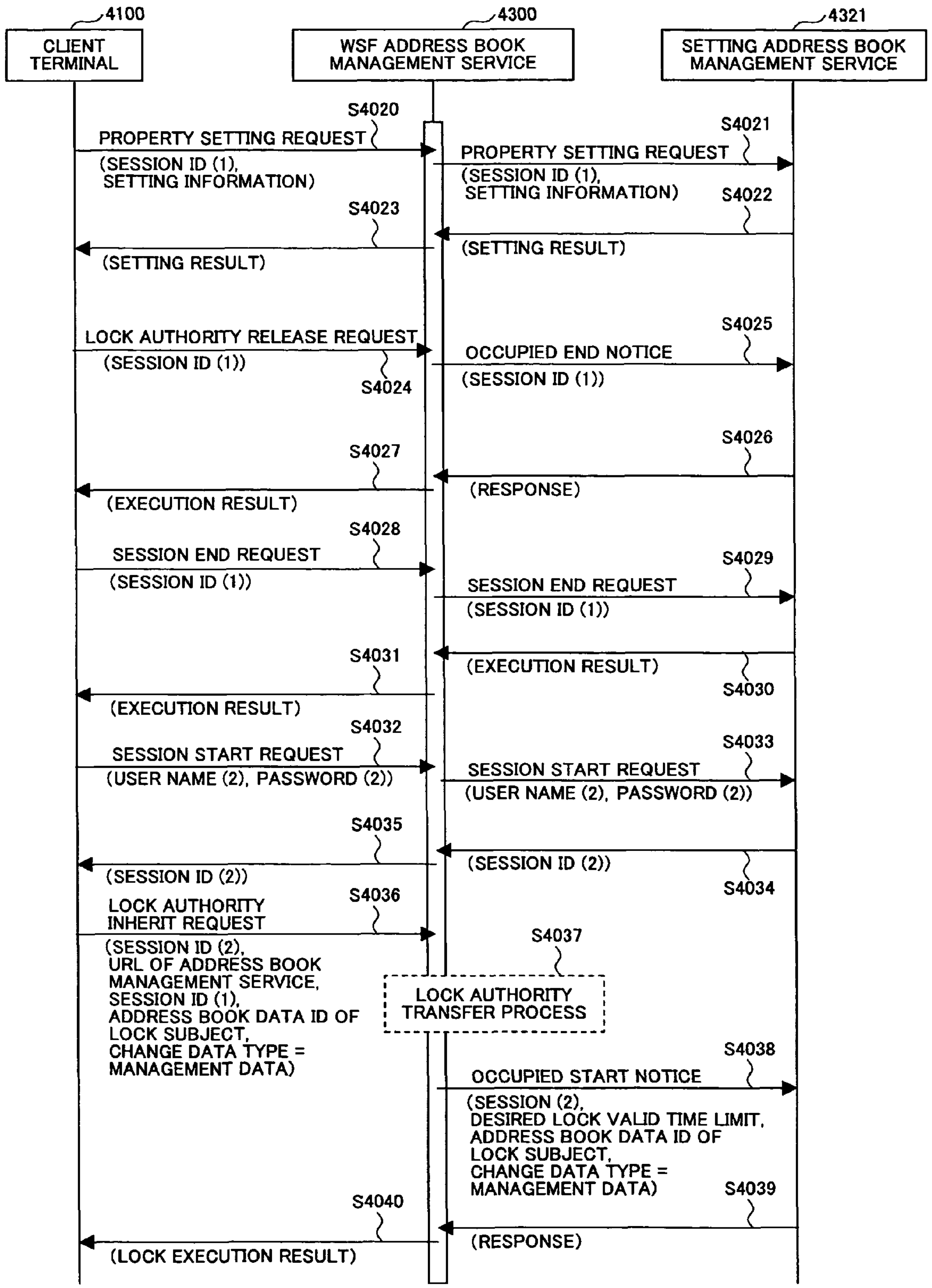
FIG. 57 is a flowchart for explaining the setting content changing process according to the eighth embodiment of the present invention.
Figure 58:
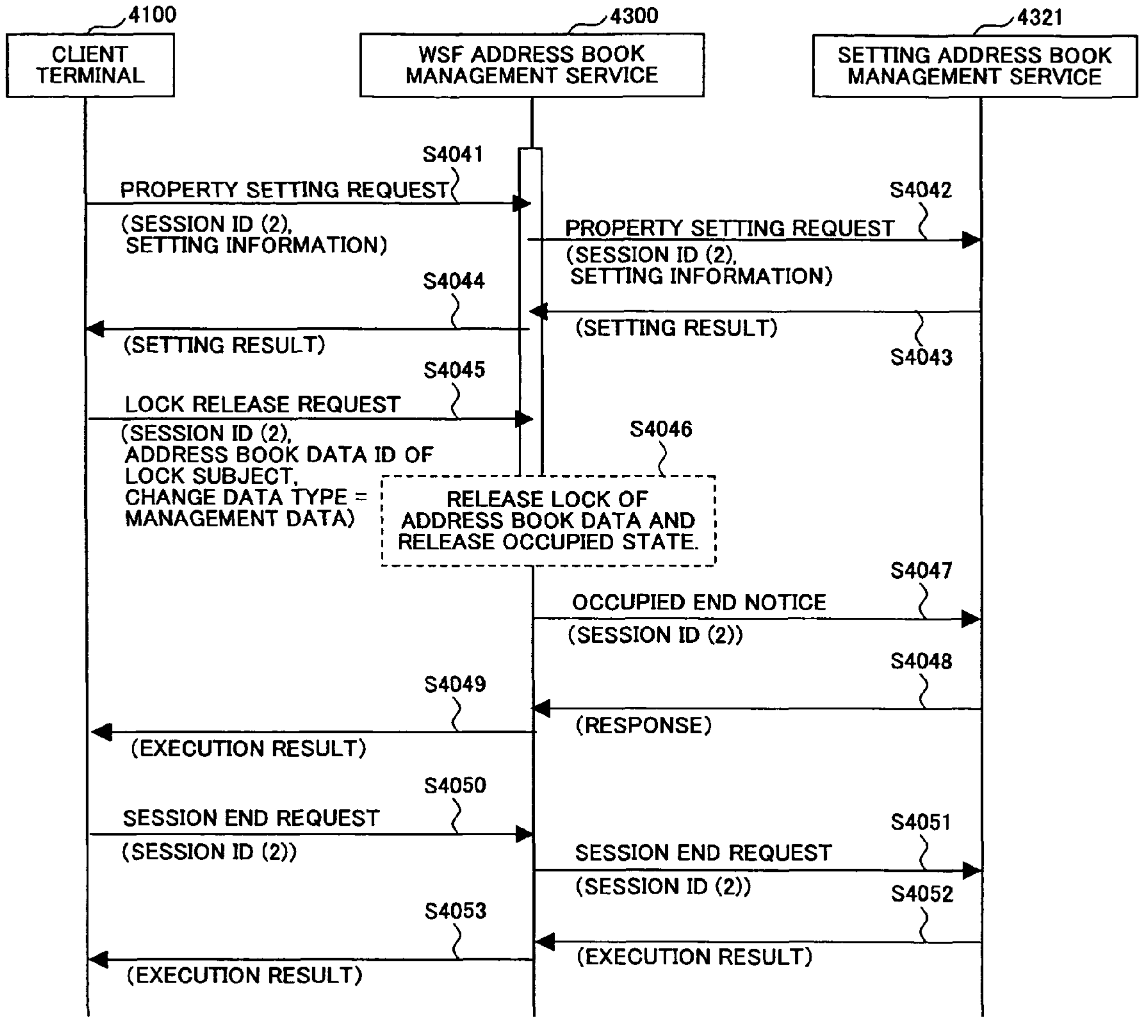
FIG. 58 is a flowchart for explaining the setting content changing process according to the eighth embodiment of the present invention.

Next, the process conducted by the image processing apparatus 4001 in FIG. 54 will be described with reference to flowcharts. FIG. 56, FIG. 57, and FIG. 58 are flowcharts for explaining a setting content changing process according to an eighth embodiment of the present invention.

Figure 59:
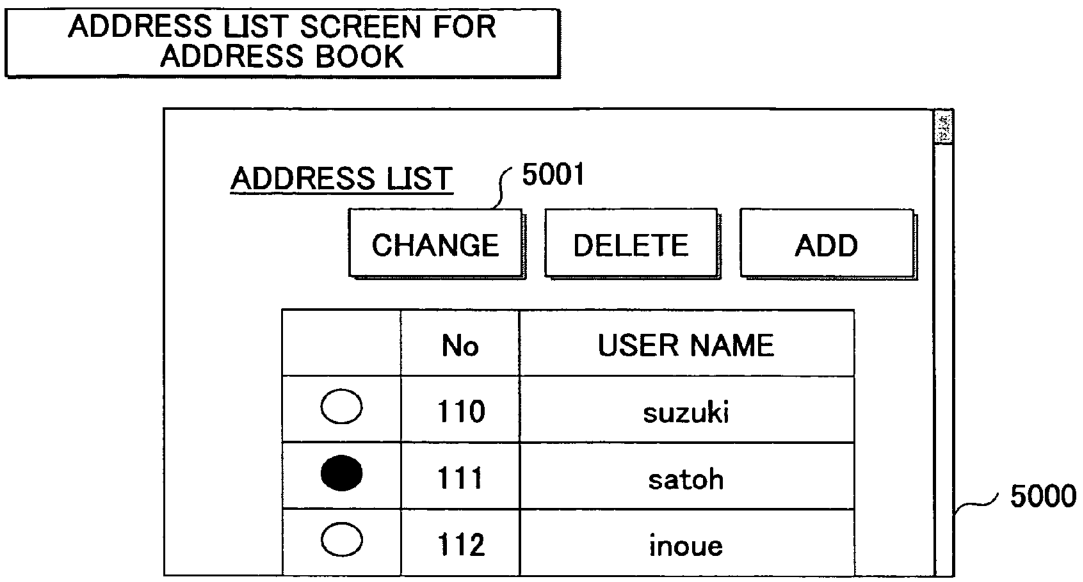
FIG. 59 is a diagram illustrating one example of an address list screen according to the eighth embodiment of the present invention.

In a case of remotely referring to or changing the address book data 4330 stored in the image processing apparatus 4001 from the client terminal 4100, the regular user or the administrator operates the client terminal 4100 and requests to display an address list screen 5000 as shown in FIG. 59. The client terminal 4100 displays the address list screen 5000 as shown in FIG. 59 at a display unit. Screen data of the address list screen 5000 may be stored in the client terminal 4100 beforehand, or obtained from the image processing apparatus 4001.

Figure 60:
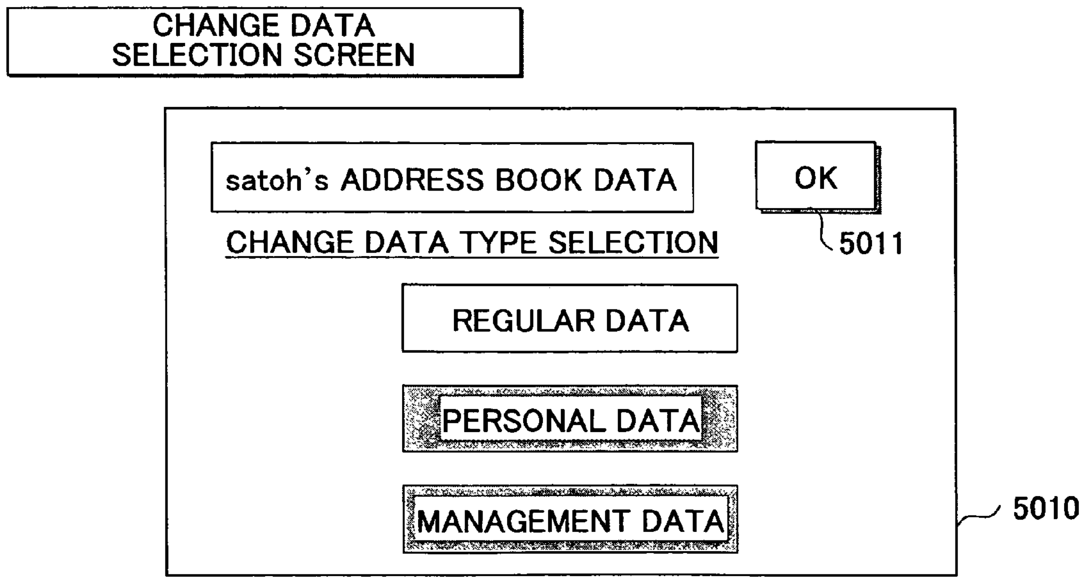
FIG. 60 is a diagram illustrating one example of the change data selection screen according to the eighth embodiment of the present invention.

FIG. 59 is a diagram illustrating one example of the address list screen. The regular user or the administrator selects one of address books to refer to or change, and presses a change button 5001. In the address list screen 5000 in FIG. 59, an address book for "No: 111" and "user name: satoh" is selected. When the regular user or the administrator presses the change button 5001, the client terminal 4100 displays a change data selection screen 5010 as shown in FIG. 60 at the display unit. Screen data of the change data selection screen 5010 may be stored beforehand in the client terminal 4100, or obtained from the image processing apparatus 4001.

FIG. 60 is a diagram illustrating one example of the change data selection screen. The regular user or the administrator selects a type (group) of the address book to refer to or change, and presses an OK button 5011. In the change data selection screen 5010 in FIG. 60, the personal data 4402 and the management data 4403 are selected. When the regular user or the administrator presses the OK button 5011, the client terminal 4100 displays a user authentication screen 5020 in FIG. 61 at the display unit. Screen data of the user authentication screen 5020 may be stored beforehand in the client terminal 4100, or obtained from the image processing apparatus 4001.

Figure 61:
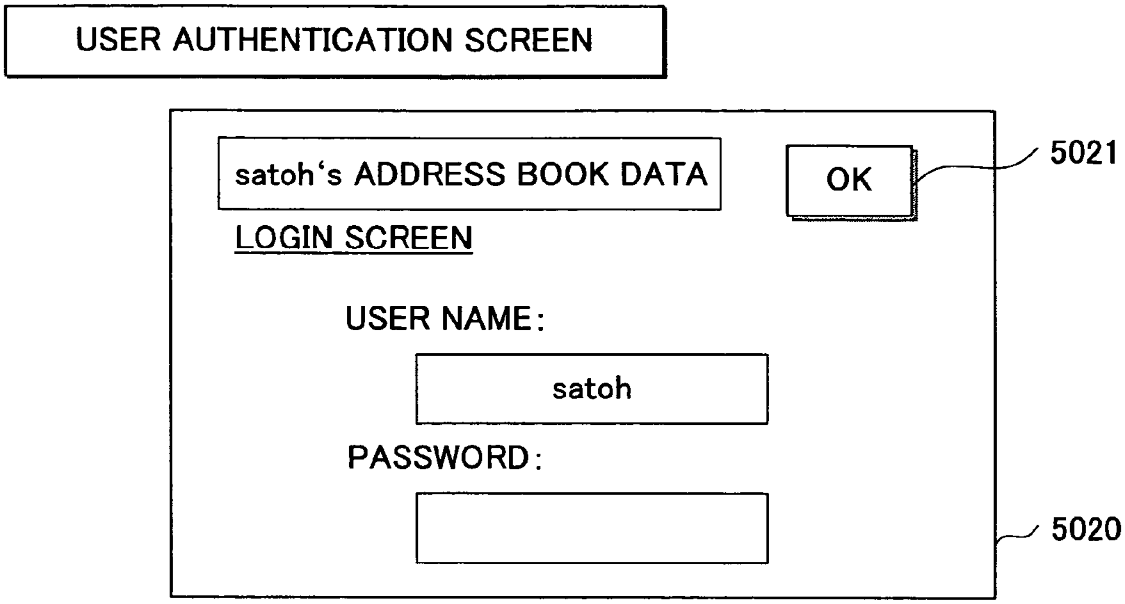
FIG. 61 is a diagram illustrating one example of the user authentication screen according to the eighth embodiment of the present invention.

FIG. 61 is a diagram illustrating one example of the user authentication screen. The regular user or the administrator inputs a user name and a password, and presses an OK button 5021 at a user authentication screen 5020 in FIG. 61. When the regular user or the administrator presses the OK button 5021, the setting content changing process advances to step S4010 in FIG. 56. An example, in which the regular user of "user name: satoh" inputs the user name and the password, will be described.

In step S4010, the client terminal 4100 sends a session start request to the WSF address book management service 4300 through the network 4150 and the NCS 4031. The session start request in step S4010 includes the user name, and the password. The user name in step S4010 shows the regular user having a setting authority with respect to the address book selected at the address list screen in FIG. 59 and the type "personal data" selected at the change data selection screen in FIG. 60.

The setting content changing process advances to step S4011. In step S4011, the WSF address book management service 4300 sends a session start request to the setting address book management service 4321. The session start request in step S4011 includes the user name, and the password.

The setting content changing process advances to step S4012. In step S4012, the setting address book management service 4321 obtains the user name and the password from the session start request received from the client terminal 4100, and establishes a session with the client terminal 4100 if the user name and the password are included in a setting authority list 4400 included in the setting address book management service 4321. The setting authority list 4400 included in the setting address book management service 4321 shows the regular user and the administrator, who can change the setting contents of the address book data 4330, for each type of the address book.

The setting content changing process advances to step S4013. In step S4013, the setting address book management service 4321 sends a session ID of the session established in step S4012 to the WSF address book management service 4300. The setting content changing process advances to step S4014. In step S4014, the setting address book management service 4321 sends the session ID received in step S4013 to the client terminal 4100.

The setting content changing process advances to step S4015. In step S4015, the client terminal 4100 sends a lock start request for the address book to the WSF address book management service 4300. The lock start request in step S4015 includes the session ID received the WSF address book management service 4300 in step S4014, a desired lock valid time limit, an address book ID identifying the address book as a lock subject, and a type "personal data" of the address book to update.

The session ID is used to prove that the regular user or the administrator operating the operation panel 4080 or the client terminal 4100 has the setting authority with respect to various types of the address book. That is, the session ID is used as information proving that the setting authority is authenticated. The setting content changing process advances to step S4016. In step S4016, the WSF address book management service 4300 corresponds the lock to the session by the lock managing part 4301 and the session managing part 4302.

Figure 62:
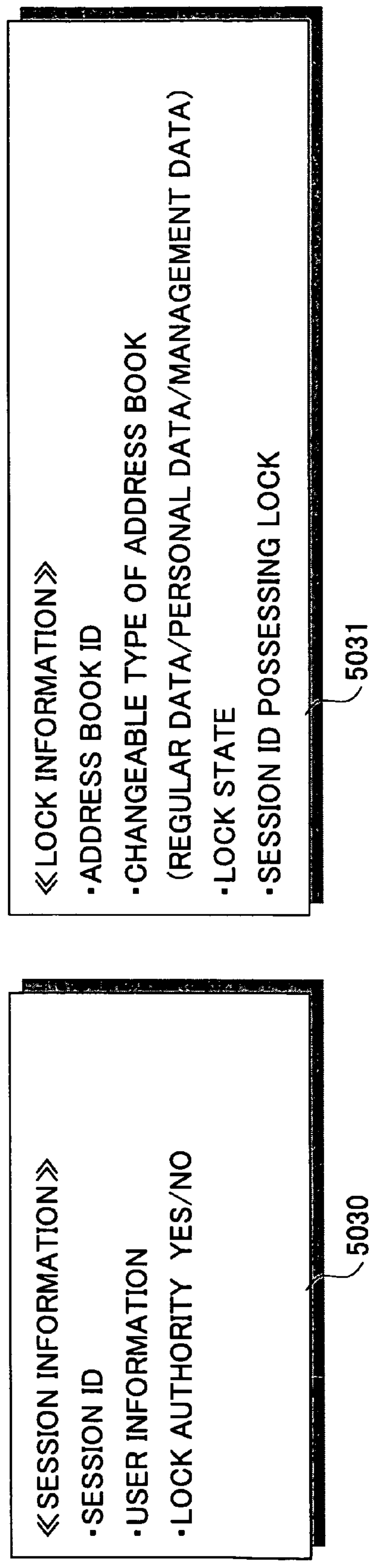
FIG. 62 is a diagram for explaining a correspondence between the lock and the session according to the eighth embodiment of the present invention.

FIG. 62 is a diagram for explaining a correspondence between the lock and the session. The session managing part 4302 generates session information 5030 for each session. The session information 5030 includes a session ID, user information, lock authority yes/no, and a like. The lock managing part 4301 generates lock information 5031 when the address book is locked. The lock information 5031 includes an address book ID identifying the address book as the lock subject, a changeable type of the address book (the regular data, the personal data, the management data, or the like), a lock state, a session ID of the session maintaining the lock, and a like. That is, the lock and the session are corresponded to each other by "session ID" forming the session information 5030 and "session ID of the session maintaining the lock" forming the lock information 5031.

The setting content changing process advances to step S4017. In step S4017, the WSF address book management service 4300 starts an address book lock transiting process to transit the address book data 4330 to the occupied state. The occupied state is positioned between a regular state and a settable state, and is a state in that the setting contents cannot be referred to and changed. In step S4017-1, the WSF address book management service 4300 sends an occupied start notice to the setting address book management service 4321. The occupied start notice in step S4017-1 includes the session ID, the desired lock valid time limit, the address book ID identifying the address book as the lock subject, the type "personal data" of the address book to update.

When the setting address book management service 4321 receives the occupied start notice, the setting address book management service 4321 transits the type of the address book included in the occupied start notice to the settable state, and also transits other types of the address book to the occupied state. The settable state is a state in that a request only from the WSF address book management service 4300 is received and the address book can be referred to and changed. In step S4017-1, the type "personal data" of the address book transits to the settable state, and the types "regular data" and "management data" transit to the occupied state.

The setting content changing process advances to step S4018. In step S4018, the setting address book management service 4321 sends a response with respect to the occupied start notice in step S4017-1, to the WSF address book management service 4300. The setting content changing process advances to step S4019. In step S4019, the WSF address book management service 4300 sends a lock execution result to the client terminal 4100.

Figure 63:
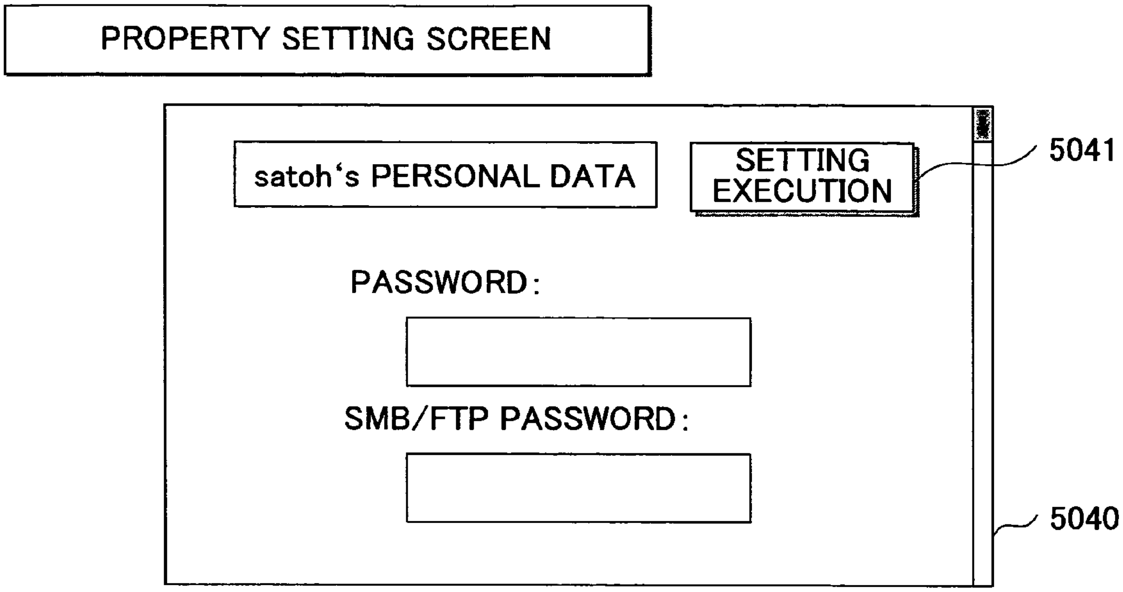
FIG. 63 is a diagram illustrating one example of the property setting screen according to the eighth embodiment of the present invention.

When the client terminal 4100 receives the lock execution result in step S4019, the client terminal 4100 displays a property setting screen 5040 as shown in FIG. 63. Screen data of the property setting screen 5040 may be stored in the client terminal 4100 beforehand, or obtained from the image processing apparatus 4001.

FIG. 63 is a diagram illustrating one example of the property setting screen. The regular user sets a property and presses a setting execution button 5041. In the property setting screen 5040 in FIG. 63, the password and the SMB/FTP password included in the personal data 4402 are set. When the setting execution button 5041 is pressed by the regular user, the setting content changing process advances to step S4020.

In step S4020, the client terminal 4100 sends a property setting request to the WSF address book management service 4300. The property setting request in step S4020 includes the session ID and setting information. The setting information includes the password and the SMB/FTP password set at the property setting screen 5040 in FIG. 63.

The setting content changing process advances to step S4021. In step S4021, the WSF address book management service 4300 sends a property setting request to the setting address book management service 4321. The property setting request in step S4021 includes the session ID and the setting information.

When the setting address book management service 4321 receives the property setting request, the setting address book management service 4321 obtains the session ID and the setting information from the property setting request, and changes the setting contents of the personal data 4402 included in the address book data 4330 by using the setting information. The setting content changing process advances to step S4022. In step S4022, the setting address book management service 4321 sends setting result with respect to the property setting request received in step S4021 to the WSF address book management server 4300. The setting content changing process advances to step S4023. In step S4023, the WSF address book management server 4300 sends the setting request received in step S4022 to the client terminal 4100.

The setting content changing process advances to step S4024. In step S4024, the client terminal 4100 sends a lock authority release request to the WSF address book management server 4300. The lock authority release request in step S4024 includes the session ID. The setting content changing process advances to step S4025. In step S4025, the WSF address book management server 4300 sends an occupied end notice to the setting address book management service 4321. The occupied end notice in step S4025 includes the session ID received in step S4024. The setting address book management service 4321 transits the type "personal data" of the address book transited in the settable state by the occupied start notice in step S4017-1, to the occupied state.

The setting content changing process advances to step S4026. In step S4026, the setting address book management service 4321 sends a response with respect to the occupied end notice in step S4025 to the WSF address book management service 4300. The setting content changing process advances to step S4027. In step S4027, the WSF address book management service 4300 sends an execution result of the lock authority release request to the client terminal 4100.

The setting content changing process advances to step S4028. In step S4028, the client terminal 4100 a session end request to the WSF address book management service 4300. The session end request in step S4028 includes the session ID.

The setting content changing process advances to step S4029. In step S4029, the WSF address book management service 4300 sends a session end request to the setting address book management service 4321. The session end request in step S4029 includes the session ID.

When the setting address book management service 4321 receives the session end request, the setting address book management service 4321 obtains the session ID from the session end request received in step S4029, and releases the session corresponding to the session ID. The setting content changing process advances to step S4030. In step S4030, the setting address book management service 4321 sends an execution result with respect to the session end request in step S4029 to the WSF address book management service 4300. The setting content changing process advances to step S4031. In step S4031, the WSF address book management service 4300 sends the execution result received in step S4030 to the client terminal 4100.

When the client terminal 4100 receives the execution result in step S4031, the client terminal 4100 displays a user authentication screen 5050 at the display unit. Screen data of the user authentication screen 5050 may be stored in the client terminal 4100 beforehand, or obtained from the image processing apparatus 4001.

Figure 64:
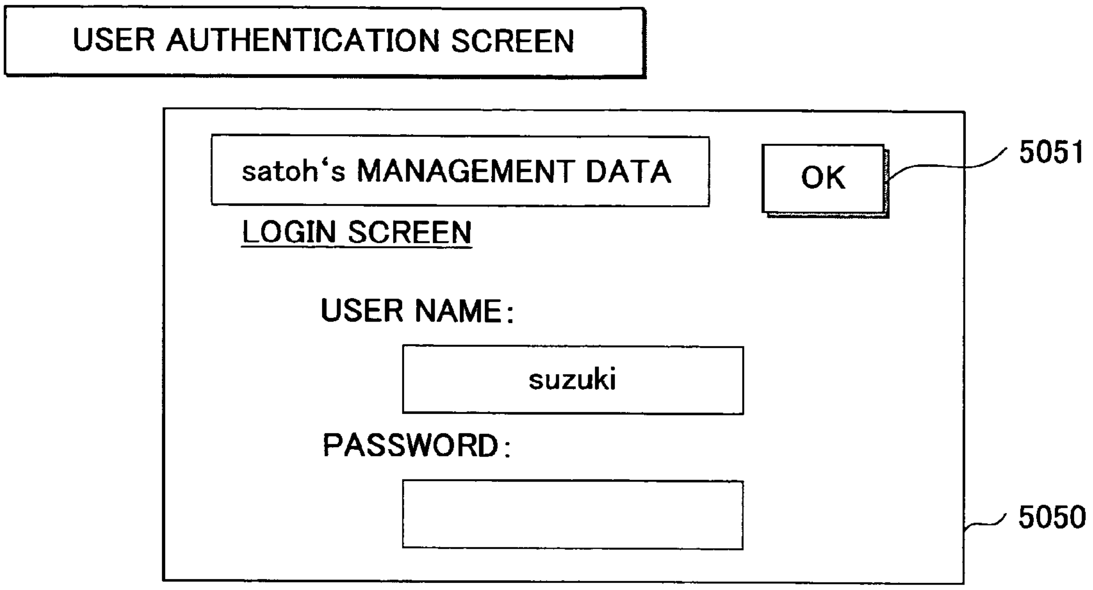
FIG. 64 is a diagram illustrating another example of a user authentication screen according to the eighth embodiment of the present invention.

FIG. 64 is a diagram illustrating another example of the user authentication screen. The regular user or the administrator inputs the user name and the password, and presses an OK button 5051. When the regular user or the administrator presses an OK button 5051, the setting content changing process advances to step S4032. In this case, an example in that the user name and the password are input by the administrator of "user name: Suzuki".

In step S4032, the client terminal 4100 sends a session start request to the WSF address book management service 4300. The session start request in step S4032 includes the user name and the password. The user name in step S4032 indicates an administrator having the setting authority for the address book selected at the address list screen in FIG. 59 and the type "management data" of the address book selected at the change data selection screen in FIG. 60.

The setting content changing process advances to step S4033. In step S4033, the WSF address book management service 4300 sends a session start request to the setting address book management service 4321. The session start request in step S4033 includes the user name and the password. Similar to step S4012, the setting address book management service 4321 obtains the user name and the password from the session start request received in step S4033, and establishes a session with the client terminal 4100 if the user name and the password are included in the setting authority list 4400 included in the setting address book management service 4321.

After the session is established, the setting content changing process advances to step S4034. In step S4034, the setting address book management service 4321 sends the session ID of the session established between the client terminal 4100 and the setting address book management service 4321 to the WSF address book management service 4300. The setting content changing process advances to step S4035. In step S4035, the WSF address book management service 4300 sends the session ID received in step S4034 to the client terminal 4100.

When the client terminal 4100 receives the session ID in step S4035, The setting content changing process advances to step S4036. In step S4036, the client terminal 4100 sends a lock authority inherit request to the WSF address book management service 4300. The lock authority inherit request in step S4036 includes the session ID of the session established in step S4012, a URL of the setting address book management service 4321, the session ID of the session established in step S4012, the address book ID identifying the address book as the lock subject, and the type "management data" of the address book to update.

The lock authority inherit request in step S4036 includes the URL and the session ID of the management subject service that previously had the lock authority because security can be improved by confirming that the client terminal 4100 knows the URL and the session ID of the management subject service which previously had the lock authority.

The setting content changing process advances to step S4037. In step S4037, the WSF address book management service 4300 conducts a lock authority transferring process as described later. In the lock authority transferring process in step S4037, the WSF address book management service 4300 transfers the lock authority possessed by the session established in step S4012 to the session established in step S4033.

The setting content changing process advances to step S4038. In step S4038, the WSF address book management service 4300 sends an occupied start notice to the setting address book management service 4321. The an occupied start notice in step S4038 includes the session ID of the session established in step S4033, the desired lock valid time limit, the address book ID identifying the address book as the lock subject, and the type "management data" of the address book to update. The setting address book management service 4321 transits the type of the address book included in the occupied start notice to the settable state. In step S4038, the type "management data" of the address book transits to the settable state.

The setting content changing process advances to step S4039. In step S4039, the setting address book management service 4321 sends a response with respect to the occupied start notice in step S4038 to the WSF address book management service 4300. The setting content changing process advances to step S4040. In step S4040, the WSF address book management service 4300 sends a lock execution result to the client terminal 4100.

Figure 65:
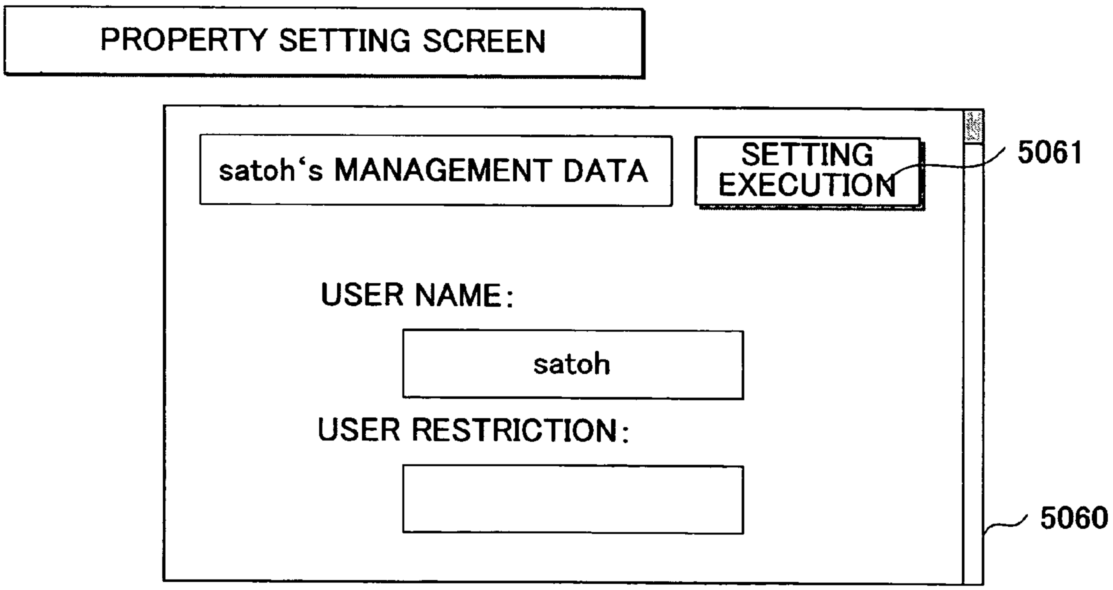
FIG. 65 is a diagram illustrating another example of the property setting screen according to the eighth embodiment of the present invention.

When the client terminal 4100 receives the lock execution result in step S4040, the client terminal 4100 displays a property setting screen 5060 at the display unit as shown in FIG. 65. Screen data of the property setting screen 5060 may be stored in the client terminal 4100 beforehand, or obtained from the image processing apparatus 4001.

FIG. 65 is a diagram illustrating another example of the property setting screen. The administrator sets a property and presses a setting execution button 5061. At the property setting screen in FIG. 65, the user name and a use restriction included in the management data 4403 are set. When the administrator presses the setting execution button 5061, the setting content changing process advances to step S4041.

In step S4041, the client terminal 4100 sends a property setting request to the WSF address book management service 4300. The property setting request in step S4041 includes the session ID of the session established in step S4033 and the setting information. The setting information shows the user name and the user restriction set at the property setting screen 5060 in FIG. 65.

The setting content changing process advances to step S4042. In the step S4042, the WSF address book management service 4300 sends a property setting request to the setting address book management service 4321. The property setting request in step S4042 includes the session ID of the session established in step S4033 and the setting information.

When the setting address book management service 4321 receives the property setting request, the setting address book management service 4321 obtains the session ID of the session established in step S4033 and the setting information from the property setting request, and changes the setting contents of the management data 4403 included in the address book data 4330 by using the setting information. The setting content changing process advances to step S4043. In the step S4043, the setting address book management service 4321 sends a setting result with respect to the property setting request in step S4042, to the WSF address book management service 4300. The setting content changing process advances to step S4044. In the step S4044, the WSF address book management service 4300 sends the setting result received in step S4043 to the client terminal 4100.

The setting content changing process advances to step S4045. In the step S4045, the client terminal 4100 sends a lock release request to the WSF address book management service 4300. The lock release request in step S4045 includes the session ID of the session established in step S4033. The setting content changing process advances to step S4046. In the step S4046, the WSF address book management service 4300 starts an address book lock releasing process for releasing the occupied state of the address book data 4330. After step S4046, the WSF address book management service 4300 releases the occupied state of the address book data 4330.

The setting content changing process advances to step S4047. In the step S4047, the WSF address book management service 4300 sends an occupied end notice to the setting address book management service 4321. The occupied end notice in step S4047 includes the session ID received in step S4045. The setting address book management service 4321 releases the settable state of the type "management data" of the address data 4330.

The setting content changing process advances to step S4048. In the step S4048, the setting address book management service 4321 sends a response with respect to the occupied end notice in step S4047, to the WSF address book management service 4300. The setting content changing process advances to step S4049. In the step S4049, the WSF address book management service 4300 sends an execution result with respect to the lock release request to the client terminal 4100.

The setting content changing process advances to step S4050. In the step S4050, the client terminal 4100 sends a session end request to the WSF address book management service 4300. The session end request in step S4050 the session ID of the session established in step S4033.

The setting content changing process advances to step S4051. In the step S4051, the WSF address book management service 4300 sends a session end request to the setting address book management service 4321. The session end request in step S4051 includes the session ID received in step S4050.

When the setting address book management service 4321 receives the session end request, the setting address book management service 4321 obtain the session id from the session end request received in S4051, and releases the session corresponding to the session ID. The setting content changing process advances to step S4052. In the step S4052, the setting address book management service 4321 sends an execution result with respect to the session end request received in step S4051. The setting content changing process advances to step S4053. In the step S4053, the WSF address book management service 4300 sends the execution result received in step S4052 to the client terminal 4100.

Figure 66:
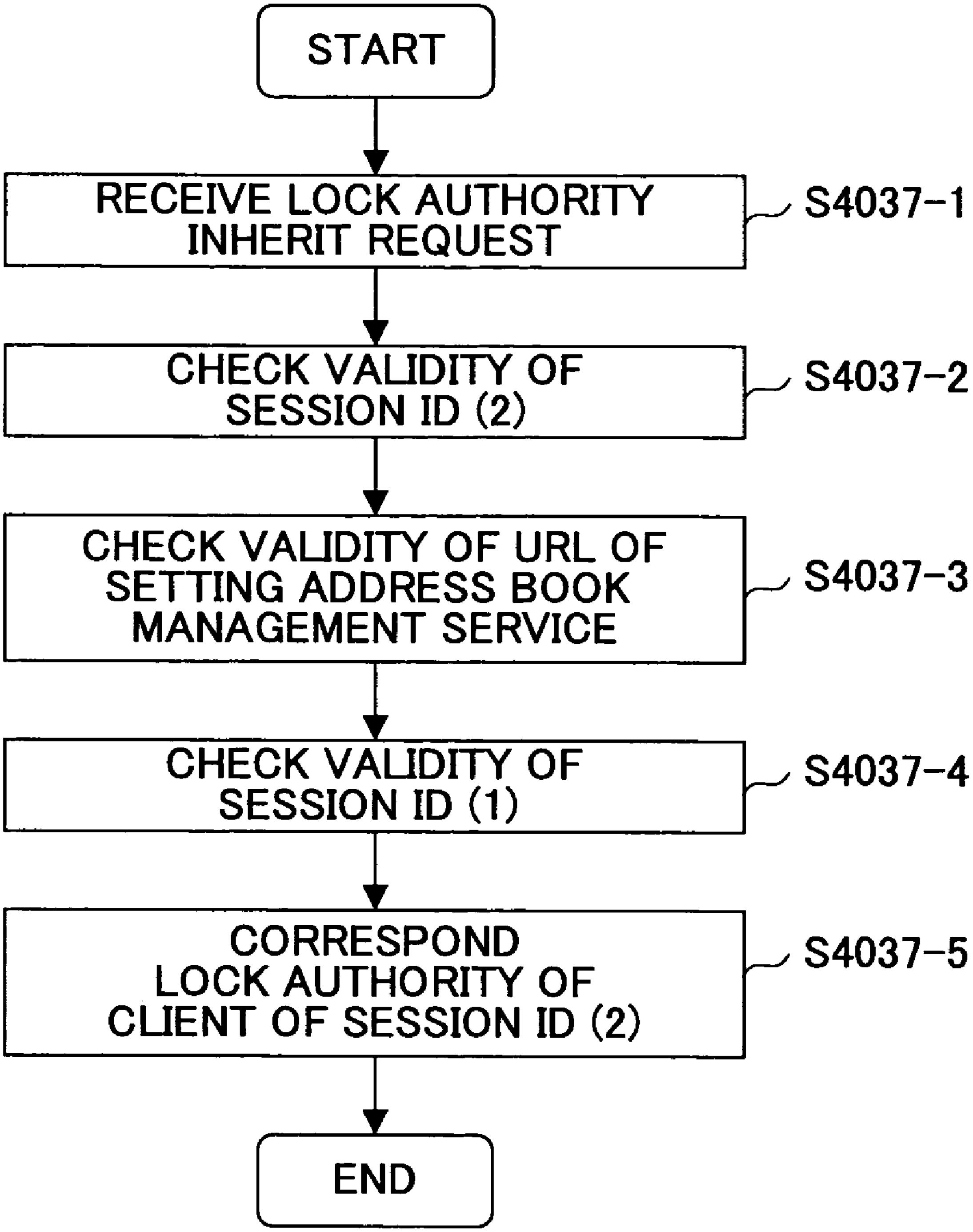
FIG. 66 is a flowchart for explaining one example of a lock authority transferring process according to the eighth embodiment of the present invention.

Next, the lock authority transferring process in step S4037 will be described with reference to a flowchart. FIG. 66 is a flowchart for explaining one example of the lock authority transferring process. The lock authority transferring process advances to step S4037-1. In step S4037-1, the WSF address book management service 4300 receives a lock authority inherit request from the client terminal 4100.

The lock authority inherit request from the client terminal 4100 includes the session ID of the session established in step S4033, the URL of the setting address book management service 4321, the session ID of the session established in step S4012, the address book ID of the address book as the lock subject, and the type "management data" of the address book to update.

The lock authority transferring process advances to step S4037-2. In step S4037-2, the WSF address book management service 4300 checks a validity of the session ID of the session established in step S4033. The lock authority transferring process advances to step S4037-3. In step S4037-3, the WSF address book management service 4300 checks a validity of the URL of the setting address book management service 4321 included in the lock authority inherit request. The lock authority transferring process advances to step S4037-4. In step S4037-4, the WSF address book management service 4300 checks a validity of the session ID of the session established in step S4012.

When validity checks in steps S41-2 through S41-4 are normally ended, the WSF address book management service 4300 corresponds the lock authority maintained for the session established in step S4012 to the session established in step S4033 by rewriting the lock information 5031. It should be noted that steps S41-3 and S41-4 are not mandatory in the lock authority transferring process and can be omitted.

Next, in the flowcharts shown in FIG. 56, FIG. 57, and FIG. 58, messages sent and received between the client terminal 4100 and the WSF address book management service 4300 of the image processing apparatus 4001 will be described in detail with reference to FIG. 67 through FIG. 80.

FIG. 67 is a diagram showing one example of a request SOAP message sent from the client terminal to the WSF address book management service as the session start request in step S4010 in FIG. 56. A request SOAP message 5070 in FIG. 67 includes a user name 5071, a password 5072, and a management subject name 5073.

FIG. 68 is a diagram showing one example of a response SOAP message sent from the WSF address book management service to the client terminal as a response for the session start request in step S4014 in FIG. 56. A response SOAP message 5080 in FIG. 68 includes the session ID 5081 of the session established in step S4012.

FIG. 69 is a diagram showing one example of a request SOAP message sent from the client terminal to the WSF address book management service as the address book lock start request in step S4015 in FIG. 56. A request SOAP message 5090 in FIG. 69 includes the session ID 5091 of the session established in step S4012, an address book ID 5092 identifying the address book as the lock subject, a type 5093 of the address book to update, and a desired lock valid time limit 5094.

FIG. 70 is a diagram showing one example of a response SOAP message sent from the WSF address book management service to the client terminal as a response for the address book lock start request in step S4021 in FIG. 57. A response SOAP message 5100 in FIG. 70 includes a lock execution result 5101 in response to the address book lock start request in step S4015.

FIG. 71 is a diagram showing one example of a request SOAP message sent from the client terminal to the WSF address book management service as the property setting request in step S4020 in FIG. 57. A request SOAP message 5110 in FIG. 71 includes a session ID 5111 of the session established in step S4012, an address book ID 5112 identifying the address book as the lock subject, a type 5113 of the address book, and setting information 5114.

FIG. 72 is a diagram showing one example of a response SOAP message sent from the WSF address book management service to the client terminal as a response for the property setting request in step S4023 in FIG. 57. A response SOAP message 5120 in FIG. 72 includes a setting result 5121 corresponding to the property setting request.

FIG. 73 is a diagram showing one example of a request SOAP message sent from the client terminal to the WSF address book management service as the lock authority release request in step S4024 in FIG. 57. A request SOAP message 5130 in FIG. 73 includes a session ID 5131 established in step S4012, an address book ID 5132 identifying the address book as the lock subject, and a type 5133 of the address book to update.

FIG. 74 is a diagram showing one example a response SOAP message sent from the WSF address book management service to the client terminal as a response for the lock authority release request in step S4027 In FIG. 57. A response SOAP message 5140 in FIG. 74 includes an execution result 5141 in response to the lock authority release request.

FIG. 75 is a diagram showing one example of a request SOAP message sent from the client terminal to the WSF address book management service as the session end request in step S4028 in FIG. 57. A request SOAP message 5150 in FIG. 75 includes a session ID 5151 of the session established in step S4012, the address book ID 5152 identifying the address book as the lock subject, and the type 5153 of the address book to update.

FIG. 76 is a diagram showing one example of a response SOAP message sent from the WSF address book management service to the client terminal as a response of the session end request in step S4031 in FIG. 57. A response SOAP message 5160 in FIG. 76 includes an execution result 5161 in response to the session end request.

A request SOAP message as the session start request in step S4032 sent from the client terminal 4100 to the WSF address book management service 4300 is the same as the request SOAP message 5070 in FIG. 67, and the explanation thereof will be omitted. A response SOAP message as a response for the session start request in step S4035 sent from the WSF address book management service 4300 to the client terminal 4100 is the same as the response SOAP message 5080 in FIG. 68, and the explanation thereof will be omitted.

FIG. 77 is a diagram showing one example of a request SOAP message sent from the client terminal to the WSF address book management service as the lock authority inherit request in step S4036 in FIG. 57. A request SOAP message 5170 in FIG. 77 includes a session ID 5171 of the session established in step S4033, an address book ID 5172 identifying the address book as the lock subject, a type 5173 of the address book to update, a URL 5174 of the setting address book management service 4321, a session ID 5175 of the session established in step S4012.

FIG. 78 is a diagram showing one example of a response SOAP message sent from the WSF address book management service to the client terminal as a response for the lock authority inherit request in step S4040 in FIG. 57. A response SOAP message 5180 in FIG. 78 includes a lock execution result 5181 corresponding to the lock authority inherit request.

A request SOAP message sent from the client terminal 4100 to the WSF address book management service 4300 as the property setting request in step S4041 is the same as the request SOAP message 5110 in FIG. 71, and the explanation thereof will be omitted. A response SOAP message sent from the WSF address book management service 4300 to the client terminal 4100 as a response for the property setting request in step S4044 is the same as the response SOAP message 5120 in FIG. 71, and the explanation thereof will be omitted.

FIG. 79 is a diagram showing one example of a request SOAP message sent from the client terminal to the WSF address book management service as the lock release request in step S4045 in FIG. 58. A request SOAP message 5190 in FIG. 79 includes a session ID 5191 of the session established in step S4033, an address book ID 5192 identifying the address book as the lock subject, and a type 5193 of the address book to update.

FIG. 80 is a diagram showing a response SOAP message sent from the WSF address book management service to the client terminal as a response for the lock release request in step S4049 in FIG. 58. A response SOAP message 5200 in FIG. 80 includes an execution result 5201 corresponding to the lock release request.

A request SOAP message sent from the client terminal 4100 to the WSF address book management service 4300 as the session end request in step S4049 is the same as the request SOAP message 5150 in FIG. 75, and the explanation thereof will be omitted. A response SOAP message sent from the WSF address book management service 4300 to the client terminal 4100 as a response for the session end request in step S4053 is the same as the response SOAP message 5160 in FIG. 76, and the explanation thereof will be omitted.

As described above, in the setting content changing process according to the eighth embodiment of the present invention, since the session and the lock authority are managed by corresponding to each other in the WSF address book management service 4300, the lock authority can be transferred between sessions. Therefore, there is no time interval to release the lock, so that the setting contents formed by a plurality of setting items for a plurality of management subjects can be changed in a successive sequence of processes.

Ninth Embodiment

Figure 81:
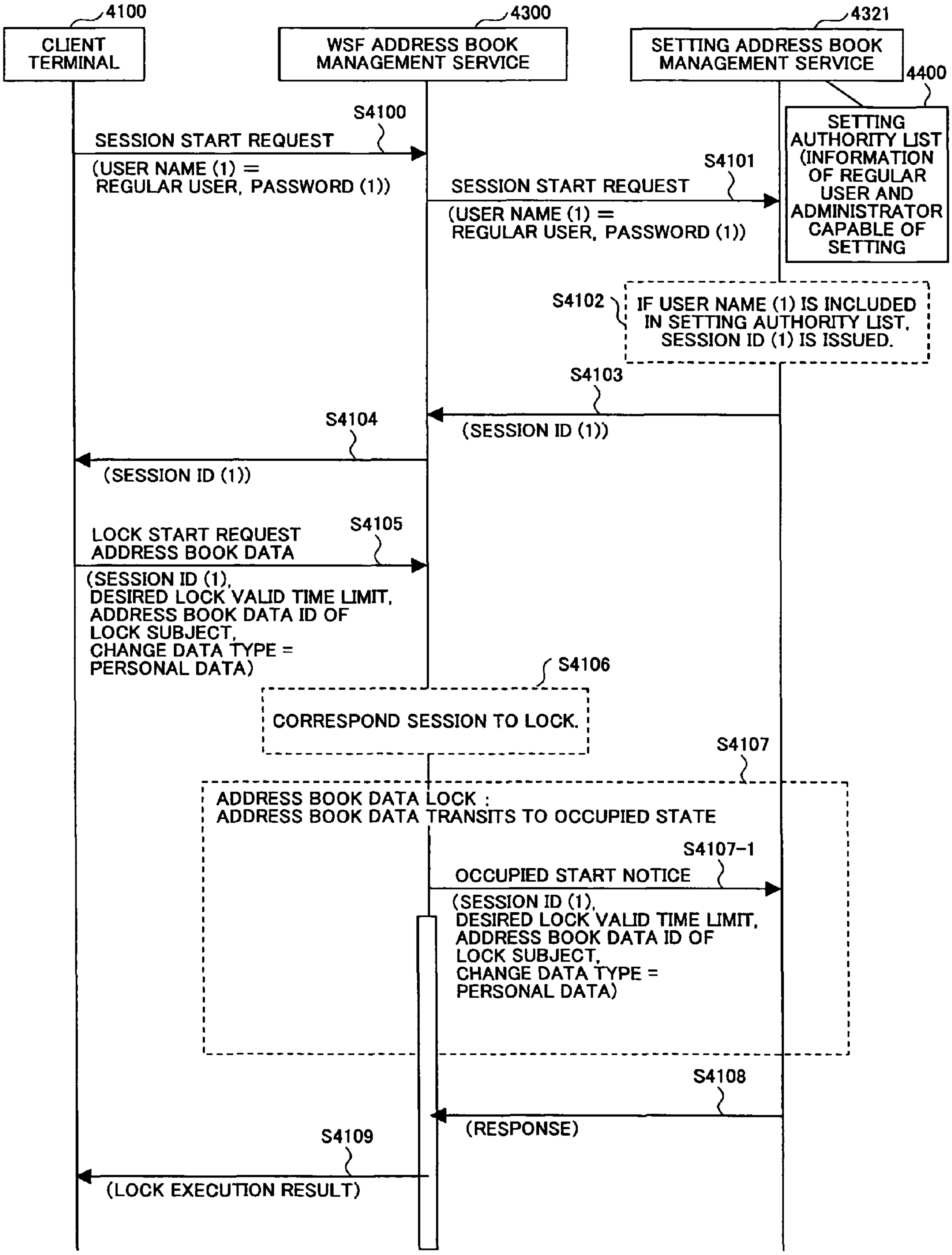
FIG. 81 is a flowchart for explaining the setting content changing process according to a ninth embodiment of the present invention.
Figure 82:
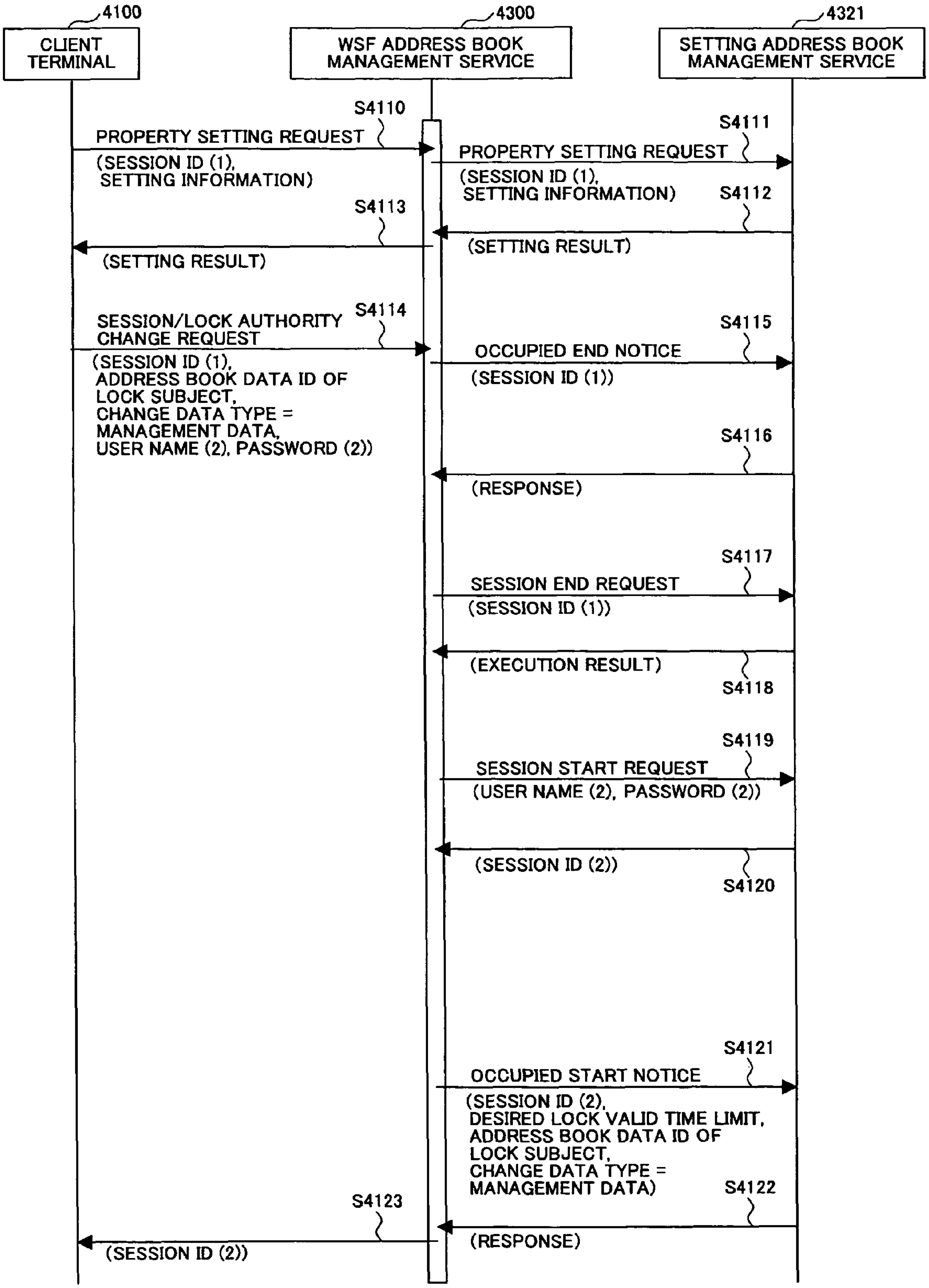
FIG. 82 is a flowchart for explaining the setting content changing process according to the ninth embodiment of the present invention.
Figure 83:
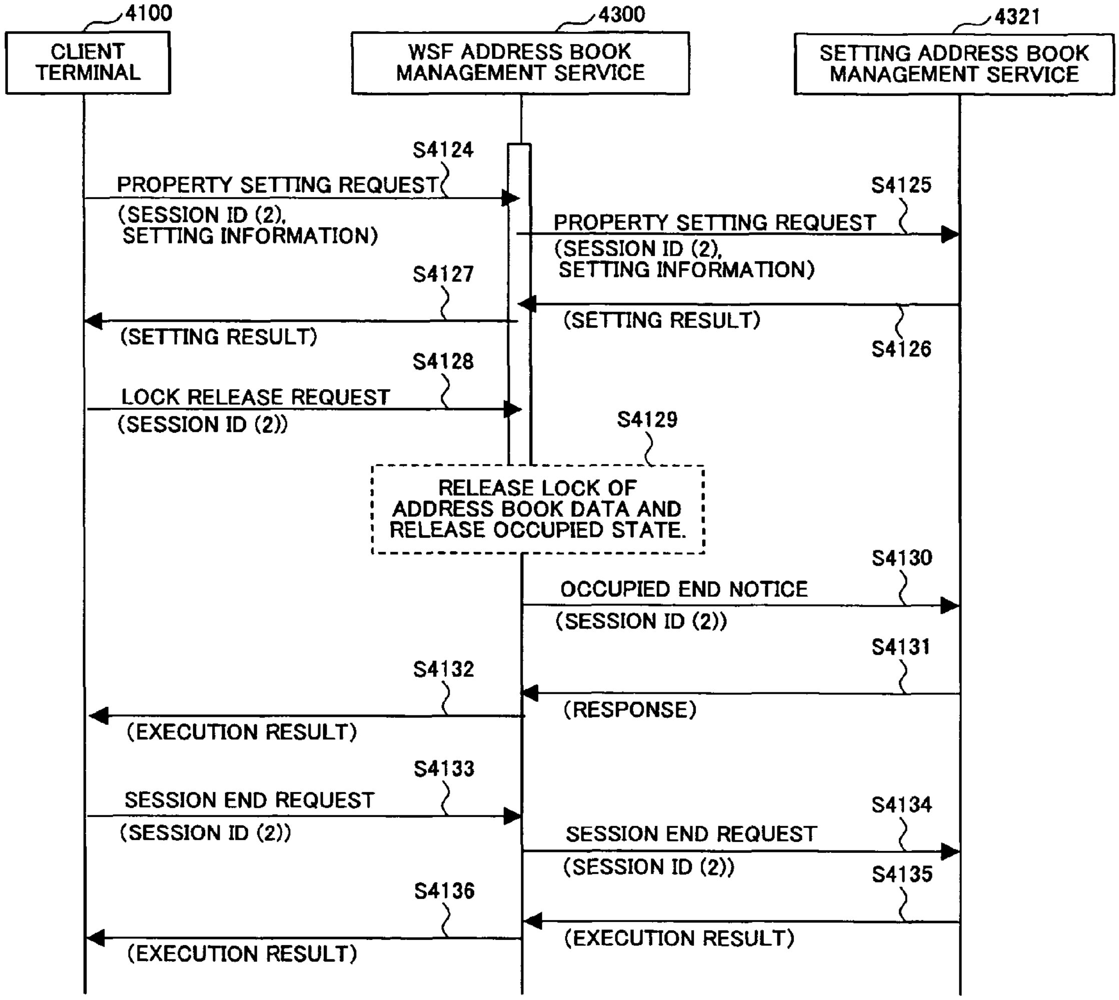
FIG. 83 is a flowchart for explaining the setting content changing process according to the ninth embodiment of the present invention.

Next, a setting content changing process according to a ninth embodiment of the present invention will be described. FIG. 81 through FIG. 83 are flowcharts for explaining the setting content changing process according to the ninth embodiment of the present invention. Steps S4100 through S4113 in the flowcharts in FIG. 81 through FIG. 83 are the same as steps S4010 through S4023 in FIG. 56 through FIG. 58, and the explanation thereof will be omitted.

The setting content changing process advances to step S4114. In step S4114, the client terminal 4100 sends a session/lock authority change request to the WSF address book management service 4300. The session/lock authority change request in step S4114 includes the session ID of the session established in step S4102, the address book ID identifying the address book as the lock subject, the type "management data" of the address book to update, the user name, and the password. The user name in step S4114 indicates an administrator having a setting authority with respect to the address book and the type "management data" of the address book selected in FIG. 59 and FIG. 60.

The setting content changing process advances to step S4115. In step S4115, the WSF address book management service 4300 sends an occupied end notice to the setting address book management service 4321. The occupied end notice in step S4115 includes the session ID received in step S4114. The setting address book management service 4321 transits the type of the address book, which transits to the settable state by the occupied start notice in step S4107-1, to the occupied state. In this case, the type "personal data" of the address book transits from the settable state to the occupied state. The setting content changing process advances to step S4116. In step S4116, the setting address book management service 4321 sends a response with respect to the occupied end notice in step S4115 to the WSF address book management service 4300.

The setting content changing process advances to step S4117. In step S4117, the WSF address book management service 4300 sends a session end request to the setting address book management service 4321. The session end request in step S4117 includes the session ID received in step S4114.

When the setting address book management service 4321 receives the session end request, the setting address book management service 4321 obtains the session ID from the session end request received in step S4117, and releases the session corresponding to the session ID. The setting content changing process advances to step S4118. In step S4118, the setting address book management service 4321 sends an execution result with respect to the session end request received in step S4118, to the WSF address book management service 4300.

The setting content changing process advances to step S4119. In step S4119, the WSF address book management service 4300 sends a session start request to the setting address book management service 4321. The session start request in step S4119 includes the user name and the password. Similar to step S4102, the setting address book management service 4321 obtains the user ID and the password from the session start request received in step S4119, and establishes a session with the client terminal 4100 if the user ID and the password are included in the setting authority list 4400 included in the setting address book management service 4321.

After the session is established, the setting content changing process advances to step S4120. In step S4120, the setting address book management service 4321 sends a session ID of the session established between the client terminal 4100 and the setting address book management service 4321. After step S4120, the WSF address book management service 4300 conducts a lock authority transferring process that is the same as the lock authority transferring process in step S4037 in the eighth embodiment.

The setting content changing process advances to step S4121. In step S4121, the WSF address book management service 4300 and sends an occupied start notice to the setting address book management service 4321. The occupied start notice in step S4121 includes the session ID of the session established in step S4119, the desired lock valid time limit, the address book ID identifying the address book as the lock subject, and the type "management data" of the address book to update. The setting address book management service 4321 transits the type of the address book included in the occupied start notice to the settable state. In step S4121, the type "management data" of the address book transits to the settable state.

The setting content changing process advances to step S4122. In step S4122, the setting address book management service 4321 sends a response with respect to the occupied start notice in step S4121 to the WSF address book management service 4300. The setting content changing process advances to step S4123. In step S4123, the WSF address book management service 4300 sends a session/lock authority change result to the client terminal 4100.

The session/lock authority change result in step S4123 includes the session ID of the session established in step S4119. Steps S4124 through S4136 after step S4123 are the same as steps S4041 through S4053 in FIG. 56 through FIG. 58, and the explanation thereof will be omitted.

Next, messages sent and received between the client terminal 4100 and the WSF address book management service 4300 of the image processing apparatus 4001 in the flowcharts in FIG. 81 and FIG. 83 will be described with reference to FIG. 84 and FIG. 85 in detail.

Steps S4100 through S4113 and steps S4124 through S4136 in the flowcharts in FIG. 81 and FIG. 83 are the same as steps S4010 through S4023 and steps S4041 through S4053 in FIG. 56 through FIG. 58, and the detailed explanation of messages sent and received between the client terminal 4100 and the WSF address book management service 4300 of the image processing apparatus 4001 will be omitted.

FIG. 84 is a diagram showing one example of a request SOAP message sent from the client terminal to the WSF address book management service as the session/lock authority change request in step S4114 in FIG. 82. A request SOAP message 5210 in FIG. 84 includes a session ID 5211 of the session established in step S4102, an address book ID 5212 identifying the address book as the lock subject, a type 5213 of the address book to update, a user name 5214, and a password 5215.

FIG. 85 is a diagram showing one example of a response SOAP message sent from the WSF address book management service to the client terminal as a response of the session/lock authority change request in step S4123 in FIG. 82. A response SOAP message 5220 in FIG. 85 includes a session ID 5221 of the session established in step S4119.

As described above, in the setting content changing process in the ninth embodiment of the present invention, it is possible for a single request to switch the sessions and transfer the lock authority by a plurality of requests in the eighth embodiment.

Tenth Embodiment

Figure 86:
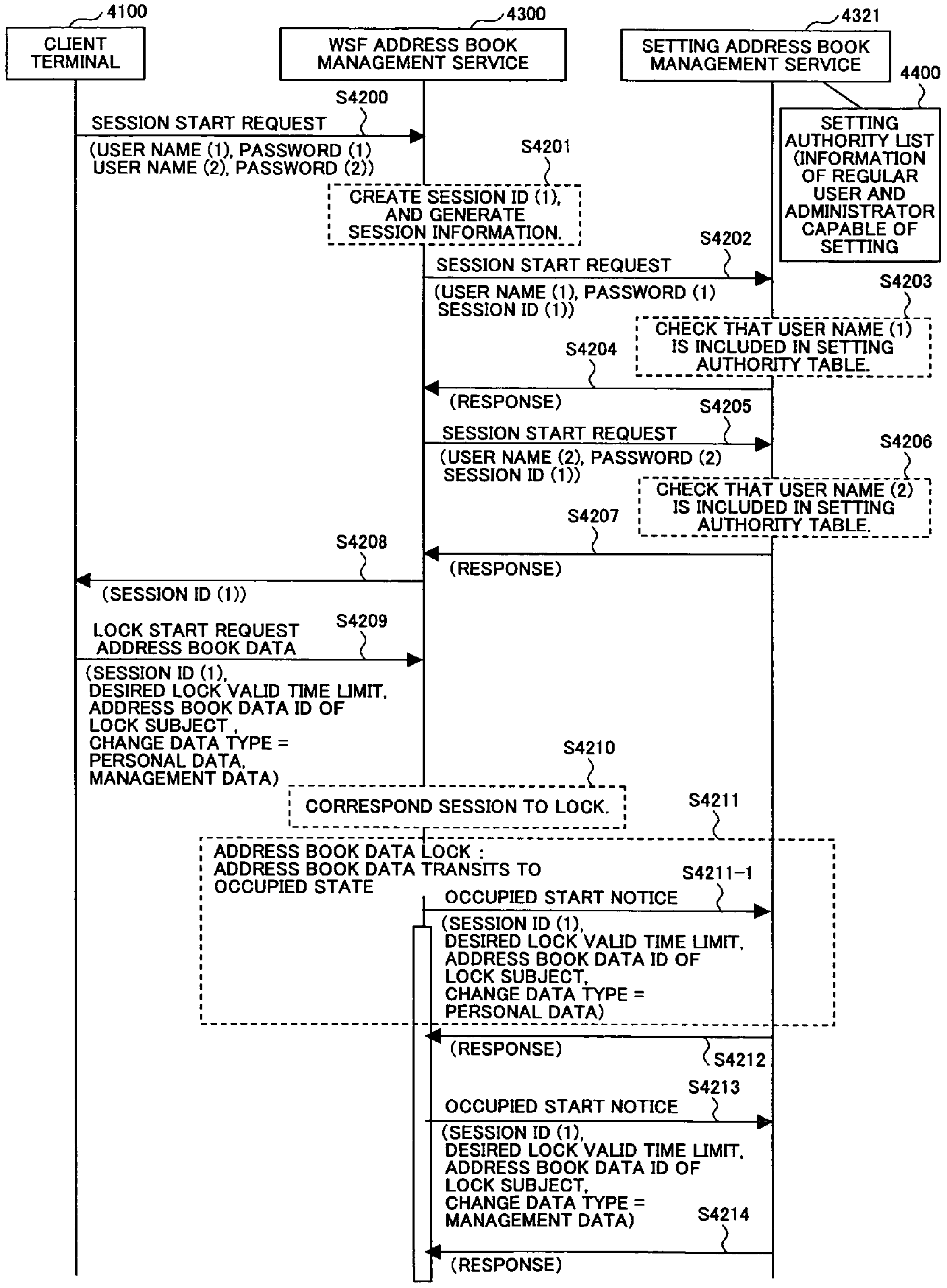
FIG. 86 is a flowchart for explaining the setting content changing process according to a tenth embodiment of the present invention.
Figure 87:
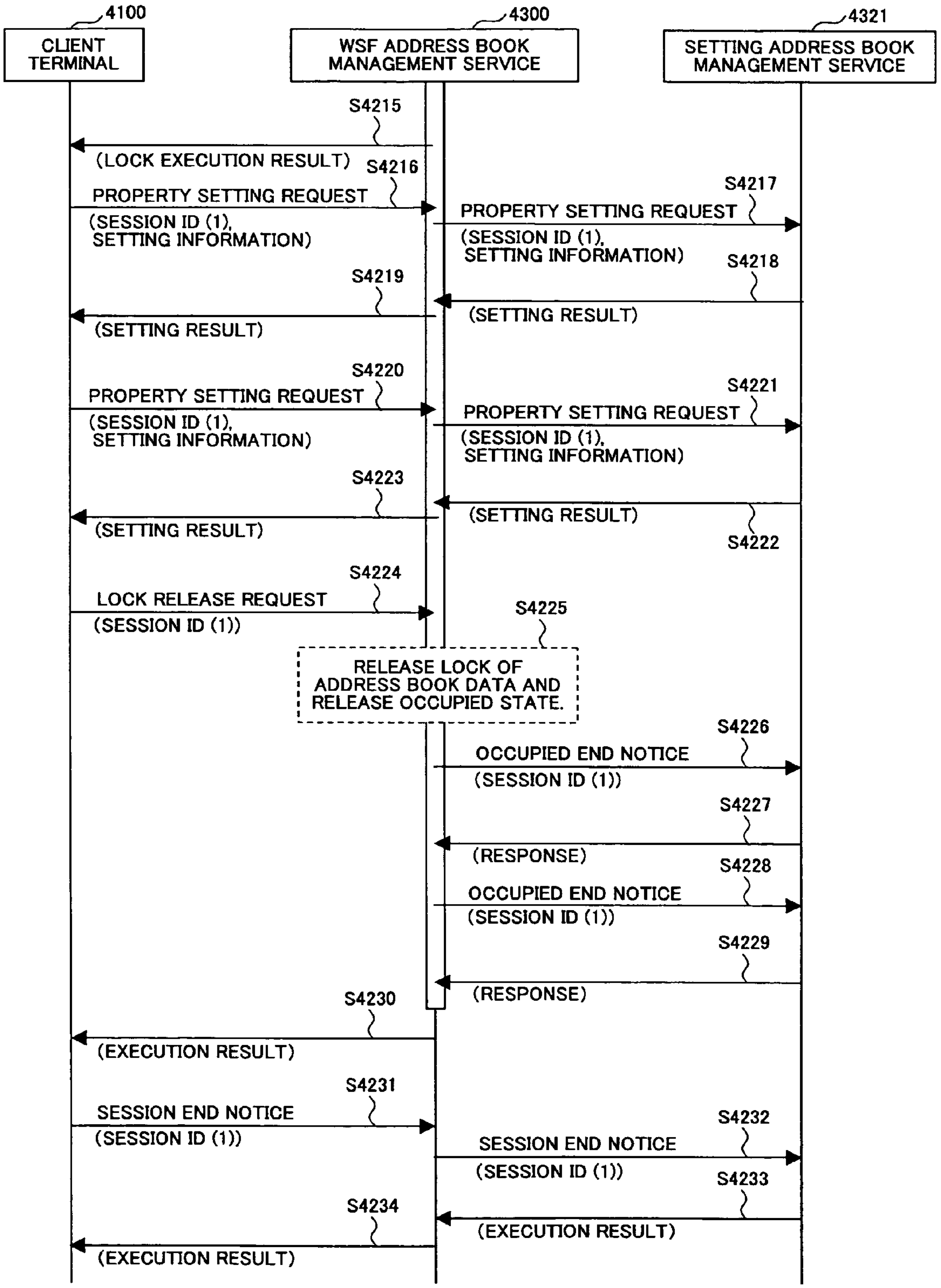
FIG. 87 is a flowchart for explaining the setting content changing process according to the tenth embodiment of the present invention.

Next, a setting content changing process according to a tenth embodiment of the present invention will be described. FIG. 86 and FIG. 87 are flowcharts for explaining the setting content changing process according to the tenth embodiment of the present invention. A regular user or an administrator operates the client terminal 4100 to request displaying the initial screen 5000 as shown in FIG. 59 as described above. The client terminal 4100 displays the initial screen 5000 at a display unit.

Figure 88:
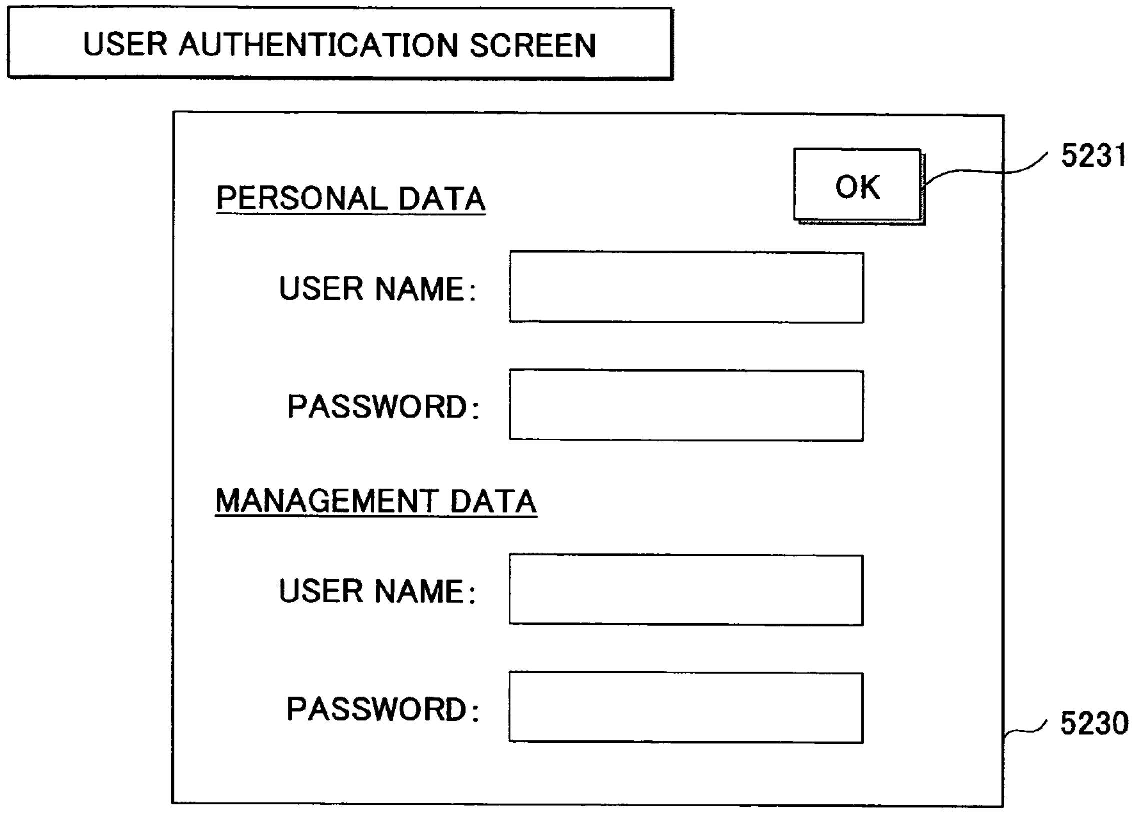
FIG. 88 is a diagram showing another user authentication screen according to the tenth embodiment of the present invention.

The regular user or the administrator selects one address book to refer to or change, and presses an OK button 5001. When the regular user or the administrator presses the OK button 5001, the client terminal 4100 displays a user authentication screen 5230 as shown in FIG. 88 at the display unit. Screen data of the user authentication screen 5230 may be stored in the client terminal 4100, or obtained from the image processing apparatus 4001.

FIG. 88 is a diagram showing another user authentication screen. The regular user or the administrator inputs a user name and a password showing the setting authority for each type of the address book, and presses an OK button 5231. FIG. 88 shows one example in that the user name and the password showing the setting authority of the types "personal data" and "management data" of the address book are set. When the regular user or the administrator presses an OK button 5231, the setting content changing process advances to step S4200.

In step S4200, the client terminal 4100 sends a session start request to the WSF address book management service 4300. The session start request in step S4200 includes the user name and the password showing the setting authority of the type "personal data" of the address book, and the user name and the password showing the setting authority of the type "management data" of the address book.

The setting content changing process advances to step S4201. In step S4201, the WSF address book management service 4300 creates a session ID of a session to establish between the client terminal 4100 and the WSF address book management service 4300, and generates session information.

The setting content changing process advances to step S4202. In step S4202, the WSF address book management service 4300 sends a session start request to the setting address management service 4321. The session start request in step S4202 includes the user name and the password showing the setting authority of the type "personal data" of the address book, and the session ID.

The setting content changing process advances to step S4203. In step S4203, the setting address management service 4321 obtains the user ID and the password from the session start request received in step S4202, and checks whether or not the user ID and the password are included in the setting authority list 4400 included in the setting address book management service 4321.

The setting content changing process advances to step S4204. In step S4204, the setting address management service 4321 sends a check result showing whether or not the user ID and the password obtained from the session start request are included in the setting authority list 4400 as a response for the session start request in step S4203, to the WSF address book management service 4300.

The setting content changing process advances to step S4205. In step S4205, the WSF address book management service 4300 sends a session start request to the setting address book management service 4321. The session start request in step S4205 includes the user name and the password showing the setting authority of the type "management data" of the address book, and the session ID.

The setting content changing process advances to step S4206. In step S4206, the setting address book management service 4321 obtains the user ID and the password from the session start request received in step s4205, and checks whether or not the user ID and the password are included in the setting authority list 4400 included in the setting address book management service 4321.

The setting content changing process advances to step S4207. In step S4207, the setting address book management service 4321 sends a check result showing whether or not the user ID and the password obtained from the session start request are included in the setting authority list 4400, as a response for the session start request in step S4205, to the WSF address book management service 4300.

The setting content changing process advances to step S4208. In step S4208, the WSF address book management service 4300 sends the response for the session start request in step S4200 to the client terminal 4100. The response in step S4208 includes the session ID.

The setting content changing process advances to step S4209. In step S4209, the client terminal 4100 sends an address book lock start request to the WSF address book management service 4300. The address book lock start request in step S4209 includes the session ID, the desired lock valid time limit, the address book ID identifying the address book as the lock subject, the types "personal data" and "management data" of the address book to update.

The setting content changing process advances to step S4210. In step S4210, the WSF address book management service 4300 corresponds a lock and the session by using the lock managing part 4301 and the session managing part 4302. The setting content changing process advances to step S4211. In step S4211, the WSF address book management service 4300 starts an address book lock transiting process to transit the address book data 4330 to the occupied state.

The setting content changing process advances to step S4211-1. In step S4211-1, the WSF address book management service 4300 sends an occupied start notice to the setting address book management service 4321. The occupied start notice in step S4211-1 includes the session ID, the desired lock valid time limit, the address book ID identifying the address book as the lock subject, the type "personal data" of the address book to update.

When the setting address book management service 4321 receives the occupied start notice in step S4211-1, the setting address book management service 4321 transits the type "personal data" of the address book included in the occupied start notice to the settable state, and also transits other types of the address book to the occupied state. The setting content changing process advances to step S4212. In step S4212, the setting address book management service 4321 sends a response with respect to the occupied start notice in step S4211-1 to the WSF address book management service 4300.

The setting content changing process advances to step S4213. In step S4213, the WSF address book management service 4300 sends the occupied start notice to the setting address book management service 4321. The occupied start notice in step S4213 includes the session ID, the desired lock valid time limit, the address book ID identifying the address book as the lock subject, and the type "management data" of the address book to update.

When the setting address book management service 4321 receives the occupied start notice in step S4213, the setting address book management service 4321 transits the type "management data" of the address book included in the occupied start notice to the settable state. The setting content changing process advances to step S4214. In step S4214, the setting address book management service 4321 sends a response with respect to the occupied start notice in step S4213, to the WSF address book management service 4300.

The setting content changing process advances to step S4215. In step S4215, the WSF address book management service 4300 sends a lock execution result to the client terminal 4100. When the client terminal 4100 receives the lock execution result in step S4215, the client terminal 4100 displays the property setting screen 5040 as shown in FIG. 63 as describe above. The regular user sets the property, and presses the setting execution button 5041. When the regular user presses the setting execution button 5041, the setting content changing process advances to step S4216.

In step S4216, the client terminal 4100 sends a property setting request to the WSF address book management service 4300. The property setting request in step S4216 includes the session ID and setting information. The setting information includes the password and the SMB/FTP password set at the property setting screen 5040 in FIG. 63.

The setting content changing process advances to step S4217. In step S4217, the WSF address book management service 4300 sends a property setting request to the setting address book management service 4321. The property setting request in step S4217 includes the session ID and the setting information.

When the setting address book management service 4321 receives the property setting request, the setting address book management service 4321 obtains the session ID and the setting information from the property setting request, and changes the setting contents of the personal data 4402 included in the address book data 4330 by using the setting information. The setting content changing process advances to step S4218. In step S4218, the setting address book management service 4321 sends setting result with respect to the property setting request received in step S4219 to the WSF address book management server 4300. The setting content changing process advances to step S4219. In step S4219, the WSF address book management server 4300 sends the setting request received in step S4218 to the client terminal 4100.

When the client terminal 4100 receives the setting result in step S4219, the client terminal 4100 displays the property setting screen 5060 as shown in FIG. 65 as described above at the display unit. The administrator sets the property, and presses the setting execution button 5061. When the administrator presses the setting execution button 5061, the setting content changing process advances to step S4220.

In step S4220, the client terminal 4100 sends a property setting request to the WSF address book management service 4300. The property setting request in step S4220 includes the session ID and setting information. The setting information includes the password and the SMB/FTP password set at the property setting screen 5060 in FIG. 65.

The setting content changing process advances to step S4221. In step S4221, the WSF address book management service 4300 sends a property setting request to the setting address book management service 4321. The property setting request in step S4021 includes the session ID and the setting information.

When the setting address book management service 4321 receives the property setting request, the setting address book management service 4321 obtains the session ID and the setting information from the property setting request, and changes the setting contents of the management data 4403 included in the address book data 4330 by using the setting information. The setting content changing process advances to step S4222. In step S4222, the setting address book management service 4321 sends setting result with respect to the property setting request received in step S4221 to the WSF address book management server 4300. The setting content changing process advances to step S4223. In step S4223, the WSF address book management server 4300 sends the setting request received in step S4022 to the client terminal 4100.

The setting content changing process advances to step S4224. In step S4224, the client terminal 4100 sends a lock authority release request to the WSF address book management server 4300. The lock authority release request in step S4224 includes the session ID. The setting content changing process advances to step S4225. In step S4225, the WSF address book management service 4300 starts an address book lock releasing process for releasing the occupied state of the address book data 4330. After step S4225, the WSF address book management service 4300 releases the occupied state of the address book data 4330.

The setting content changing process advances to step S4226. In the step S4226, the WSF address book management service 4300 sends an occupied end notice to the setting address book management service 4321. The occupied end notice in step S4226 includes the session ID received in step S4224. The setting address book management service 4321 releases the settable state of the type of the address data 4330. In this case, the type "management data" of the address data 4330 is released.

The setting content changing process advances to step S4227. In the step S4227, the setting address book management service 4321 sends a response with respect to the occupied end notice in step S4226, to the WSF address book management service 4300. The setting content changing process advances to step S4228. In the step S4228, the WSF address book management service 4300 sends an occupied end notice to the setting address book management service 4321. The occupied end notice in step S4228 includes the session ID received in step S4224. The setting address book management service 4321 releases the settable state of the type of the address book data 4330. In this case, the type "management data" of the address book data 4330 is released.

The setting content changing process advances to step S4229. In the step S4229, the setting address book management service 4321 sends a response with respect to the occupied end notice in step S4228 to the WSF address book management service 4300. The setting content changing process advances to step S4230. In the step S4230, the WSF address book management service 4300 sends an execution result of the lock release request to the client terminal 4100.

The setting content changing process advances to step S4231. In the step S4231, the client terminal 4100 sends a session end request to the WSF address book management service 4300. The session end request in step S4231 includes the session ID received in step S4201.

The setting content changing process advances to step S4232. In the step S4232, the WSF address book management service 4300 sends a session end request to the setting address book management service 4321. The session end request in step S4232 includes the session ID received in step S4231.

When the setting address book management service 4321 receives the session end request, the setting address book management service 4321 obtains the session ID from the session end request received in step S4232, and releases the session corresponding to the session ID. The setting content changing process advances to step S4233. In the step S4233, the setting address book management service 4321 sends an execution result with respect to the session end request in step S4232 to the WSF address book management service 4300. The setting content changing process advances to step S4233. In step S4233, the session end request in step S4232 sends the execution result received in step S4232 to the client terminal 4100. The setting content changing process advances to step S4234. In step S4234, the WSF address book management service 4300 the execution result received in step S4233 to the client terminal 4100.

Next, in the flowcharts shown in FIG. 86 and FIG. 87, messages sent and received between the client terminal 4100 and the WSF address book management service 4300 of the image processing apparatus 4001 will be described in detail with reference to FIG. 89 and FIG. 90.

In the flowcharts in FIG. 86 and FIG. 87, the messages sent and received between the client terminal 4100 and the WSF address book management service 4300 of the image processing apparatus 4001 are the same as the messages in the flowcharts in FIG. 56 through FIG. 58, and FIG. 81 through FIG. 83, other than steps S4200 and S4209, and the explanation thereof will be omitted.

FIG. 89 is a diagram showing one example of a request SOAP message sent from the client terminal to the WSF address book management service as the session start request in step S4200 in FIG. 86. A request SOAP message 5240 in FIG. 89 includes a type 5241 of the address book to update, a user name 5242, and a password 5243.

FIG. 90 is a diagram showing one example of a request SOAP message sent from the client terminal to the WSF address book management service as the address book lock start request in step S4209 in FIG. 86. A request SOAP message 5250 in FIG. 90 includes a session ID 5251 of the session established in step S4201, an address book ID 5252 identifying the address book as the lock subject, a type 5253 of the address book to update, and a desired lock valid time limit 5254.

As described above, in the setting content changing process according to the tenth embodiment of the present invention, a single request can realize the same process for which a request is conducted for each of the types of the address book in the eighth embodiment.

Eleventh Embodiment

Figure 91:
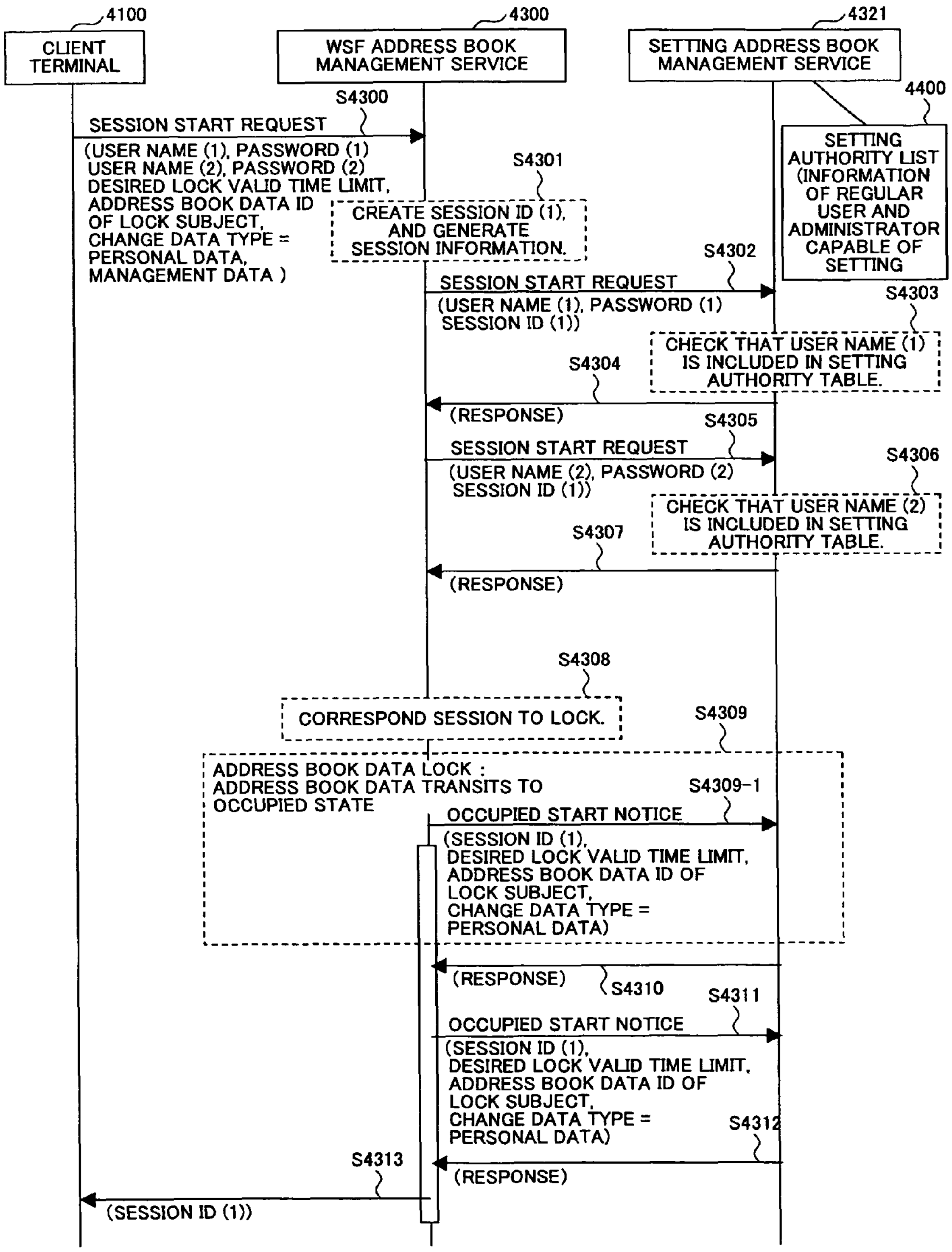
FIG. 91 is a flowchart for explaining the setting content changing process according to an eleventh embodiment of the present invention.
Figure 92:
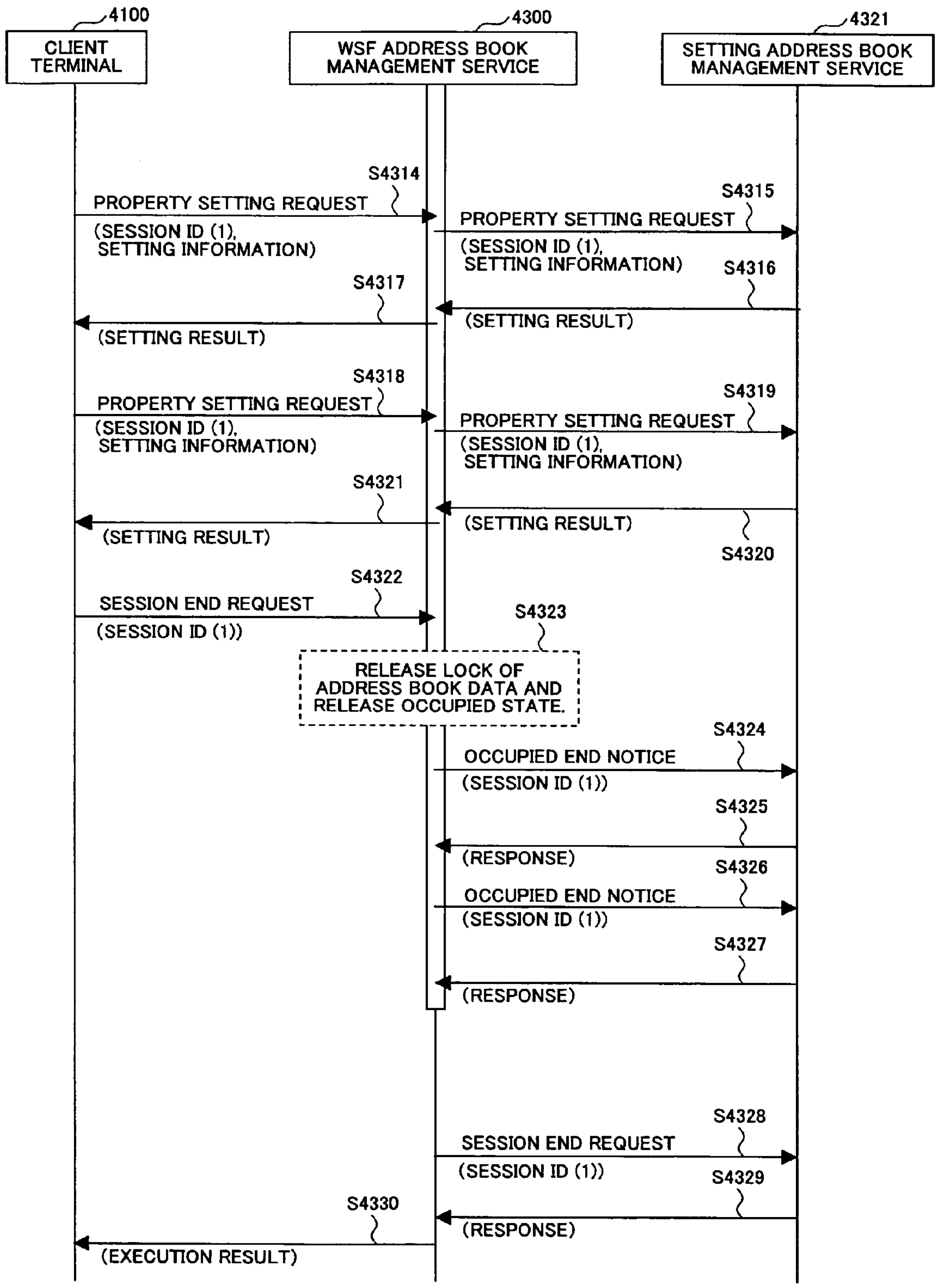
FIG. 92 is a flowchart for explaining the setting content changing process according to the eleventh embodiment of the present invention.

Next, a setting content changing process according to an eleventh embodiment of the present invention will be described. FIG. 91 and FIG. 92 are flowcharts for explaining the setting content changing process according to the eleventh embodiment of the present invention. First, a user of an administrator operates the client terminal 4100 to request displaying the address list screen 5000 as shown in FIG. 59 as described above. The client terminal 4100 displays the address list screen 5000 at the display unit.

The regular user or the administrator selects one address book to refer to or change, and presses the change button 5001. When the regular user or the administrator presses the change button 5001, the client terminal 4100 displays a user authentication screen 5230 in FIG. 88 at the display unit. The regular user or the administrator inputs a user name and a password for each type of the address book, and presses the OK button 5231. When The regular user or the administrator presses the OK button 5231, the setting content changing process advances to step S4300.

In step S4300, the client terminal 4100 sends a session start request to the WSF address book management service 4300. The session start request in step S4300 includes the user name and the password showing the setting authority of the type "personal data" of the address book, the user name and the password showing the setting authority of the type "management data" of the address book, the desired lock valid time limit, the address book ID identifying the address book as the lock subject, the types "personal data" and "management data" of the address book to update.

Steps S4301 through S4307 in FIG. 91 are the same as steps S4201 through S4207 in FIG. 86, and the explanation thereof will be omitted. After step S4307, the setting content changing process advances to step S4308, and corresponds a lock and the session by using the lock managing part 4301 and the session managing part 4302. Steps S4309 through S4312 in FIG. 91 are the same as steps S4211 through S4217 in FIG. 33, and the explanation thereof will be omitted.

The setting content changing process advances to step S4313. In step S4313, the WSF address book management service 4300 sends a response for the session start request in step S4300 to the client terminal 4100. The response in step S4313 includes the session ID. Steps S4314 through S4321 in FIG. 92 are the same as steps S4216 through S4223 in FIG. 87, and the explanation thereof will be omitted.

The setting content changing process advances to step S4322. In step S4322, the client terminal 4100 sends a session end request to the WSF address book management service 4300. The session end request in step S4322 includes the session ID of the session established in step S4301. Steps S4323 through S4327 in FIG. 92 are the same as steps S4225 through S4229 in FIG. 87, and the explanation thereof will be omitted. Steps S4328 through S4330 in FIG. 92 are the same as steps S4232 through S4234 in FIG. 87, and the explanation thereof will be omitted.

Next, messages sent and received between the client terminal 4100 and the WSF address book management service 4300 of the image processing apparatus 4001 in the flowcharts in FIG. 91 and FIG. 92 will be described with reference to FIG. 93 in detail.

In the flowcharts in FIG. 91 and FIG. 92, the messages sent and received between the client terminal 4100 and the WSF address book management service 4300 of the image processing apparatus 4001 are the same as the messages in the flowcharts in FIG. 56 through FIG. 58, FIG. 81 and FIG. 83, and FIG. 86 and FIG. 87, other than step S4300, and the explanation thereof will be omitted.

FIG. 93 is a diagram showing one example of a request SOAP message sent from the client terminal to the WSF device management service as the session start request in step S4300 in FIG. 91. A request SOAP message 5260 in FIG. 93 includes a type 5261 of the address book to update, a user name 5262, a password 5263, an address book ID 5264 identifying the address book as the lock subject, and a desired lock valid time limit 5265.

As described above, in the setting content changing process according to the eleventh embodiment of the present invention, it is possible for a single request to correspond the session and the lock authority, which are conducted by a plurality of requests in the eighth embodiment.

Twelfth Embodiment

Figure 94:
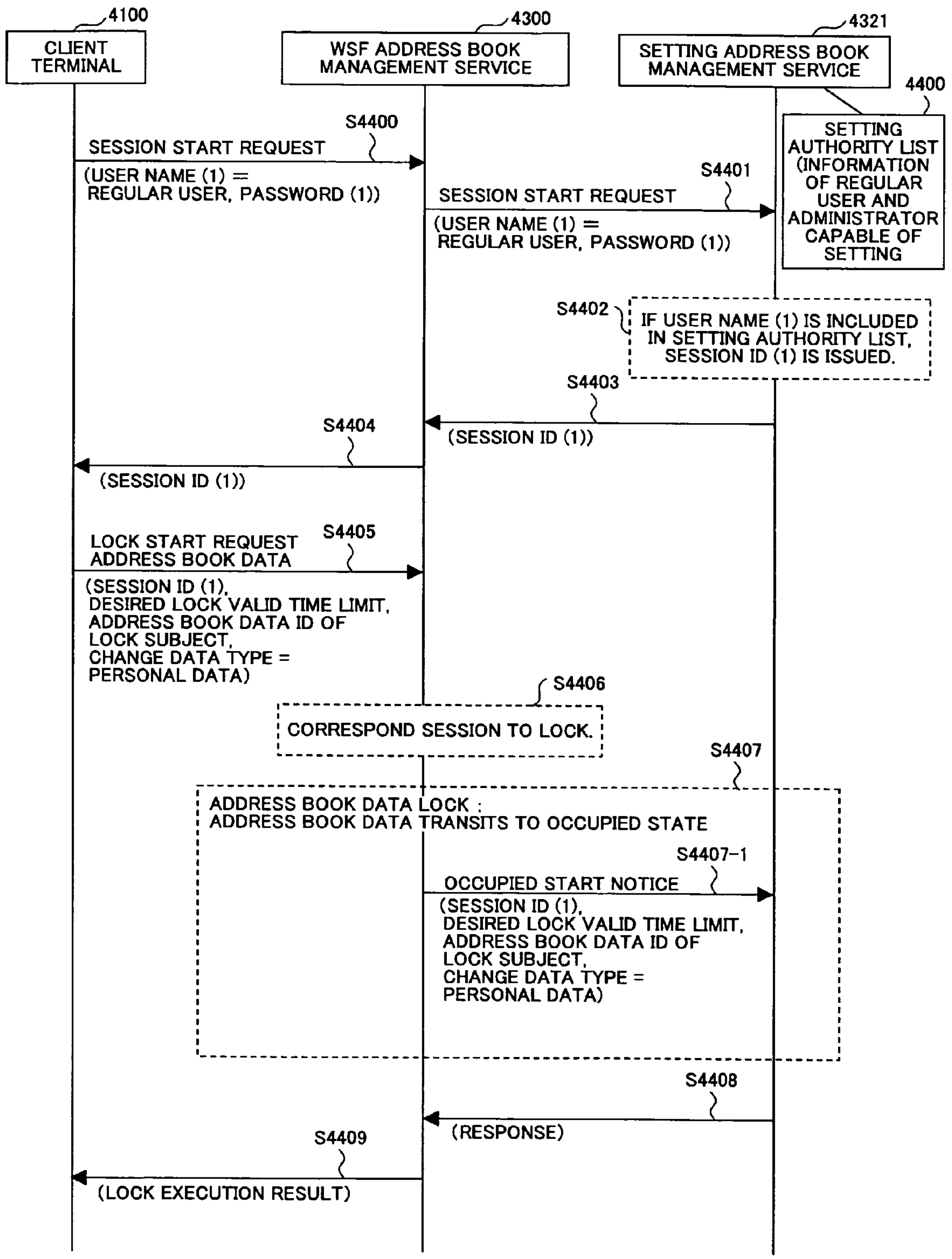
FIG. 94 is a flowchart for explaining the setting content changing process according to a twelfth embodiment of the present invention.
Figure 95:
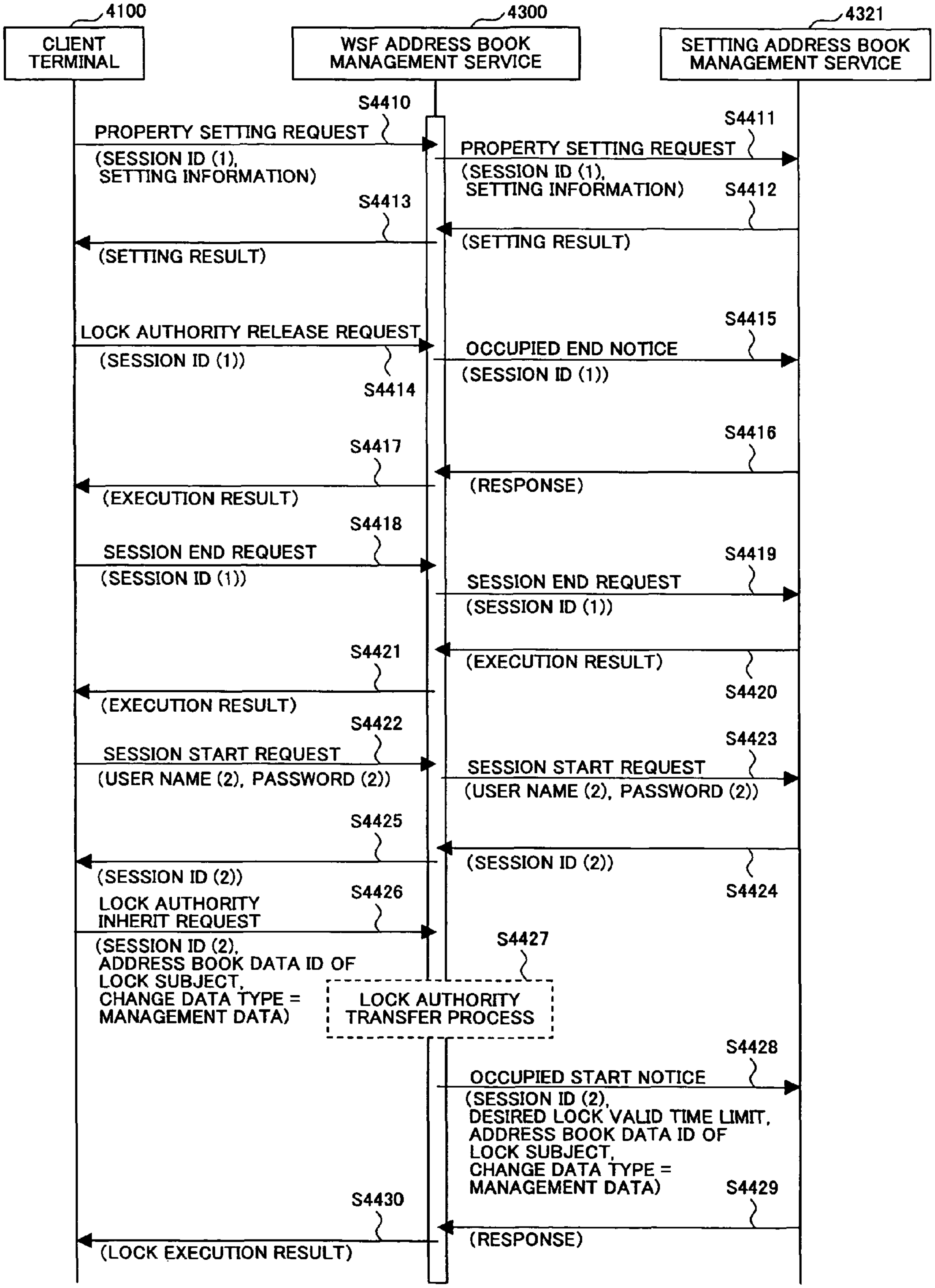
FIG. 95 is a flowchart for explaining the setting content changing process according to the twelfth embodiment of the present invention.
Figure 96:
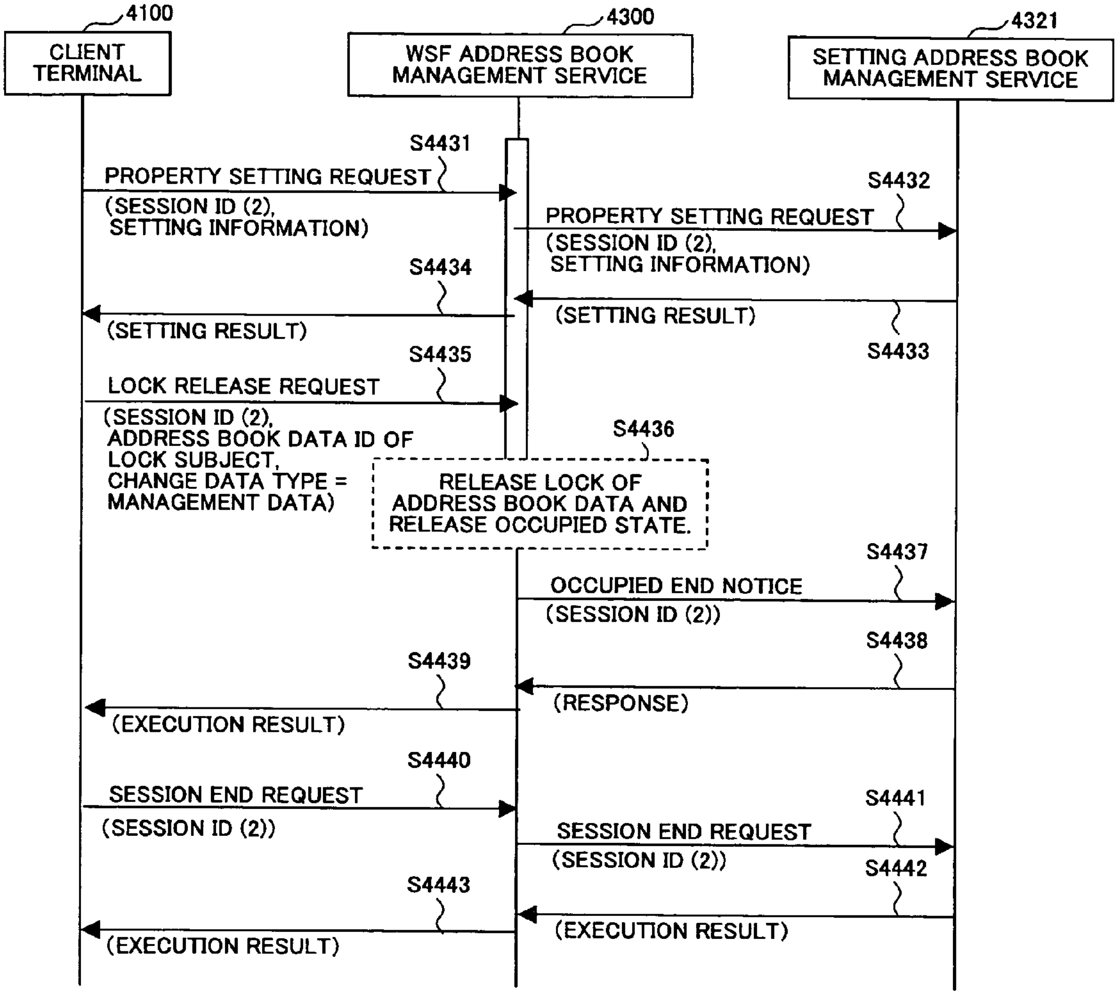
FIG. 96 is a flowchart for explaining the setting content changing process according to the twelfth embodiment of the present invention.

Next, a setting content changing process according to a twelfth embodiment of the present invention will be described. FIG. 94 through FIG. 96 are flowcharts for explaining the setting content changing process according to the twelfth embodiment of the present invention. Steps S4400 through S4425 in the flowcharts in FIG. 94 through FIG. 96 are the same as steps S4010 through S4035 in FIG. 56 through FIG. 58, and the explanation thereof will be described.

When the client terminal 4100 receives the session ID in step S4425, the setting content changing process advances to step S4426. In step S4426, the client terminal 4100 sends a lock authority inherit request to the WSF address book management service 4300. The lock authority inherit request in step S4426 includes the session ID of the session established in step S4423, the address book ID identifying the address book as the lock subject, and the type "management data" of the address book to update.

In the lock authority inherit request in the twelfth embodiment, the URL of the setting address book management service 4321 included in the lock authority inherit request and, and the session ID of the session established in step S4012 are deleted. That is, in the lock authority inherit request in the twelfth embodiment, it is possible to conduct the lock authority transferring process without sending the URL of the setting address book management service 4321 releasing the lock and the session ID of the session established in step S4012 from the client terminal 4100 to the WSF address book management service 4300. Steps S4426 through S4443 after step S4426 are the same as steps S4037 through S4053 in FIG. 56 through FIG. 58, and the explanation thereof will be omitted.

Next, in the flowcharts in FIG. 94 through FIG. 96, messages sent and received between the client terminal 100 and the WSF address book management service 4300 of the image processing apparatus 4001 will be described with reference to FIG. 97 in detail.

Steps S4400 through S4425, and steps S4427 through S4443 in the flowcharts in FIG. 94 through FIG. 96, are the same as steps S4010 through S4035 and steps S4037 through S4053 in FIG. 56 through FIG. 58, and the detailed explanation of the messages sent and received between the client terminal 4100 and the WSF address book management service 4300 of the image processing apparatus 4001 will be omitted.

FIG. 97 is a diagram showing one example of a request SOAP message sent from the client terminal to the WSF device management service as the lock authority inherit request in step S4426 in FIG. 95. A request SOAP message 5270 in FIG. 97 includes a session ID 5271 of the session established in step S4422, an address book ID 5272 identifying the address book as the lock subject, and a type 5273 of the address book to update. That is, in the request SOAP message 5270 in FIG. 97, the URL 5174 of the setting address book management service included in the request SOAP message 5170 in FIG. 77 and the session ID 5175 of the session established in step S4012 are deleted.

As described above, in the setting content changing process according to the twelfth embodiment of the present invention, it is possible to conduct the lock authority transferring process even if the URL of the setting address book management service 4321, the session ID 5175 of the session established in step S4012 included in the lock authority inherit request in the eighth embodiment are deleted.

Thirteenth Embodiment

Figure 98:
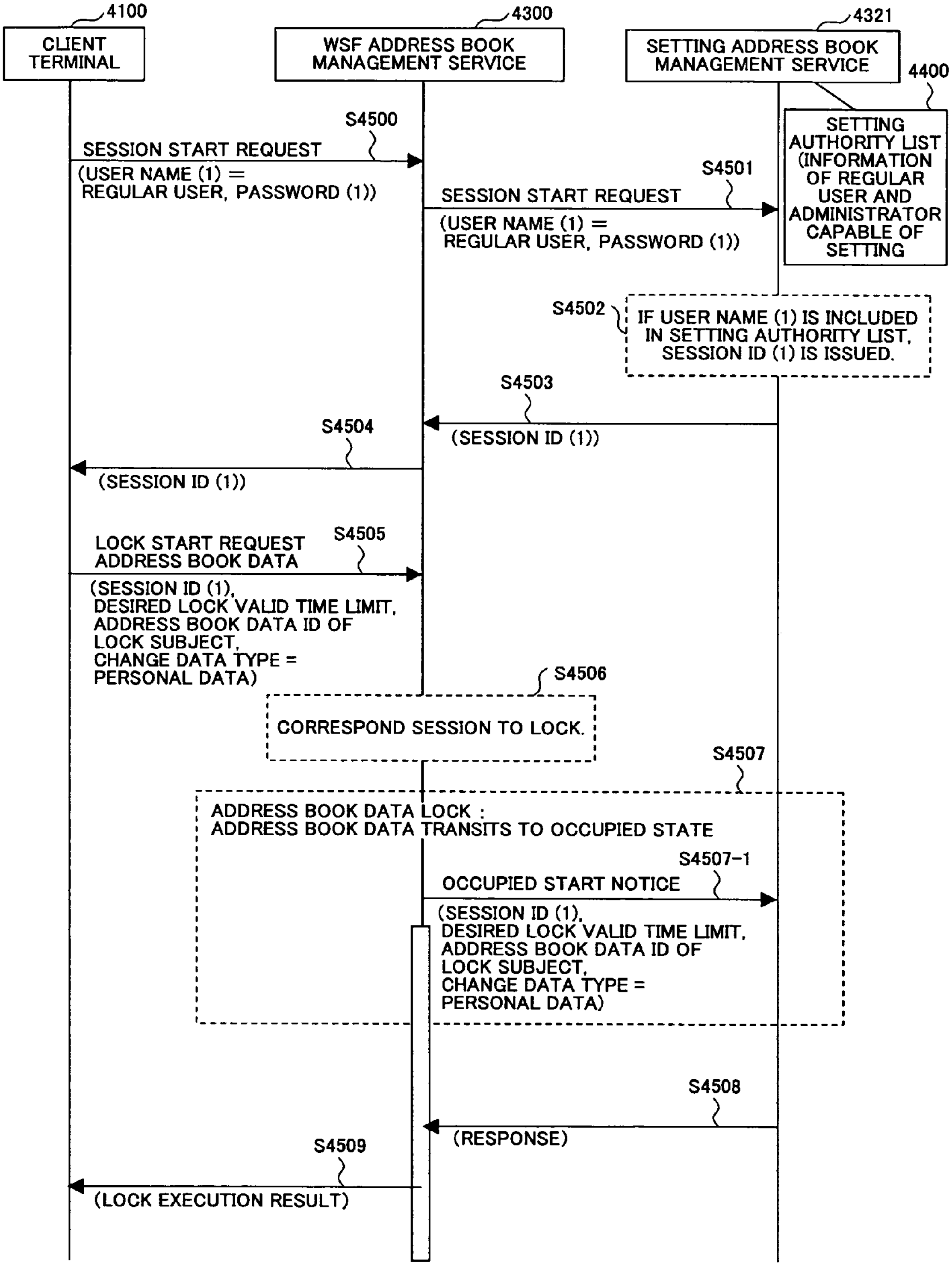
FIG. 98 is a flowchart for explaining the setting content changing process according to a thirteenth embodiment of the present invention.
Figure 99:
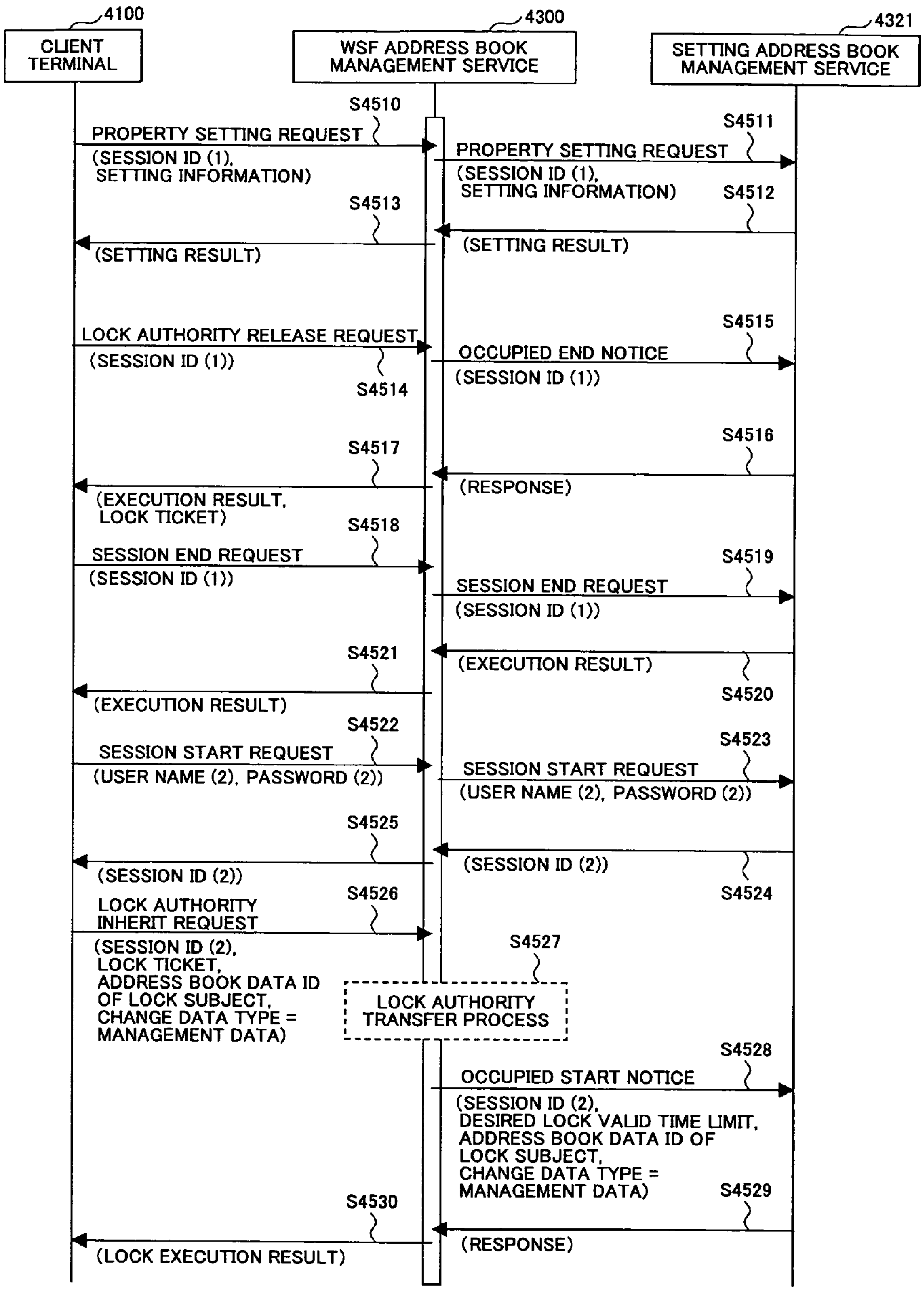
FIG. 99 is a flowchart for explaining the setting content changing process according to the thirteenth embodiment of the present invention.
Figure 100:
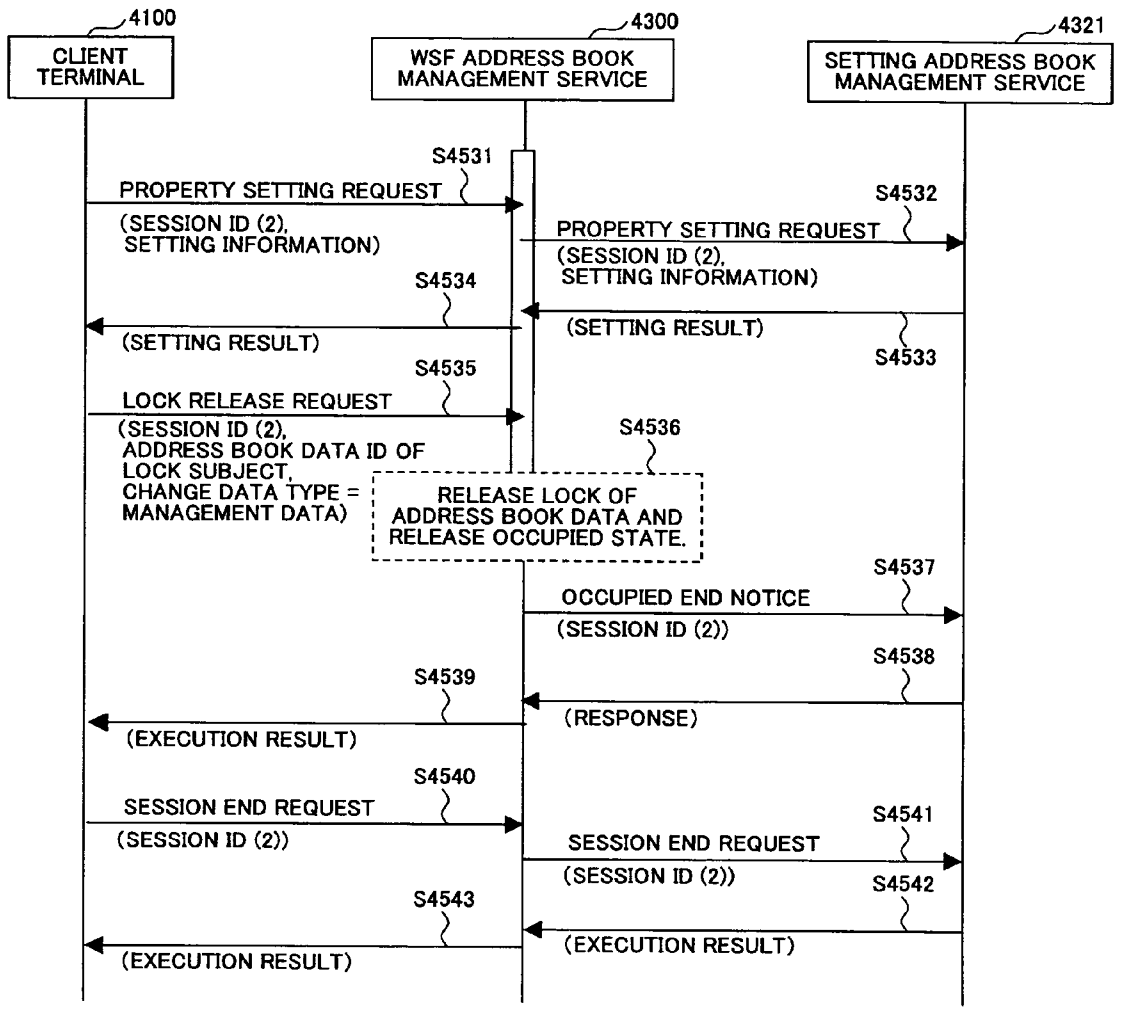
FIG. 100 is a flowchart for explaining the setting content changing process according to the thirteenth embodiment of the present invention.

Next, a setting content changing process according to a thirteenth embodiment of the present invention will be described. FIG. 98 through FIG. 100 are flowcharts for explaining the setting content changing process according to the thirteenth embodiment of the present invention. Steps S4500 through S4513 in the flowcharts in FIG. 98 through FIG. 100 are the same as steps S4010 through S4023 in FIG. 56 through FIG. 58, and the explanation thereof will be omitted.

When the client terminal 4100 receives the setting result in step S4513, the setting content changing process advances to step S4514. In step S4514, the client terminal 4100 sends a lock authority release request to the WSF address book management service 4300. The lock authority release request in step S4514 includes the session ID. The setting content changing process advances to step S4515. In step S4515, the WSF address book management service 4300 sends an occupied end notice to the setting address book management service 4321. The occupied end notice in step S4515 includes the session ID received in step S4514. The setting address book management service 4321 transits the type "personal data" of the address book transit in the settable state by the occupied start notice in step S4507-1, to the occupied state.

The setting content changing process advances to step S4516. In step S4516, the setting address book management service 4321 sends a response with respect to the occupied end notice in step S4515 to the WSF address book management service 4300. The setting content changing process advances to step S4517. In step S4517, the WSF address book management service 4300 sends an execution result of the lock authority release request and a lock ticket to the client terminal 4100.

The lock ticket is information proving a possession of an authority for inheriting the lock authority, instead of the URL of the setting address book management service 4321 that previously possessed the lock authority and currently releases the lock, and the session ID of the session established in step S4502.

Steps S4518 through S4525 are the same as steps S4028 through S4035 in FIG. 56 through FIG. 58, and the explanation thereof will be omitted. When the client terminal 4100 receives the session ID in step S4525, and the setting content changing process advances to step S4526. In step S4526, the client terminal 4100 sends a lock authority inherit request to the WSF address book management service 4300.

The lock authority inherit request in step S4526 includes the session ID of the session established in step S4523, the lock ticket, the address book ID identifying the address book as the lock subject, and the type "management data" of the address book to update.

The setting content changing process advances to step S4527. In step S4527, the WSF address book management service 4300 transfers the lock authority possessed by the session established in step S4502, to the session established in step S4523.

The setting content changing process advances to step S4528. In step S4528, the WSF address book management service 4300 sends the occupied start notice to the setting address book management service 4321. The occupied start notice in step S4528 includes the session ID of the session established in step S4523, the desired lock valid time limit, the address book ID identifying the address book as the lock subject, and the type "management data" of the address book data to update. The setting address book management service 4321 transits the type of the address book included in the occupied start notice to the settable state.

The setting content changing process advances to step S4529. In step S4529, the setting address book management service 4321 sends a response with respect to the occupied start notice in step S4528, to the WSF address book management service 4300. The setting content changing process advances to step S4530. In step S4530, the WSF address book management service 4300 sends a lock execution result to the client terminal 4100.

Steps S4531 through S4543 are the same as steps S4041 through S4053 in FIG. 56 through FIG. 58, and the explanation thereof will be omitted. Next, in the flowcharts shown in FIG. 98, FIG. 59, and FIG. 100, messages sent and received between the client terminal 4100 and the WSF address book management service 4300 of the image processing apparatus 4001 will be described in detail with reference to FIG. 101 and FIG. 102.

In the flowcharts in FIG. 98 through FIG. 100, the messages sent and received between the client terminal 4100 and the WSF address book management service 4300 of the image processing apparatus 4001 are the same as the messages in the flowcharts in FIG. 56 through FIG. 58, other than steps S4514 and S4526, and the explanation thereof will be omitted.

FIG. 101 is a diagram showing one example of a response SOAP message sent form the WSF device management service to the client terminal as the response with respect to the lock authority release request in step S4512 FIG. 98. A response SOAP message 5280 in FIG. 101 includes an execution result 5281 in response to the lock authority release request and a lock ticket 5282.

FIG. 102 is a diagram showing one example of a request SOAP message sent from the client terminal to the WSF address book management service as the lock authority inherit request in step S4526 in FIG. 99. A request SOAP message 5290 in FIG. 102 includes a session ID 5291 of the session established in step S4523, an address book ID 5292 identifying the address book as the lock subject, a type 5293 of the address book to update, a lock ticket 5294.

As described above, in the setting content changing process according to the thirteenth embodiment of the present invention, it is possible to use the lock ticket without sending the session ID of the session releasing the lock authority at the lock authority release request.

Various combinations as shown in FIG. 103 may be applied for the session start request and the response with respect to the session start request, in response to an operation conducted by the WSF address book management service 4300 and the setting address book management service 4321.

FIG. 103 is a diagram showing combinations of data included in the session start request and data included in the response with respect to the session start request. In FIG. 103, the data included in the session start request are input data and the data included in the response with respect to the session start request are output data.

As described above, according to the present invention, in a case of the setting contents which cannot be set without changing an authority, in other words, in a case of changing the setting contents among a plurality of sessions, it is possible to take over the lock state among the plurality of sessions each other.

According to the present invention, it is possible to change the setting contents including a plurality of the setting items in a series of processes, and it is possible to exclude other requests for the setting contents occurred while the setting contents are being changed.

The setting contents changing process as described above can be realized by a computer-executable program for causing a computer as a client terminal to change setting contents, the client terminal sending a setting request to an information processing apparatus connected through a network and capable of changing the setting contents including at least one setting item, said computer-readable recording medium comprising: transiting one setting device managing part to the settable state in that the setting item can be referred to or changed after transiting all of the setting device managing parts to the occupied state in that the setting item cannot be referred to or changed; and transferring the settable state to which a plurality of the setting device managing parts cannot transit, from the one setting device managing part to another setting device managing part.

The setting contents changing process as described above can be realized by a computer-executable program for causing a computer as a client terminal to change setting contents, the client terminal sending a setting request to an information processing apparatus connected through a network and capable of changing the setting contents including one or more setting items, said computer-readable recording medium comprising: transiting one group from the occupied state to the settable state after transiting all of the plurality of groups to the occupied state; and transferring the settable state in that the plurality of groups cannot transit at the same time, from the one group to the another group.

The present invention is not limited to the specifically disclosed embodiments, and variations and modifications may be made without departing from the scope of the present invention.

The present application is based on the Japanese Priority Applications No. 2003-364031 filed on Oct. 24, 2003, No. 2003-370712 filed on Oct. 30, 2003, No. 2003-372879 filed on Oct. 31, 2003, No. 2003-383562 filed on Nov. 13, 2003, No. 2003-389678 filed on Nov. 19, 2003, No. 2003-389679 filed on Nov. 19, 2003, 2004, No. 2004-303133 filed on Oct. 18, 2004, and No. 2004-303134 filed on Oct. 18, 2004, the entire contents of which are hereby incorporated by reference.

What is claimed is:

1. An information processing apparatus capable of changing setting contents including at least one setting item in response to a setting request from at least one client terminal connecting to said information processing apparatus through a network or an input unit of said information processing apparatus, comprising:

a plurality of setting device managing parts, each setting device managing part having an occupied state, in which the setting item cannot be referred to or changed, and a settable state, in which the setting item can be referred to or changed, and setting an authority of an operator for referring to or changing the setting item for each management subject in the settable state; and a main device managing part managing the occupied state and the settable state of each setting device managing part, and transferring the settable state from one setting device managing part to another setting device managing part such that the plurality of setting device managing parts cannot transit to the settable state at the same time, the main device managing part managing authorization information verifying the authority of the operator for referring to or changing at least a part of the setting item based on a username and password entered by the operator, managing the occupied state or the settable state of each setting device managing part based on the authorization information and a session ID obtained from the another setting device managing part, which corresponds to a setting request from the operator, and transferring the settable state to the another setting device managing part while maintaining the occupied state for all other setting device managing parts during a duration of a lock time specified by the operator.

2. The information processing apparatus as claimed in claim 1, wherein the main device managing part uses the session established between the client terminal or the input unit of the information processing apparatus and the setting device managing part as the information proving that the authority for referring to or changing at least the part of the setting item.

3. The information processing apparatus as claimed in claim 1, wherein the main device managing part transfers the settable state from one setting device managing part to another setting device managing part when the one setting device managing part and the another setting device managing part have different authorities from each other for referring to or changing at least the part of the setting item.

4. The information processing apparatus as claimed in claim 1, wherein the main device managing part transits the one setting device managing part from the occupied state to the settable state, and transits the one setting device managing part from the settable state to the occupied state after changing the setting item in response to the setting request, and transits the another setting device managing part from the occupied state to the settable state, and releases the settable state and the occupied state after changing the setting item in response to the setting request.

5. The information processing apparatus as claimed in claim 2, wherein the main device managing part sends information concerning the session to the another setting device managing part when transferring the settable state from the one setting device managing part to the another setting device managing part.

6. The information processing apparatus as claimed in claim 2, wherein the main device managing part sends a ticket associating with the session to the another setting device managing part when transferring the settable state from the one setting device managing part to the another setting device managing part.

7. The information processing apparatus as claimed in claim 2, wherein the setting device managing part maintains user information and a password of an operator having an authority for referring to or changing at least the part of the setting item, and establishes a session with the client terminal or the input unit of said information processing apparatus when receiving a session start request including the user information and the password.

8. The information processing apparatus as claimed in claim 1, wherein said information processing is an image processing apparatus including a process concerning an image formation as the management subject.

* * * * *